(12) United States Patent  
Aozasa et al.

(10) Patent No.: US 7,538,937 B2  
(45) Date of Patent: May 26, 2009

(54) OPTICAL AMPLIFIER

(75) Inventors: Shinichi Aozasa, Isehara (JP); Hiroji Masuda, Mito (JP); Makoto Shimizu, Mito (JP)

(73) Assignee: Nippon Telegraph and Telephone, Tokyo (JP)

( * ) Notice: Subject to any disclaimer, the term of this patent is extended or adjusted under 35 U.S.C. 154(b) by 0 days.

(21) Appl. No.: 11/364,633

(22) Filed: Feb. 28, 2006

(65) Prior Publication Data

US 2006/0146398 A1 Jul. 6, 2006

Related U.S. Application Data

(62) Division of application No. 10/389,486, filed on Mar. 14, 2003, now Pat. No. 7,042,634.

(30) Foreign Application Priority Data

Mar. 14, 2002 (JP) ............................. 2002-070974  
Oct. 15, 2002 (JP) ............................. 2002-301155

(51) Int. Cl.  
*H04B 10/17* (2006.01)  
*H04B 10/12* (2006.01)

(52) U.S. Cl. ............................. 359/341.41; 359/341.5

(58) Field of Classification Search ............ 359/337.11, 359/337.12, 341.5, 31.4, 341.54  
See application file for complete search history.

(56) References Cited

U.S. PATENT DOCUMENTS 5,341,237 A * 8/1994 Tohmon et al. .......... 359/341.5  
H1436 H 5/1995 Kersey et al.

(Continued)

FOREIGN PATENT DOCUMENTS

EP 0 497 491 A2 8/1992

(Continued)

OTHER PUBLICATIONS

Yam et al. ,"Gain-Clamped Thulium-Doped Fiber Amplifier with a Single Pump at 1050nm", Optical Fiber Communications Conference (OFC), Trends in Optics and Photonics Series, vol. 86 Technical Digest (IEEE Cat. No. 03CH37403), Mar. 2003, vol. 2, p. 628-629.*

(Continued)

*Primary Examiner*—Eric Bolda  
(74) *Attorney, Agent, or Firm*—Workman Nydegger

(57) ABSTRACT

An optical amplifier includes a rare-earth doped optical fiber or rare-earth doped optical waveguide serving as an amplification medium where rare-earth ions have been doped in its core and/or clad, an excitation mechanism for exciting the amplification medium, an optical resonator that causes laser oscillation at one or more wavelength of spontaneous emission light produced and amplified in the amplification medium, a monitoring mechanism that monitors a power of at least one light selected from a power of at least one light with at least one prescribed wavelength band selected from the light inputted to the amplification medium and a power of at least one light selected from a power of at least one light with at least one prescribed wavelength band selected from the light outputted from the amplification medium, and a control unit that controls the excitation mechanism based on a value from monitoring mechanism.

23 Claims, 38 Drawing Sheets

U.S. PATENT DOCUMENTS

| | | | | |
|---|---|---|---|---|
| 5,598,491 | A | * | 1/1997 | Ohya et al. .................. 385/24 |
| 5,838,487 | A | * | 11/1998 | Nilsson et al. ......... 359/337.12 |
| 5,900,968 | A | | 5/1999 | Srivastava et al. |
| 5,991,314 | A | | 11/1999 | Ionov et al. |
| 6,008,935 | A | * | 12/1999 | Fujita et al. .............. 359/341.4 |
| 6,023,366 | A | | 2/2000 | Kinoshita |
| 6,038,061 | A | | 3/2000 | Sugaya |
| 6,067,187 | A | | 5/2000 | Onaka et al. |
| 6,094,296 | A | | 7/2000 | Kosaka |
| 6,108,123 | A | | 8/2000 | Kinoshita |
| 6,111,688 | A | * | 8/2000 | Kobayashi et al. ..... 359/337.13 |
| 6,160,659 | A | | 12/2000 | Kinoshita |
| 6,259,553 | B1 | | 7/2001 | Kinoshita |
| 6,272,277 | B1 | * | 8/2001 | Heo et al. .................. 385/142 |
| 6,337,764 | B1 | | 1/2002 | Yoon et al. |
| 6,466,348 | B1 | | 10/2002 | Izumi |
| 6,583,927 | B2 | * | 6/2003 | Choi et al. ............... 359/341.5 |
| 6,950,232 | B1 | | 9/2005 | Yam |
| 2003/0086153 | A1 | | 5/2003 | Mandelbaum et al. |
| 2003/0133713 | A1 | | 7/2003 | Ng et al. |

FOREIGN PATENT DOCUMENTS

| | | | |
|---|---|---|---|
| EP | 0 745 281 | B1 | 12/1996 |
| EP | 1318621 | A2 * | 6/2003 |
| JP | 02-273976 | | 11/1990 |
| JP | 02-308581 | | 12/1990 |
| JP | 04-251827 | | 9/1992 |
| JP | 05-160473 | | 6/1993 |
| JP | 08-304856 | A | 11/1996 |
| JP | 09-120090 | | 5/1997 |
| JP | 09-159526 | | 6/1997 |
| JP | 09-214433 | | 8/1997 |
| JP | 9-509012 | A | 9/1997 |
| JP | 11-145533 | A | 5/1999 |
| JP | 11-220196 | | 8/1999 |
| JP | 2000-022252 | | 1/2000 |
| JP | 2000-106464 | | 4/2000 |
| JP | 2000-223762 | | 8/2000 |
| JP | 2000-261079 | A | 9/2000 |
| JP | 2000-349717 | | 12/2000 |
| JP | 2001-223419 | A | 8/2001 |
| JP | 2001223419 | A * | 8/2001 |
| JP | 2001-257405 | | 9/2001 |
| JP | 2002-064234 | | 2/2002 |
| JP | 2002-198599 | | 7/2002 |
| JP | 2002-232048 | | 8/2002 |
| WO | WO 95/22847 | | 8/1995 |
| WO | WO 00/18020 | | 3/2000 |

OTHER PUBLICATIONS

S. Aozasa et al., *1480-1510 nm-band Tm Doped Fiber Amplifier (TDFA) with a High Power Conversion Efficiency of 42%*, PD-1-1, OFC 2001.

Kiyoshi Fukuchi et al., *10.92-Tb/s (273× 40-Gb/s) Triple-band/Ultra-dense WDM Optical-repeatered Transmission Experiment*, PD24-1, OFC 2001.

E. Desurvire et al., *Gain Control in Erbium-Doped Fibre Amplifiers by An All-Optical Feedback Loop*, IEEE, Electronics Letters, vol. 27, No. 7, Mar. 28, 1991, pp. 560-561.

E. Desurvire et al., *Dynamic Gain Compensation in Saturated Erbium-Doped Fiber Amplifiers*, IEEE, Photonics Technology Letters, vol. 3, No. 5, May 1991, pp. 453-455.

E. Desurvire, *Erbium-Doped Fiber Amplifiers*, a Wiley-Interscience Publication, John Wiley and Sons, Inc., Chapter 1, 1994, pp. 10-12.

Won Jae Lee et al., *Gain Excursion & Tilt Compensation Algorithm for TDFA Using 1.4 μm/1.5μm Dual Wavelength Pump Control*, OFC 2002, pp. 571-572.

S. Aozasa et al., *Gain Spectrum Control Method for Gain-Shifted TDFA Employing Single Wavelength Pumping*, Electronics Lettes, vol. 38, No. 22, Oct. 24, 2002.

Yongqian Liu et al., *Transient Gain Control in EDFA's by Dual-Cavity Optical Automatic Gain Control*, IEEE Photonics Technology Letters, vol. 11, No. 11, Nov. 1999, pp. 1381-1383.

Mark F. Krol et al., *Dual Cavity Optical Automatic Gain Control for EDFAs*, Optical Fiber Communication Conference, 1999, and the International Conference on Integrated Optics and Optical Fiber Communication, OFC/IOOC '99, Technical Digest, vol. 2, pp. 214-216.

P.C. Becker et al., *Erbium-Doped Fiber Amplifiers*, Academic, San Diego, 1999, pp. 110-119, 131-140 and 153-156.

Y. Liu et al., *Transient Gain Control in EDFA's by Dual-Cavity Optical Automatic Gain Control*, IEEE Photonics Technology Letters, vol. 11, No. 11, Nov. 1999, pp. 1381-1383.

E. Desurvire, *Study of the Complex Atomic Susceptibility of Erbium-Doped Fiber Amplifiers*, Journal of Lightwave Technology, vol. 8, No. 10, Oct. 1990, pp. 1517-1527.

E. Desurvire et al., *Erbium-Doped Fiber Amplifiers*, "Modeling Light Amplification in Erbium-Doped Single-Mode Fibers," John Wiley & Sons, Inc., New York, 1994, pp. 10-13.

Partial English translation of paragraphs 23, 24, and 26 of Japanese Patent No. 2000-022252 published on Jan. 21, 2000.

* cited by examiner

OPTICAL AMPLIFIER

CROSS-REFERENCE TO RELATED APPLICATIONS

This application is a divisional of U.S. patent application Ser. No. 10/389,486, filed Mar. 14, 2003, now U.S. Pat. No. 7,042,634 which claims priority to Japanese Patent Application Nos. 2002-070974 filed Mar. 14, 2002 and 2002-301155 filed Oct. 15, 2002, the contents of which are incorporated herein by specific reference.

BACKGROUND OF THE INVENTION

1. The Field of the Invention

The present invention relates to optical amplifiers, and more particularly to a technique for controlling the gain profile of an optical amplifier equipped with an amplification medium containing rare-earth ions.

2. The Relevant Technology

Wavelength division multiplexing (WDM) communications technology is one of the most effective means for meeting the sharply increasing demand for optical communication. Since WDM increases the communications capacity by increasing signal channels, the available bandwidth for signals must be expanded.

The current WDM communications use rare-earth ion doped optical fiber amplifiers in many cases. One of the bands used for signal amplification is the C band (1530-1570 nm) where the Erbium doped optical fiber amplifier (EDFA) can work effectively.

Meanwhile, the S band (1460-1530 nm) is drawing attention as the next-generation band that has a transmission loss and a low dispersion as low as that in the C band. The Thulium doped optical fiber amplifier (TDFA), of which amplification band lies in the S-band, is under intensive research.

S-Band TDFA has attained a power conversion efficiency (40%) as high as that accomplished by EDFA for use in the L band, and the experiment of its WDM transmission was successful (for example, see OFC2001 PD-1). Furthermore, C-band EDFA is used together with L-band EDFA for band combination to widen the band for signal amplification. Indeed, there is a report that this combination attained a broadband data transmission of 10.9 Tbit/s (for example, see OFC2001 PD-24).

In WDM communications using plural amplifiers equipped with rare-earth doped optical fibers as amplification media, such a problem is posed that the spectrum of output light from the amplifiers changes and occasionally deforms significantly.

This is because the power of input signal light to the optical amplifier fluctuates with time-varying transmission loss and with changes in the number of signal channels, thereby the gain spectrum of the optical amplifier changes, and such changes are accumulated to result in signal deformations.

Since deformations of the gain spectrum in the amplifier become a cause of limiting the transmission distance, the gain spectrum must be held constant. For this purpose, it is effective to control the gain profile of each amplifier to be constant (hereinafter, may be called the gain profile constant control (GPCC)).

As an example of such a control method for silica-based EDFA, there is a method that monitors a gain of a signal light in a channel and controls the power of pump light so that the gain in a channel becomes constant. This is an almost established control technique for maintaining the gain profile constant in silica-based EDFA. The gain profile in fluoride PDFA can be held constant by a similar control method. The amplification medium (optical fiber) of such optical amplifiers operates according to the amplification mechanism in which levels related with the amplification are substantially two. This is a mechanism rarely seen that allows to handle the amplification process only related with the upper level related with the amplification (hereinafter which also refers the amplification upper level) and the lower level involved in the amplification (hereinafter which also refers the amplification lower level) or ground level.

The above mechanism will be described with reference to FIG. 1. FIG. 1A is a schematic diagram illustrating the excitation energy levels in silica-based EDFA, and FIG. 1B is a schematic diagram illustrating the excitation levels in the Praseodymium doped optical fiber amplifier (PDFA).

In the silica-based EDFA, the amplification lower level agrees with the ground level, as shown in FIG. 1A. Thus the energy levels related with amplification are the only two levels—the amplification upper level ($^4I_{13/2}$) and the amplification lower level ($^4I_{15/2}$). By monitoring the gain of a signal right in a channel and adjusting an intensity of pump light source so that the gain in the channel becomes constant, the gain profile can be held constant.

Referring now to FIG. 1B, PDFA has three energy levels related with amplification—amplification upper level, amplification lower level and ground level. In PDFA, however, since the lifetime of fluorescence at the amplification lower level is very short, compared with that at the amplification upper level, the lower level can be neglected. Then it becomes possible to maintain the gain profile constant by the same technique employed in the silica-based EDFA.

When the energy levels related with amplification are substantially two, the gain profile can be relatively easily maintained constant.

In general, however, there are few cases where the energy levels related with amplification can be regarded as only two in optical amplifier using rare-earth ion doped medium. The above method of monitoring the gain at one signal wavelength and maintaining the gain profile unchanged by adjusting the intensity of the pump light based on changes in the gain of the signal is not applicable to common optical amplifiers. In other words, the gain profile cannot be maintained constant against fluctuation of input signal levels and other conditions (for example, changes in temperature) only by adjusting the intensity of pump light to hold the gain at one single wavelength constant.

Thus, in principle, the gains at two different signal wavelengths must be monitored, and the gain control has been complex.

As mentioned above, an optical amplifier used an amplification medium doped with the part of rare-earth ion (an optical fiber or an optical waveguide) can be controlled a gain profile constantly by monitoring a gain at one signal wavelength and controlling an intensity of a pump light. However, an optical amplifier used other rare-earth ion doped amplification medium cannot be controlled a gain profile constantly.

Apart from the above mentioned the gain profile constant control method that the gain at one signal wavelength is monitored and an intensity of a pump light is adjusted based on change thereof, a method for maintaining a gain profile constantly by using oscillator or control light is provided.

As an example of using oscillator, in E. Desurvire et al., "Gain control in erbium-doped fiber amplifiers by all-optical feedback loop", IEEE, Electronics Letters. Vol. 27, No. 7, pp. 560-561, 28 Mar. 1991, the technique is described that the construction of feedback loop is introduced, a laser oscillation is caused at one wavelength of ASE, the gain at the wavelength is clumped, and thus gain spectrum is controlled. In addition of the literature, the techniques of clumping a gain includes EP 0 497 491, Japanese Patent Application Laid-open No. 9-509012 (1997), and Japanese Patent Application Laid-open No. 11-145533 (1999).

As an example of using control light, E. Desurvire et al. (IEEE, Photonics technology letters, vol. May 1991 entitled Dynamic gain compensation in saturated erbium-doped fiber amplifiers) discloses that ASE level at one wavelength is monitored and a power of control light is controlled so that the ASE level becomes constant.

Japanese Patent Application Laid-open No. 2000-261079 discloses the optical amplifier and the controlling method that a power of control light which is inputted from back-side of a rare-earth ion doped optical fiber and outputted from the optical fiber is monitored and a control light source is controlled so that the power of control light becomes constant.

Japanese Patent Application Laid-open No. 8-304856 (1996) discloses that a pump power inputted to a amplification medium and a pump power outputted from the amplification medium are monitored and a power of a control light is controlled based on a ratio between both pump powers.

Further, it is also disclosed that a total input power of a control light and signal light are monitored and a power of the control light is controlled so that the total input power becomes constant, and a total output power of a control light and signal light are monitored and a power of the control light is controlled so that the total output power becomes constant.

The methods of using oscillator or control light as described above can control the gain spectrum of silica-based EDFA wherein the levels greatly related to amplification (i.e., it refers the level that should be considered for determining the state of the gain spectrum) are only two, but they cannot control TDFA and other rare-earth ion doped optical amplifiers.

Thus it has been desired that an optical amplifier and a control method which can be applicable to the optical amplifier used the common rare-earth doped amplification medium and control the gain profile constant by easy method.

SUMMARY OF THE INVENTION

This invention has been made to solve above problems, and one of its objects is to provide such an optical amplifier equipped with a common rare-earth ion doped amplification medium that can easily hold the gain profile constant.

Another object of the invention is to provide a control method for holding the gain profile constant using an optical amplifier equipped with a common rare-earth ion doped amplification medium.

One aspect of the invention relates to such an optical amplifier equipped with a common rare-earth ion doped amplification medium that can easily hold the gain profile constant. The optical amplifier of the invention particularly relates to an optical amplifier using an amplification medium where one or more common rare-earth elements are doped.

According to a first embodiment, the optical amplifier of the invention comprises a rare-earth doped optical fiber or rare-earth doped optical waveguide serving as an amplification medium where rare-earth ions have been doped in its core and/or clad, an excitation means for exciting the amplification medium, an optical resonator that causes laser oscillation at one or more wavelength of amplified spontaneous emission light produced in the amplification medium, a monitoring means that monitors a power of at least one light selected from a power of at least one light with at least one prescribed wavelength band selected from the light inputted to the amplification medium and a power of at least one light selected from a power of at least one light with at least one prescribed wavelength band selected from the light outputted from the amplification medium, and a control unit that controls the excitation means based on a value from monitoring means.

According to a second embodiment, the optical amplifier of the invention comprises a rare-earth doped optical fiber or rare-earth doped optical waveguide serving as an amplification medium where rare-earth ions have been doped in its core and/or clad, an excitation means for exciting the amplification medium, a plurality of optical resonator that causes laser oscillation at a plurality of wavelengths of amplified spontaneous emission light produced in the amplification medium.

According to a third embodiment, the optical amplifier of the invention comprises a rare-earth doped optical fiber or rare-earth doped optical waveguide serving as an amplification medium where rare-earth ions have been doped in its core and/or clad, an excitation means for exciting the amplification medium, one or more control light source that can control population inversion state of the amplification medium by inputting a control light at a wavelength in the amplification band (that has same meaning as the gain band) of the amplification medium into the amplification medium and changing a power of the inputted control light, a monitor means that monitors powers of lights inputted into and outputted from the amplification medium, and a control unit where a gain is calculated from lights inputted into or outputted from the amplification medium from values from the monitoring means and controls the control light source so that the calculated gain is matched with a prescribed value or an externally decided value.

A second aspect of the invention is a control method for maintaining the gain profile of the optical amplifier constant.

The control method of the invention is a control method for holding constant the gain profile of the optical amplifier.

The first embodiment of the control method relates to a gain profile constant control method of an optical amplifier comprising a rare-earth doped optical fiber or rare-earth doped optical waveguide serving as an amplification medium where rare-earth ions have been doped in its core and/or clad, an excitation means for exciting the amplification medium, an optical resonator that causes laser oscillation, a monitoring means, and a control unit that controls the excitation means based on a value from monitoring means, the method comprising the steps of causing laser oscillation at one or more wavelength of amplified spontaneous emission light produced in the amplification medium; and monitoring a power of at least one light selected from a power of at least one light with at least one prescribed wavelength band selected from the light inputted to the amplification medium and a power of at least one light selected from a power of at least one light with at least one prescribed wavelength band selected from the light by the monitoring means, and controlling an intensity of the pump light source by controlling the excitation means by the control unit based on the value from the monitoring means.

The second embodiment of the control method relates to a gain profile constant control method of an optical amplifier comprising a rare-earth doped optical fiber or rare-earth doped optical waveguide serving as an amplification medium where rare-earth ions have been doped in its core and/or clad, an excitation means for exciting the amplification medium, a plurality of optical resonator, the method comprising causing laser oscillation at a plurality of wavelengths of amplified spontaneous emission light produced in the amplification medium.

The third embodiment of the control method relates to a gain profile constant control method of an optical amplifier comprising a rare-earth doped optical fiber or rare-earth doped optical waveguide serving as an amplification medium where rare-earth ions have been doped in its core and/or clad, an excitation means for exciting the amplification medium, one or more control light source that can control population inversion state of the amplification medium by changing a power of the inputted control light, a monitor means, and control unit, the method comprising inputting the control light with a wavelength in the amplification band of the amplification medium into the amplification medium, and monitoring powers of the light inputted into and outputted from the amplification medium, and calculating a gain of the light inputted into or outputted from the amplification medium and controlling the control light source so that the calculated gain is matched with a prescribed value or an externally decided value.

The first optical amplifier of the invention has at least an optical resonator that produces laser oscillation therein and controls the gain of an arbitrary light signal, or has at least an optical resonator that produces laser oscillation therein and controls the sum of powers of laser oscillation and signal light to be constant. The second optical amplifier can hold the gain spectrum constant with two or more optical resonators installed therein.

If the optical amplifier of the invention is applied to a WDM transmission system, the gain spectrum of signal light can be controlled despite factors causing changes in the gain spectrum due to input level fluctuation along with changes in the number of signal channels and temperature change.

The optical amplifier of the invention can hold the output constant, compensating time-varying changes in transmission loss, and can prevent hole burning in the oscillation wavelength.

According to the third embodiment of the invention, the optical amplifier using a rare-earth ion doped amplification medium has at least a control light source therein and controls the gain of control light or signal light, or has at least a control light source therein and controls the gains of control light and signal light, or otherwise has at least a control light source therein and controls the gains of two light signals, in order to hold the gain spectrum constant.

The control method of the invention can be applied to a wide range of optical amplifier using common rare-earth ion doped amplification medium.

The above and other objects, effects, features and advantages of the present invention will become more apparent from the following description of embodiments thereof taken in conjunction with the accompanying drawings.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF THE PREFERRED EMBODIMENTS

A first aspect of the invention relates to an optical amplifier that can maintain the gain profile constant in such an optical amplifier using a rare-earth doped amplification medium.

A second aspect of the invention relates to a control method for maintaining the gain profile constant in the optical amplifier using a rare-earth doped amplification medium.

The present invention has the optical amplifiers and control methods of the first embodiment to the third embodiment as described above. The principles of first embodiment and the second embodiment, and then the principle of the third embodiment will be described in below.

First described are an optical amplifier using an amplification medium where a rare-earth ion of which energy levels relevant to amplification are only two—the amplification upper level and the amplification lower level—is doped, and a control method for holding the gain profile constant. Such an amplifier may include silica-based Erbium doped optical fiber (EDF) as the amplification medium.

The optical amplifier using silica-based EDF as the amplification medium is a relatively simple system where the energy levels relevant to amplification are just two levels-the amplification upper level ($^4I_{13/2}$) and the amplification lower level ($^4I_{15/2}$).

Such an amplifier using, for example, silica-based EDF as the amplification medium has at least a silica-based EDF, an excitation means for exciting the silica-based EDF, a monitor means for monitoring input signal light or the like and a control unit for controlling the excitation means based on the information provided by the monitor means.

Figure 1B:
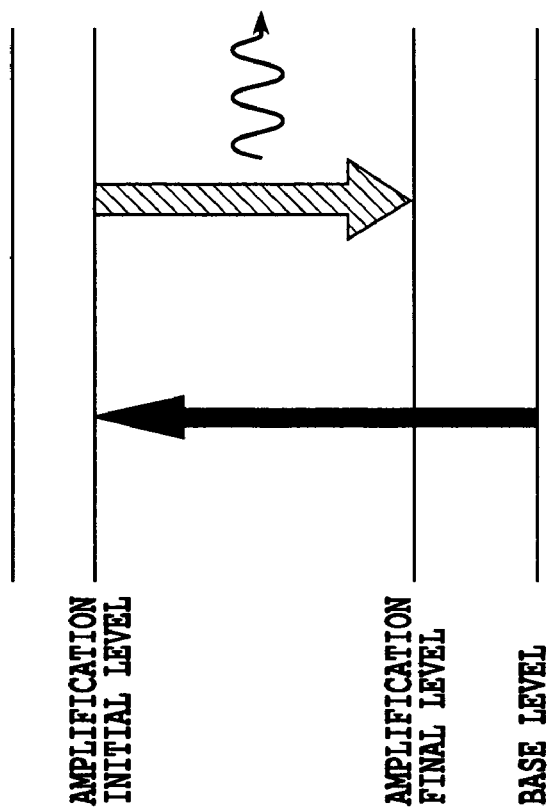
FIGS. 1A and 1B are schematic diagrams illustrating the energy levels greatly related with amplification of Er ions and Pr ions in Er doped fiber and Pr doped fiber.
Figure 1A:
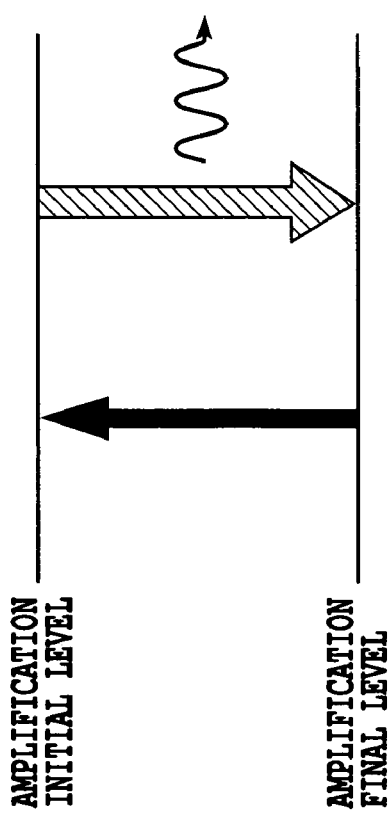
Figure 2B:
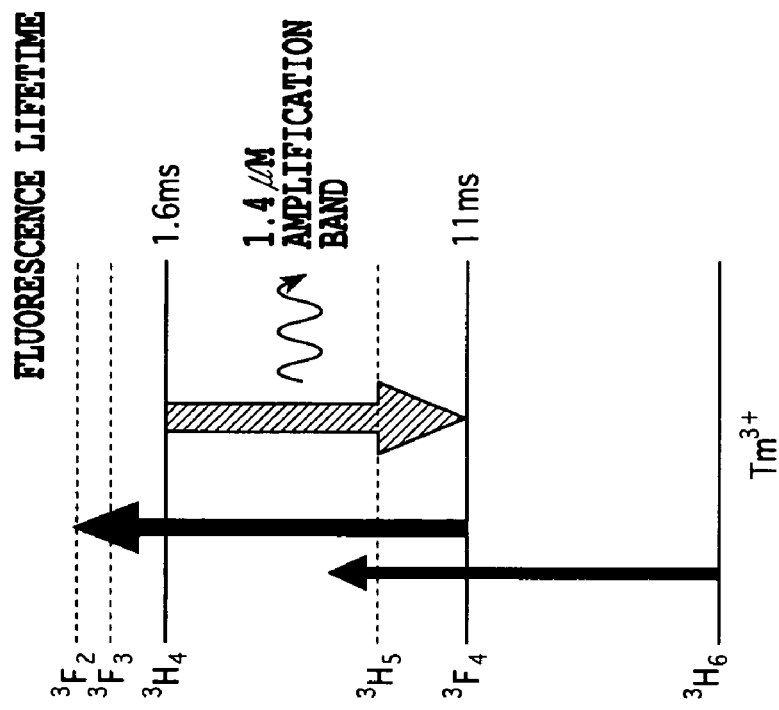
FIGS. 2A and 2B are diagrams illustrating the energy levels of Er ions and Tm ions.
Figure 2A:
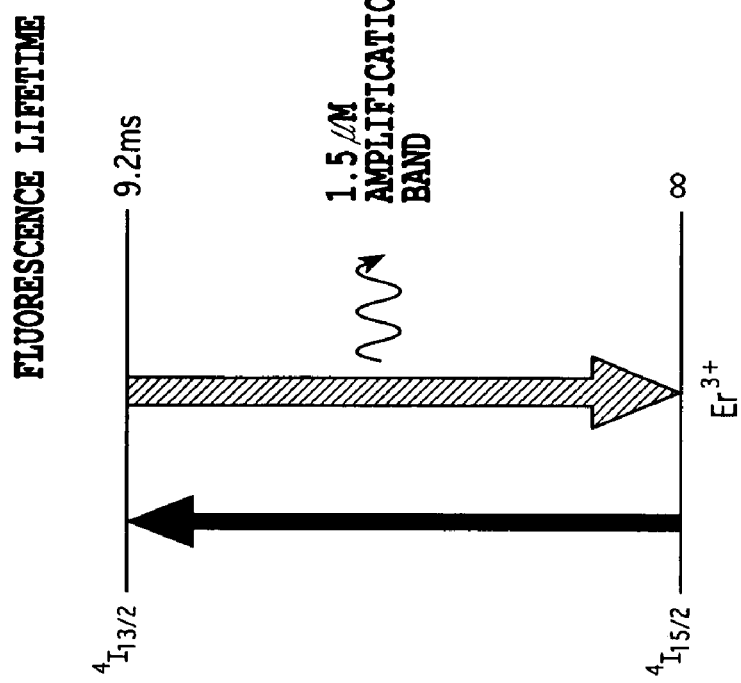

FIG. 2A is a diagram illustrating the energy levels of $Er^{3+}$ ions in the optical amplifier using silica-based EDF as the amplification medium. This type optical amplifier carries out amplification by exciting ions from the amplification lower level ($^4I_{15/2}$) to the amplification upper level ($^4I_{13/2}$). An example of the control methods for maintaining the gain profile constant in silica-based EDFA is to monitor the gain of signal light in one channel (hereinafter, may be described "ch") and to adjust the power of pump light so that the gain of the channel does not change.

Now the principle of this control method will be described below.

Gain(λ, x) at wavelength λ that is the gain per unit length at a position, x, in the longitudinal direction in an Er doped optical fiber amplifier is expressed by the following equation (for example, see E. Desurvire, "Erbium-Doped Fiber Amplifiers" A. Wiley-Interscience Publication, Chapter 1, 1994).

$$\text{Gain}(\lambda,x)=(\sigma e(\lambda)N2(x)-\sigma a(\lambda)N1(x)) \quad \text{(eq. 1)}$$

$$N1+N2=N\text{total} \quad \text{(eq. 2)}$$

σe: Cross-section area of induced emission
σa: Cross-section area of induced absorption
N2(x): Number of ions at the amplification upper level ($^4I_{13/2}$)
N1(x): Number of ions at the amplification lower level ($^4I_{15/2}$)
Ntotal: Number of all ions From (eq. 1) and (eq. 2), the following is provided:

$$\text{Gain}(\lambda,x)=(\sigma e(\lambda)N2(x)-(\sigma a(\lambda)(N\text{total}-N2(x))) \quad \text{(eq. 3)}$$

As indicated by (eq. 3), the parameter is only N2.

Since the cross-section area of induced emission and the cross-section area of induced absorption are determined by the physical properties of ions doped in the amplification medium, N2 must be controlled unchanged, namely the numbers of ions at the amplification upper level and amplification lower level must be kept unchanged, in order to hold the gain spectrum constant.

In WDM signal transmission, the power of input signal light coming in the optical amplifier changes with transmission loss and the number of channels. Such changes lead to changes in the rate of induced emission for $Er^{3+}$ ions at $^4I_{13/2}$ in the case of silica-based EDFA. As a result, N2 changes and consequently the gain spectrum changes, as indicated by (eq. 3).

Thus, in the case of an amplifier using silica-based EDF as the amplification medium where the energy levels related to amplification are only two, the gain spectrum can be maintained constant as indicated by (eq. 3) regardless of the input power level in the optical amplifier, if one signal light wavelength is monitored and the pump light power is controlled so that the gain at this signal wavelength becomes constant.

The follows are the specific steps of the control method of holding the gain constant: branching signal light at the input and output sides of the optical fiber, measuring the power of signal light at each side, calculating the gain of signal light from this measurement, and adjusting the power of pump light so that the discrepancy between the calculated gain and the prescribed value becomes zero. This is the basic operation of the control method for maintaining the gain profile constant in the optical amplifier using silica-based EDF as the fiber for amplifier.

Meanwhile, there are few cases where amplification mechanism can be described by ions only at the amplification upper level and amplification lower level. For instance, when the host glass of the Er-doped fiber is replaced by fluoride glass, an excitation of Er ion to another energy level higher than the amplification upper level and lifetime at the higher level cannot be negligible, even if using the same the induced emission as above one. In such a case, even if the gain at a wavelength (for example, a wavelength in the input signal light) is maintained at a constant level, the gain profile cannot be fixed. This is because the number of ions at the upper level, lower level and other level must be considered when describing the amplification mechanism. For example, in TDFA, the total ion number is expressed by the following equation (eq. 2'), and thus it becomes insufficient to consider the one parameter (N2) alone as in (eq. 3). Namely, in TDFA, the ion number of other level must be considered.

$$N1+N2+N3=N\text{total} \quad \text{(eq. 2')}$$

An optical amplifier using a rare-earth doped optical fiber in which three energy levels relate to amplification greatly included the amplifier using Thulium doped optical fiber (TDF). This optical amplifier has four level transition, but, among them, the energy levels related to amplification greatly is three as shown in FIG. 2B. Namely, Thulium doped optical fiber amplifier (TDFA) has the amplification upper level, amplification lower level and ground level, which are greatly involved in amplification. Since all these levels must be considered, the number of ions at those three levels cannot be held constant only by monitoring the gain at a single wavelength to make it unchanged like the case of EDFA.

Figure 3:
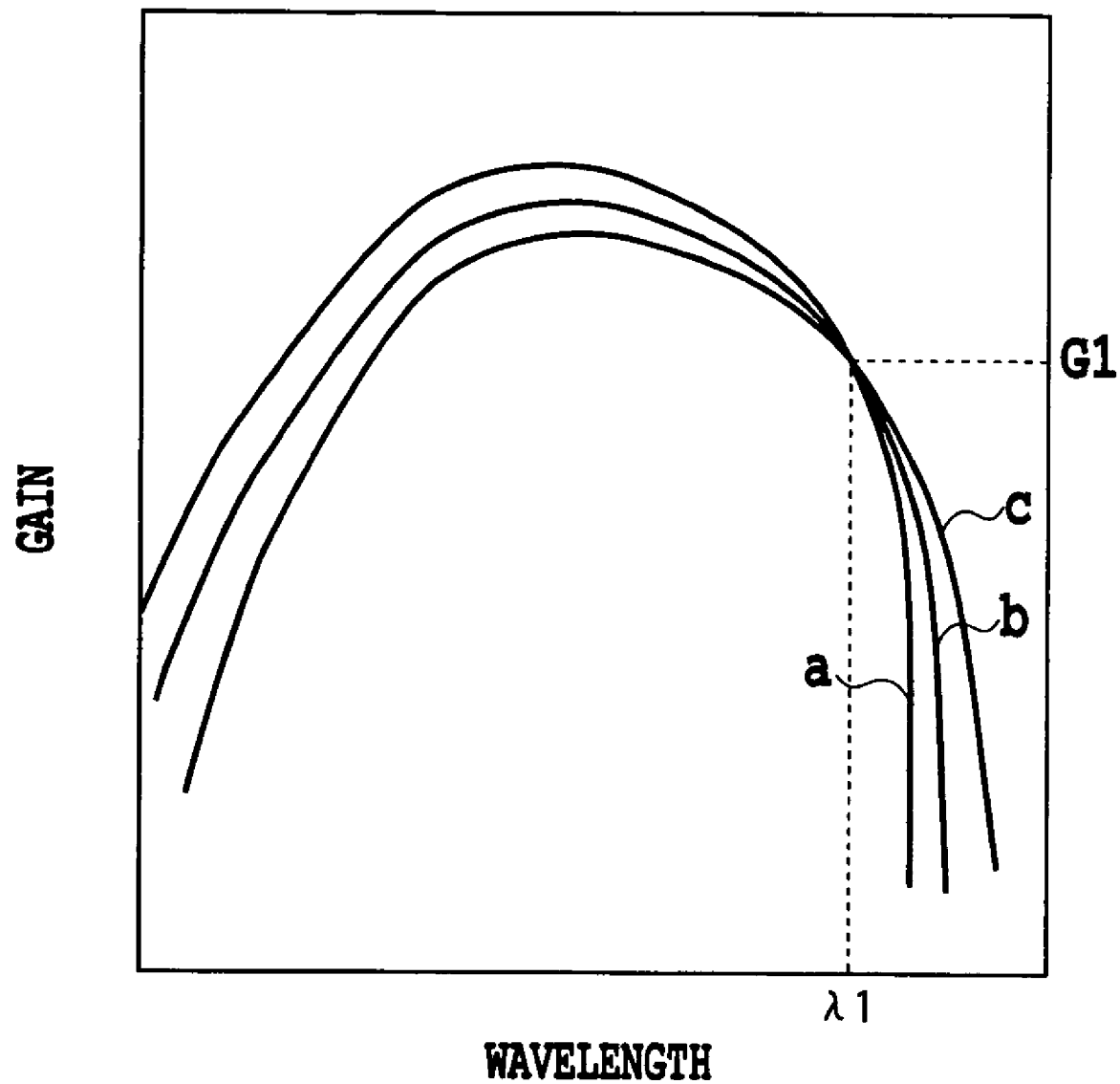
FIG. 3 is a diagram illustrating the result of adjustment of pump light intensity for TDFA under a gain held constant at wavelength $\lambda 1$.

FIG. 3 is a diagram illustrating the characteristics of the optical amplifier observed during amplification of WDM signals when the power of pump light in TDFA is adjusted to make the gain constant that is calculated from the signal light power of wavelength $\lambda 1$ coming in the optical amplifier in TDFA and the signal light power of wavelength $\lambda 1$ coming out from TDFA.

Designated a, b and c in FIG. 3 are the characteristics of the optical amplifier observed when the total input signal power is low (a), medium (b) and high (c). In this measurement, the concentration of Tm ions doped in TDF was 6000 ppm, and the excitation wavelength was 1400 nm. Excitation in Tm-doped fluoride fiber for amplification is a bi-directional excitation that excites the fiber from forward and backward sides. The power ratio between the forward pump power and backward pump power was kept constant. As shown in FIG. 3, even if the gain at a single wavelength is kept constant, the gain profile changes as the power of input signal light changes.

Such a phenomenon also causes in the case of using gain clump employing an oscillator. Namely, the gain at the oscillation wavelength is held constant, but the gains at other wavelengths are not settled in a unique value, and thus a gain profile is not held constant.

The following methods have been proposed as a control method for controlling the amplifier having such three levels which relate to amplification greatly. These control methods are used in the TDFA optical amplifier, which include two methods. One control method is used in TDFA of bi-directional excitation. This method monitors the gains of two kinds of signal light. Based on the monitor result, the power ratio between the forward and backward excitation is controlled to adjust the gain band, and the overall gain is controlled by adjusting the power of total pump light. In TDFA, the gain spectra shift with wavelength if the powder ratio between the forward and backward excitation changes.

As second control method for TDFA, there is a method that controls the intensity of pump light sources at two wavelengths (1.4 μm and 1.56 μm) and adjusts the gain spectrum (see Won Jae Lee et al., "Gain excursion & tilt compensation algorithm for TDFA using 1.4 mm/1.5 mm dual wavelength control", OFC2002, ThZ3.).

In the optical amplifiers using a rare-earth ion doped amplification medium, except for those which the levels related to amplification are substantially two levels, the gain profile cannot be kept constant against fluctuation in input signal levels and other changes in conditions (for example, temperature changes), only by adjusting the intensity of pump light to maintain the gain of a single wavelength constant. In principle, such systems need a complex control that monitors the gains of signal light of two wavelengths.

The optical amplifier of the invention can use an amplification medium where a rare-earth ion of which amplification upper, lower and other levels are involved in amplification is doped. The case where other levels are third level only is described in below, but the present invention is not limited to the case, and includes the case where more levels are related to amplification.

The optical amplifier of the present invention includes those in which the third level is related to energy transition via induced emission, and the lower level or the third level is the ground level. Meanwhile, the control method of the invention holds the gain profile constant in a simple manner by controlling the number of ions at those three energy levels using the following (1)-(4) techniques.

(1) First Technique

In this technique, laser oscillation is performed in the light path including the optical amplifier using energy transition between two of the above three energy levels involved in induced emission. At the same time, an arbitrary input signal light in the wavelength-multiplexed signal light or an input signal light of the same amplification band separately introduced into the amplifier is monitored to hold its gain constant.

(2) Second Technique

In this technique, laser oscillation is performed in the light path including the optical amplifier using energy transition between two of the above three energy levels involved in induced emission. At the same time, the power of input light entered to the optical amplifier and the power of oscillated laser is monitored, gain profile is controlled constantly based on the value obtained from these powers.

(3) Third Technique

In this technique, laser oscillation is performed in the light path including the optical amplifier using energy transition between two of the above three energy levels involved in induced emission. At the same time, the power of light outputted from the optical amplifier and the power of oscillated laser is monitored, gain profile is controlled constantly based on the value obtained from these powers.

(4) Fourth Technique

This is a technique that does not monitor signal light. In this technique, laser oscillation is performed by two transitions between different pairs of the above three energy levels. In other words, a first laser oscillation is performed in the light path including the optical amplifier via a first transition between any pair of energy levels involved in induced emission in the amplification medium. At the same time, a second laser oscillation is performed in the light path including the optical amplifier via a second transition between another pair of energy levels involved in induced emission in the amplification medium.

According to the above first to third techniques (first embodiment), since laser oscillation is performed in a light path including the optical amplifier, the numbers of ions at the two energy levels involved in laser oscillation have a fixed relation. Under such a condition, if the intensity of pump light is further controlled to keep the gain of an arbitrary signal light or power of input light or power of output light constant, the numbers of ions at three levels including the rest level can be uniquely determined. As a result, the gain profile can be fixed.

In the fourth technique (second embodiment), since all the three energy levels are related with laser oscillation, the numbers of ions at three energy levels hold a fixed relation. If it is assumed that the number of rare-earth ions doped in the amplification medium is constant, the numbers of ions in the three energy levels are uniquely determined. As a result, the gain profile can also be determined uniquely.

A plurality of the laser oscillation can be performed in the amplifier in the present invention.

The feature of the above first to third techniques is to hold the gain profile constant by performing laser oscillation in the optical amplifier and at the same time monitoring the gain of an arbitrary signal light, or by performing laser oscillation in the optical amplifier and monitoring the intensities of signal light and oscillated laser. The above first to third techniques can use the following three signals as specific monitor signals; however, these are just examples and others may be used as well.

(I) An electric signal proportional to the gain of at least one signal light, calculated from the ratio between an electric signal converted from the power of light branched from signal light coming into the amplification medium and an electric signal converted from the power of light branched from signal light coming out from the amplification medium (hereinafter, called the first monitoring method). The input signal light may be a signal light for WDM transmission or a separate signal light introduced into the optical amplifier as a monitor signal.

(II) An electric signal which is the sum of or the linear combination of an electric signal converted from the power of light branched from the total input signal light and an electric signal (proportional to the power of oscillated laser) converted from the power of light branched from the oscillated laser at the input side of the amplification medium (hereinafter, called the second monitoring method).

(III) An electric signal which is the sum or the linear combination of an electric signal converted from the power of light branched from the total output signal light and an electric signal (proportional to the power of oscillated laser) converted from the power of light branched from the oscillated laser at the output side of the amplification medium (hereinafter, called the third monitoring method).

In the technique conducting gain control using no monitor signal (the above fourth technique), two oscillations are performed by two optical resonators in the optical amplifier including the amplification medium. In this technique, the wavelengths of the two lasers emitted from the two optical resonators are selected from, for example, the following three wavelengths. In the present invention, the different two wavelengths can be used.

(A) The wavelength of the laser is included within the amplified spontaneous emission (ASE) spectrum of induced emission from the amplification upper level to the lower level (hereinafter, called the first optical resonator).

(B) The wavelength of the laser is included within the amplified spontaneous emission light (ASE) spectrum of induced emission from the amplification upper level to the ground level (hereinafter, called the second optical resonator).

(C) The wavelength of the laser is included in the amplified spontaneous emission light (ASE) spectrum of induced emission from the amplification lower level to the ground level (hereinafter, called the third optical resonator).

According to the first embodiment of the invention, a first optical amplifier that operates on the above principle is provided. The optical amplifier of the invention comprises an amplification medium, an excitation means for exciting the amplification medium, an optical resonator that causes laser oscillation at least one wavelength of amplified spontaneous emission light produced in the amplification medium, a monitoring means that monitors a power of at least one light selected from a power of at least one light with at least one prescribed wavelength band selected from the light inputted to the amplification medium and a power of at least one light selected from a power of at least one light with at least one prescribed wavelength band selected from the light outputted from the amplification medium, and a control unit that controls the excitation means based on a value obtained from monitoring means.

According to the first embodiment of the invention, a first control method that operates on the above principle is provided. The first control method includes for example the a gain profile constant control method using the first optical amplifier, the method comprising the steps of causing laser oscillation at one or more wavelength of amplified spontaneous emission light produced in the amplification medium; and monitoring a power of at least one light selected from a power of at least one light with at least one prescribed wavelength band selected from the light inputted to the amplification medium and a power of at least one light selected from a power of at least one light with at least one prescribed wavelength band selected from the light outputted from the amplification medium by the monitoring means, and controlling an intensity of the pump light source by controlling the excitation means by the control unit based on the value obtained from the monitoring means.

According to the second embodiment of the invention, a second optical amplifier that operates on the above principle is provided. The optical amplifier of the invention comprises an amplification medium, an excitation means for exciting the amplification medium, a plurality of optical resonator that causes laser oscillation at a plurality of wavelengths of amplified spontaneous emission light produced in the amplification medium.

To provide such optical resonators having the above oscillation wavelengths, the optical resonator needs an optical band-pass filter for selecting a wavelength for the resonator or a wavelength selector comparable to the optical band-pass filter. Preferably, it should further comprise a means for controlling loss during one round of travel in the optical resonator at the given laser wavelength, for example, variable or invariable optical attenuator. The devices for controlling loss and wavelength can be incorporated as embedded functions in the optical splitter employed in constructing an optical resonator (for example, means for splitting or combining laser light).

According to the second embodiment of the invention, a second control method that operates on the above principle is provided. The control method includes the a gain profile constant control method using the second optical amplifier, the method comprising causing laser oscillation at a plurality of wavelengths of amplified spontaneous emission light produced in the amplification medium.

In the first and second embodiments, it is preferable that the monitor means comprises optical band-pass filter. The first and second embodiments include the first to third techniques, the first to third monitoring methods, and the first to third optical resonator as described above (1) to (3), (I) to (III) and (A) to (C), respectively.

Now, the principle of the gain profile constant control in the third embodiment of the invention will be described. The feature of the third embodiment of the control method for holding the gain profile constant is that the population inversion in the amplification medium is held constant by adjusting the intensity of control light in accordance with the level of input signal. In other words, the basic concept of the third embodiment is a compensation of input signal level fluctuation with the control light of which wavelength lies in the amplification range. According to the third embodiment, the gain profile is maintained constant by adjusting the control light so that the gain of a wavelength in the amplification range becomes constant for various rare-earth ions doped optical amplifiers. The feature of third embodiment is to monitor a gain in a wavelength (or wavelength region) of a light in order to adjust the control light source. Adjusting the control light source by monitoring the control light or at least one signal light is because the gain spectrum deforms in the method which controls the power of the control light by monitoring a total output or a total input power of the control light and signal light and the gain profile cannot keep constant. Referring FIG. 4 and FIG. 5, this will be described from the case where a control light is controlled by monitoring a total output or input power of control light and signal light.

Figure 4:
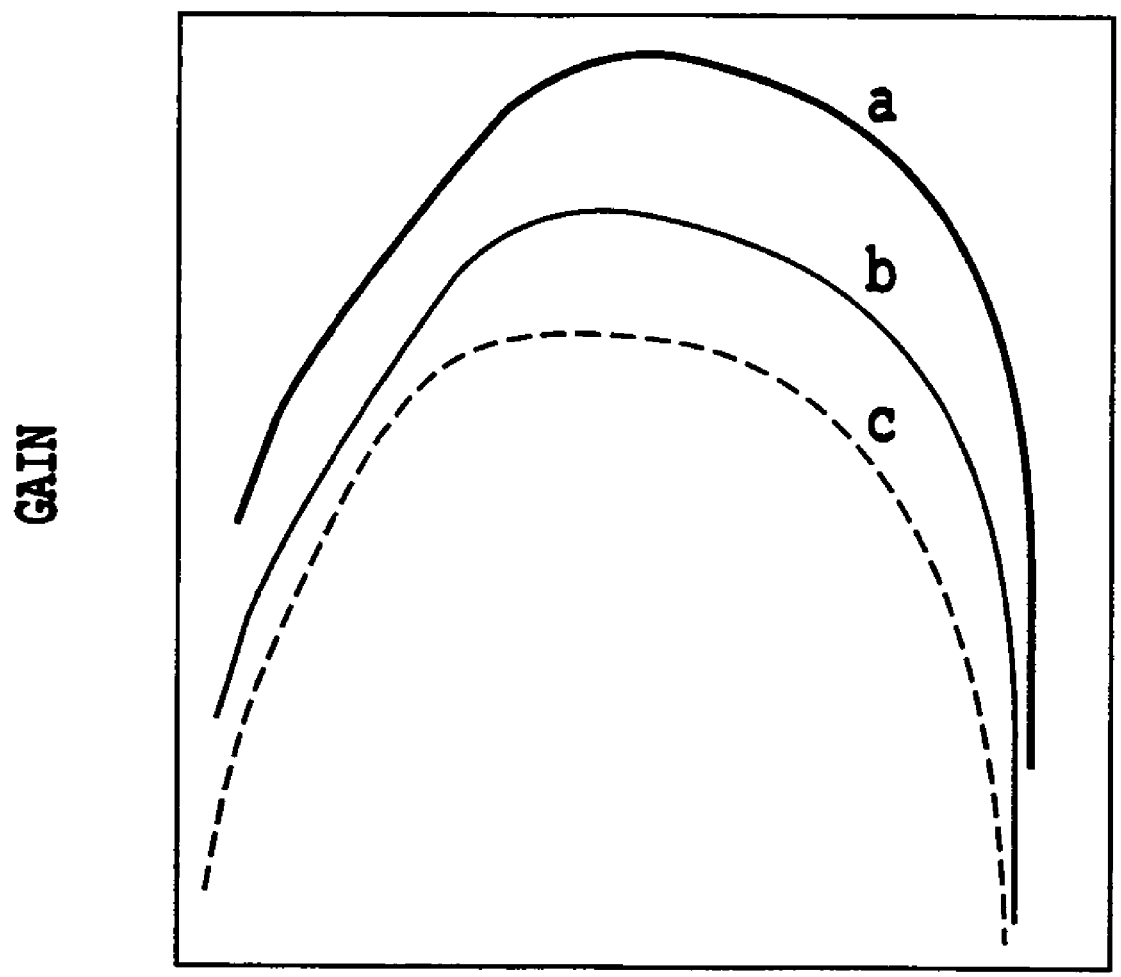
FIG. 4 is a diagram illustrating the gain spectra obtained from adjustment of intensity of the control light source so that the total input power of control light and signal light is always constant.

FIG. 4 illustrates that a gain profile cannot keep constant only by maintaining the total input power constant. FIG. 4 is a diagram illustrating the gain profile observed during amplification of WDM signals when the intensity of a control light in TDFA, which is equipped a control light source outputted the control light with a wavelength within the amplification band other than the wavelength of signal light at input side, is adjusted so that the sum of input power of control light and the power of total input signal light (hereinafter, also called total input power) is kept constant toward the sift of the input of the total signal light power into the optical amplifier.

Designated a, b and c in FIG. 4 are the gain spectra of the optical amplifier observed when the total input signal power is low (a), medium (b) and high (c). In this measurement, the concentration of Tm ions doped in TDF was 4000 ppm, and the excitation wavelength was 1410 nm. Excitation in Tm-doped fluoride fiber for amplification is a bi-directional excitation that excites the fiber from forward and backward sides. The total power of pump lights was kept constant. As shown in FIG. 4, even if the total input power into the optical amplifier is kept constant, the gain profile changes as the power of input signal light changes.

Figure 5:
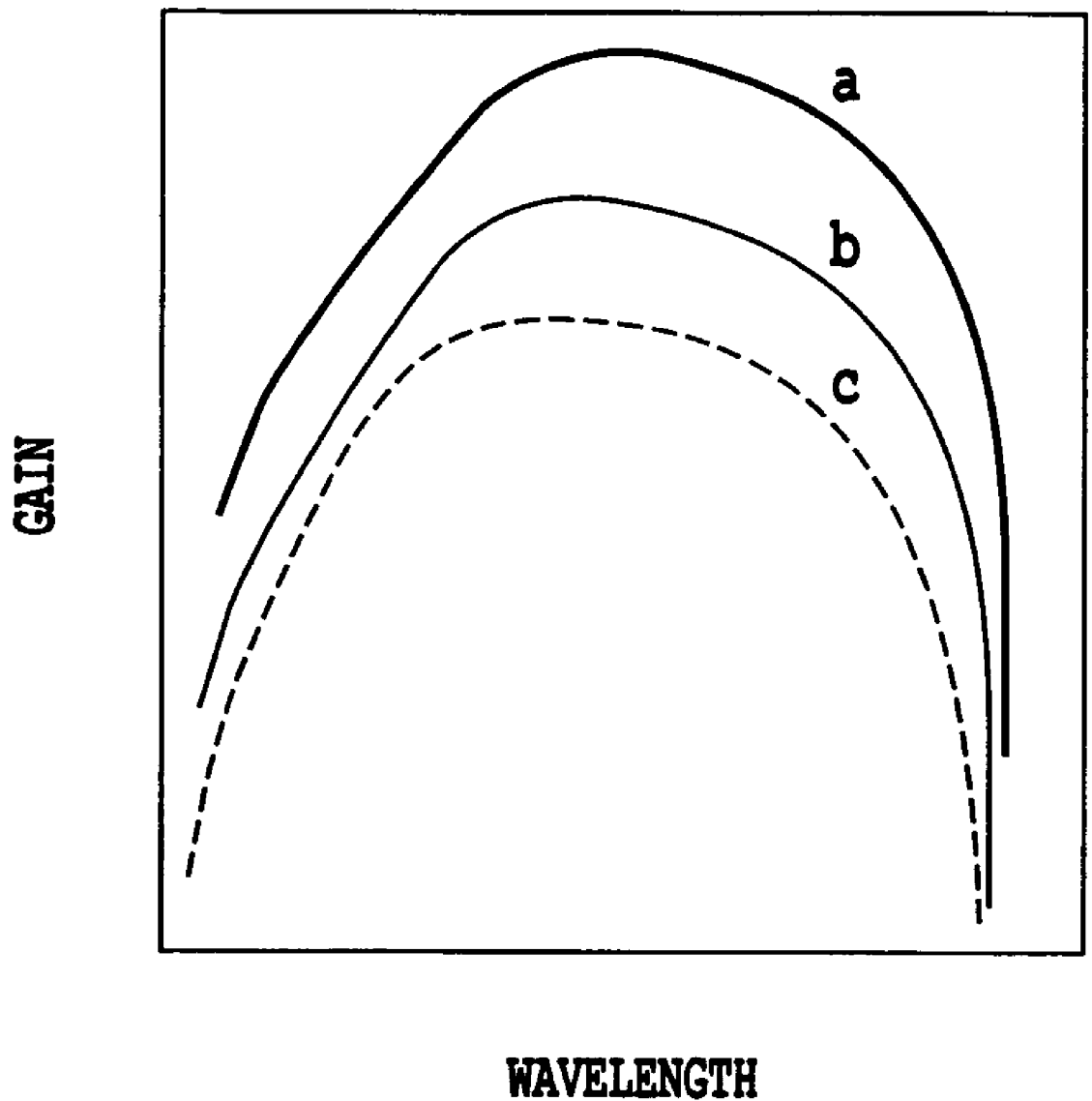
FIG. 5 is a diagram illustrating the gain spectra obtained from adjustment of intensity of the control light source so that the total output power of control light and signal light is always constant.

FIG. 5 illustrates that a gain profile cannot keep constant only by maintaining the total output power constant. FIG. 5 is a diagram illustrating the gain profile observed during amplification of WDM signals when the intensity of a control light in TDFA, which is equipped a control light source outputted the control light with a wavelength within the amplification band other than the wavelength of signal light at input side, is adjusted so that the sum of output power of control light and the power of total output signal light (hereinafter, also called total output power) is kept constant toward the sift of the input of the total signal light power into the optical amplifier.

Designated a, b and c in FIG. 5 are the gain spectra of the optical amplifier observed when the total input signal power is low (a), medium (b) and high (c). In this measurement, the concentration of Tm ions doped in TDF was 5000 ppm, and the excitation wavelength was 1420 nm. Excitation in Tm-doped fluoride fiber for amplification is a bi-directional excitation that excites the fiber from forward and backward sides. The total power of pump lights was kept constant. As shown in FIG. 5, even if the total output power into the optical amplifier is kept constant, the gain profile changes as the power of input signal light changes.

As described above, even if the total input power or the total output power is kept constant, the gain spectrum cannot be held constant.

The optical amplifier of the third embodiment of the invention comprises an amplification medium, an excitation means for exciting the amplification medium, one or more control light source that can control population inversion state of the amplification medium by inputting the control light with a wavelength in the amplification band of the amplification medium into the amplification medium and changing a power of the inputted control light, a monitor means that monitors powers of lights inputted into and outputted from the amplification medium, and a control unit where a gain is calculated from lights inputted into and outputted from the amplification medium from values obtained from the monitoring means and controls the control light source so that the calculated gain is matched with a prescribed value or an externally decided value.

The optical amplifier of the third embodiment has a means for controlling the intensity of control light emitted from the control light source. This means includes controlling the current in the control light source and controlling the degree of attenuation with a variable attenuator installed in the output side of the control light source.

The third embodiment of the invention includes the optical amplifier which comprises an amplification medium, an excitation means for exciting the amplification medium, one or more control light source that can control population inversion state of the amplification medium by inputting the control light with a wavelength in the amplification band of the amplification medium into the amplification medium and changing a power of the inputted control light, a monitor means that monitors powers of lights at a plurality of wavelengths inputted into and outputted from the amplification medium, and a control unit where gains are calculated from lights at the plurality of wavelengths inputted into or outputted from the amplification medium from values obtained from the monitoring means, then calculates the difference and the sum of the plurality of gains, and controls the control light source so that the difference calculated from the plurality of gains is matched with a prescribed value or an externally decided value and controls the excitation means so that the sum calculated from the plurality of gains is matched with a prescribed value or an externally decided value.

In the present invention, the monitor means may include those which monitors the control light, at least one channel of signal light, or the light with the prescribed wavelength within the amplification band of the optical amplifier.

In the third embodiment, preferably, according to the value obtained from the monitoring means, a correction means for corrects the value from the monitoring means, or the gain, the difference of gains or the sum of gains calculated from the control unit.

Further, it is preferable that the third embodiment includes an optical band-pass filter.

Furthermore, the present invention includes a third control method according to the principle of the third embodiment as described above.

One example of the gain profile constant control method of an optical amplifier of the third embodiment is the method for the optical amplifier that comprises a rare-earth doped optical fiber or rare-earth doped optical waveguide serving as an amplification medium where rare-earth ions have been doped in its core and/or clad, an excitation means for exciting the amplification medium, one or more control light source that can control of population inversion state of the amplification medium by changing a power of a inputted control light, a monitor means, and control unit. The method comprises steps of: inputting the control light with a wavelength in the amplification band of the amplification medium into the amplification medium; monitoring powers of the light inputted into and outputted from the amplification medium; and calculating a gain of the light inputted into or outputted from the amplification medium and controlling the control light source so that the calculated gain is matched with a prescribed value or an externally decided value.

In the present invention, an optical fiber in the optical amplifier of the present invention may be doped with one or more rare earth ion.

Now the optical amplifier and gain profile constant control method of the present invention will be described further specifically with reference to the accompanying drawings. These are, however, just examples, and the invention is not limited to such specific examples.

Figure 6:
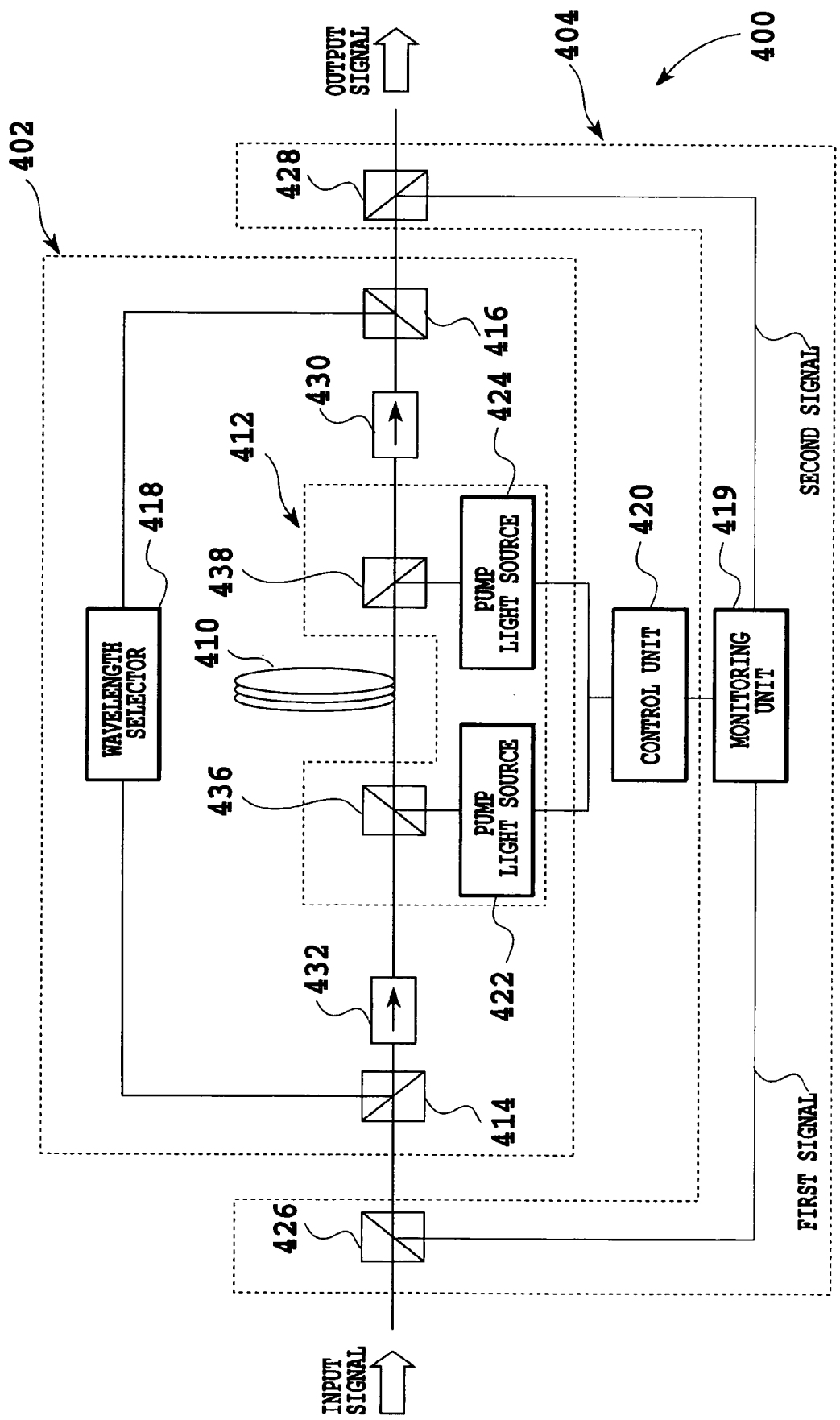
FIG. 6 is a diagram illustrating a first embodiment of the optical amplifier of the invention.
Figure 7:
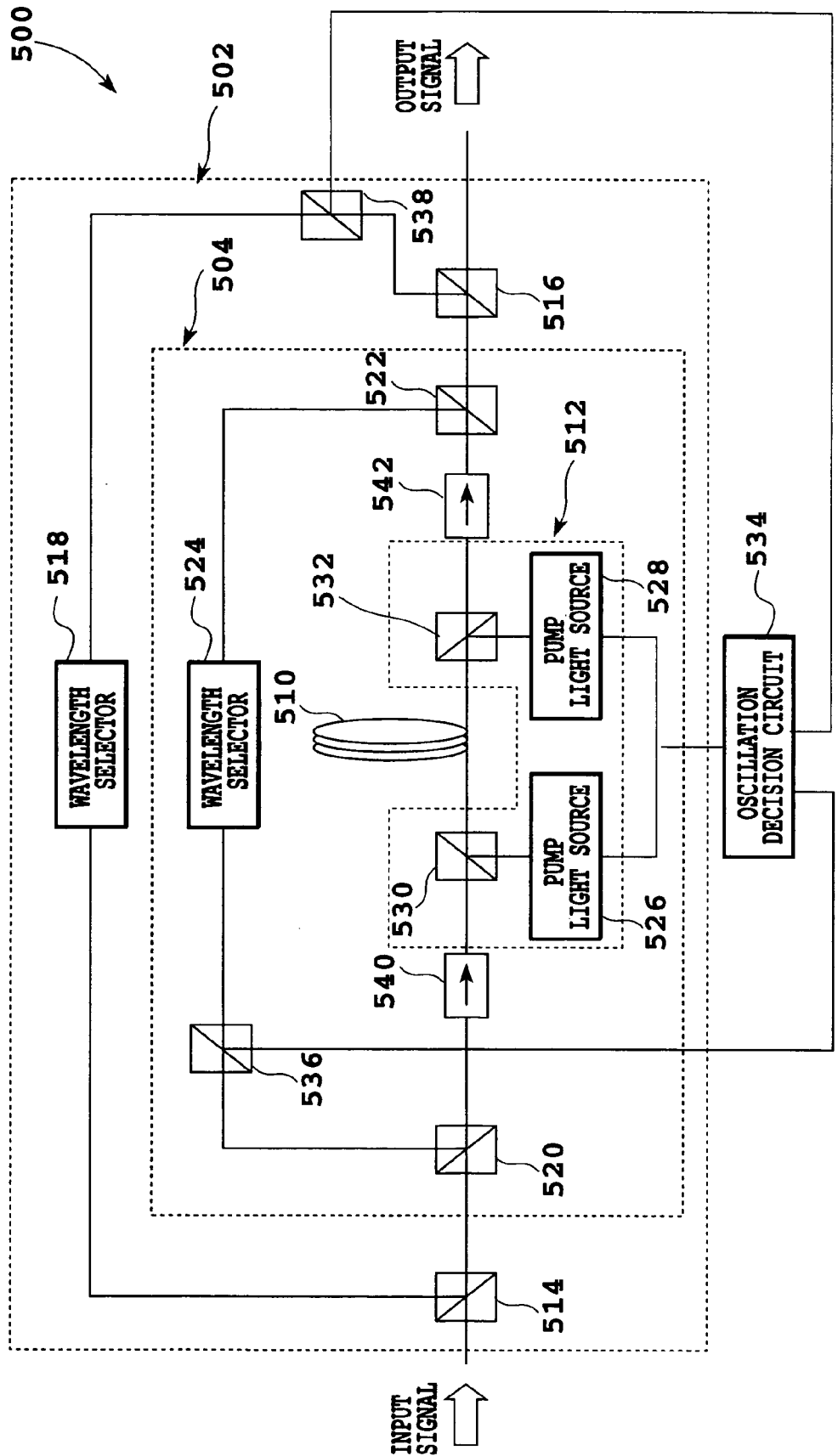
FIG. 7 is a diagram illustrating a second embodiment of the optical amplifier of the invention.

The first embodiment of the invention relates to an optical amplifier including an optical resonator forming a loop between the output side and input side of the optical amplifier. FIG. 6 shows the schematic structure of the optical amplifier of the first embodiment, while FIG. 7 shows that of the second embodiment.

The optical amplifier 400 (FIG. 6) of the first embodiment is an optical amplifier equipped with an optical resonator 402, a monitoring means 404 and control unit 420. The optical resonator 402 is equipped with an amplification medium 410, an excitation means 412, optical splitters 414, 416 and a wavelength selector 418. The monitoring means 404 monitors a power of at least one light selected from a power of at least one light with at least one prescribed wavelength band selected from the light inputted to the amplification medium and a power of at least one light selected from a power of at least one light with at least one prescribed wavelength band selected from the light. The control unit 420 controls the excitation means 412 based on the value from the monitoring means. In the present embodiment, the monitoring means includes the optical splitter 426, 428 for inputting the light to be monitored into the control unit.

The amplification medium 410 can be a rare-earth doped optical fiber where a rare-earth element has been doped in the core and/or clad. Particularly, the present invention can use the Thulium doped optical fiber, Erbium doped optical fiber and Holmium doped optical fiber, for example. Specifically, the amplification medium may be a rare-earth ion doped optical fiber of which host glass is silica glass, Bismuth-based glass, fluoride-based ZBLAN glass of little non-radiation transition, In—Pb glass or Tellurite glass, for example. Rare-earth ion used in the present invention is not limited, but it is preferably to use Thulium ion ($Tm^{3+}$), Holmium ion ($Ho^{3+}$) or Erbium ion ($Er^{3+}$). The rare-earth ion can be used alone or in combination.

The excitation means 412 includes pump light sources 422, 424 and couplers 436, 438 that combine light from the pump light sources. These light sources are those commonly used for exciting rare-earth doped fibers. For example, they are semiconductor laser diode (LD) and InGaAs distorted quantum well LD, for example. Specifically, they are, for example, solid lasers such as Nd-YLF laser, Nd-YAG laser, Ti sapphire laser, semiconductor lasers or fiber lasers. The optical amplifier shown in FIG. 6 is excited from its front and back sides. However, the present invention is not limited to this example but may be excited from either front or back side only.

The optical splitters are fusion spliced fibers (split type, wavelength division multiplexing type), dielectric multi-layered films, or circulators combined with fiber gratings, which are devices that sample part of the input signal and/or amplified spontaneous emission light (ASE) by reflection.

The wavelength selector used in the oscillation system includes optical filters such as dielectric multi-layered films and fiber gratings.

In the invention, the optical resonator may include a variable optical attenuator or the like. In the optical resonator of the invention, oscillation takes place when the gain of the amplification medium agrees with the loss during one round of travel in the oscillation system. Using a variable optical attenuator or the like, it becomes possible to control the relationship between the gain of the amplification medium and the loss during one round of travel in the oscillation system.

As couplers, common couplers such as pump light/signal light optical couplers may be used.

In the monitoring means 404, the monitored signals (hereinafter referred monitor signal) (first signal and second signal in FIG. 6) branched off by the optical splitters 426, 428 come in the monitoring unit 419. The control unit performs a calculation based on the information from the monitoring unit. The monitoring means may include an optoelectronic transducer that converts the monitor signals divided at the optical splitters 426, 428 to electric signal. The optoelectronic transducer converts a monitor signal to an electric signal. In the present invention, the monitor signal or electric signal is monitored.

The control unit 420 includes, for example, a differential signal generating circuit, a gain signal calculation circuit (division circuit), and combination thereof; and adder circuit and linear coupler circuit. In the present invention, the monitoring means and the control unit are those which perform the following controls.

(i) The monitoring means monitors an inputted power and an outputted power of at least one signal light; and the control unit calculates a signal gain based on the value obtained from the monitoring means, and controls the excitation means so that the signal gain agree with a prescribed value or an externally decided value.

(ii) The monitoring means monitors a power of a laser oscillation light at the input side of the amplification medium in the resonator and a power of signal light inputted to the amplification medium; and the control unit calculates a sum of the laser oscillation light power and the signal light power obtained from the monitoring means, or the value obtained from a linear combination of the laser oscillation light power and the signal light power, and controls the excitation means so that the value agrees with a prescribed value or an externally decided value.

(iii) The monitoring means takes out simultaneously part of the laser oscillation light in the optical resonator at signal input side of the amplification medium and part of the input signal entering the optical amplifier, and monitors the total power thereof, and control unit controls the excitation means so that the value from the monitoring means agrees with a prescribed value or an externally decided value.

(iv) The monitoring means monitors a power of a laser oscillation light at signal output side of the amplification medium in the resonator and a power of signal light outputted from the amplification medium; and the control unit calculates a sum of the laser oscillation light power and the signal light power obtained from the monitoring means, or the value obtained from a linear combination of the laser oscillation light power and the signal light power, and controls the excitation means so that the value agrees with a prescribed value or an externally decided value.

(v) The monitoring means takes out simultaneously part of the laser oscillation light in the optical resonator at signal output side of the amplification medium and part of the signal light outputted from the optical amplifier, and monitors the total power thereof; and control unit controls the excitation means so that the value from the monitoring means agrees with a prescribed value or an externally decided value.

Preferably in the first embodiment, isolators 430, 432 are installed, as shown in FIG. 6.

The configuration of components in the optical resonator and control unit are not limited to that shown in FIG. 6 but may be varied.

The control method for holding the gain profile constant in the first embodiment takes out part of the input signal entering the optical amplifier and/or the amplified spontaneous emission light (ASE) in the amplification medium of the optical amplifier, and oscillates it. The monitored signals (hereinafter referred monitor signal) (first signal and second signal in FIG. 6) comes in the control unit 420. The control unit performs a calculation based on the information from the monitoring unit. In the present invention, the monitor signal or electric signal is monitored.

In the present invention, the monitoring means and the control unit perform the controls as described above (i) to (v).

Now the control method using the optical amplifier of the invention (operation of the optical amplifier of the invention) will be described specifically below. The following is the description of the single-path configuration; however, the present invention can use the double-path configuration and bi-directional amplification.

The signal light comes in from the left side in FIG. 6, and part of this light is branched off by an optical splitter 426. The branched signal light is then entered to the monitoring unit 419 as the first signal. The first signal is preferably an electric signal. Thus, in the present embodiment, the monitor signal light is preferably converted into an electric signal by an optoelectronic transducer and the like that converts the branched signal light into an electric signal. The signal light that has passed the optical splitter 426 now goes through the optical splitter 414, isolator 432 and coupler 436, and enters the amplification medium 410.

Pump light is supplied to the amplification medium 410 from its front and back sides via couplers 436, 438. Amplified signal light goes out the system after passing an isolator 430 and optical splitters 416, 428. The optical splitter 428 split part of the signal light to monitor part of the output signal light. The light branched here enters the monitoring unit 419 as the second signal. This second signal is also preferably an electric signal. Thus, in this embodiment, the branched signal light is preferably converted into electric signal by an optoelectronic transducer and the like that converts the branched signal light into an electric signal.

A monitored light is WDM light of a number of wavelengths of at least one channel, or light of a wavelength in the amplification band that is entered to the optical amplifier separately. In the present invention, the signal light is preferably the signal that is monitored by the monitoring means as described above (i) to (v).

The first and second signals enter the control unit 420 via the monitoring unit 419, and values such as the gains of those input signals is calculated, and current values of the pump light sources are calculated so that the values agree with a prescribed value. The pump light sources 422, 424 are controlled so that the intensities of the pump light sources become the current value. The control unit performs operations and controls as described in above (i) to (v).

The signal light and ASE light coming out from the isolator 430 are sampled by the optical splitter 416, and the sampled light is returned to the amplification medium 410 via the wavelength selector 418 and the optical splitter 414. In the present embodiment, the optical resonator is a loop formed by at least an amplification medium 410, an excitation means 412, optical splitters 414, 416 and a wavelength selector.

The oscillation wavelength of this optical resonator is determined by the employed optical splitters 414, 416 that have wavelength-dependence for splitting or a function of the wavelength selector 418 or both. The optical resonator oscillates at the point where the loss in one round of travel in the resonator becomes equal to the gain of the amplification medium 410 at the oscillation wavelength. If a stable oscillation is continuously provided, the gain of the amplification medium 410 does not change at the oscillation wavelength selected by the wavelength selector and the like, even when pump light of a power higher than necessary for such oscillation is injected from the pump light source.

As described above, laser oscillation is induced by an optical resonator in the optical amplifier, and light intensity of the pump light source is controlled so that the gain profile becomes constant with monitoring by the monitoring means described above (i) to (v).

The second embodiment of the invention is an optical amplifier equipped with two or more resonators and control method for holding their gain profiles constant.

FIG. 7 is the schematic diagram illustrating the configuration of the optical amplifier of the second embodiment. FIG. 7 shows the optical amplifier equipped with two oscillators. The following explanation is based on the construction. The optical amplifier 500 of the present embodiment includes a first optical resonator 502 and second optical resonator 504. The first optical resonator 502 has an amplification medium 510, an excitation means 512 for exciting this medium, optical splitters 514, 516 and a wavelength selector 518. The second optical resonator 504 has an amplification medium 510, an excitation means 512 for exciting this medium, optical splitters 520, 522 and a wavelength selector 524.

The excitation means 512 includes pump light sources 526, 528 that excite the amplification medium, and couplers 530, 532 that combine light beams from the pump light sources. Excitation by the optical amplifier shown in FIG. 7 is bi-directional, but either forward or backward excitation may be employed in the invention.

Referring now to FIG. 7, the present embodiment may have an oscillation decision circuit 534 for maintaining oscillation in the two resonators. The oscillation decision circuit forms an oscillation decision means along with optical splitters 536, 538 that sample part of oscillation light from each resonator. For example, the optical splitters 536, 538 sample signal lights, and they are converted into electric signals by an optoelectronic transducer or the like. The electric signals enter the oscillation decision circuit 534.

This embodiment may also employ a variable optical attenuator and the like in the optical resonator. As mentioned above, the optical resonator of the invention oscillates at the point where the gain of the amplification medium agrees with the loss in one round of travel in the oscillation system. By introducing a variable attenuator and the like, it becomes possible to control the relationship between the gain of the amplification medium and the loss in the one round of travel in the oscillation system.

As shown in FIG. 7, the second embodiment preferably has isolators 540, 542.

The constituting elements such as optical components and oscillation decision circuit used in the optical resonators may take various configurations other than that shown in FIG. 7 in the embodiment.

The components used in the first embodiment may be used also in this embodiment.

Now the control method (operation of the optical amplifier of the invention) using the optical amplifier of the present embodiment will be specifically described below. The following description adopts a single-path configuration, but the present invention may employ the double-path configuration or a configuration using a bi-directional optical amplifier.

Signal light enters the amplification medium 510 via optical splitters 514, 520, an isolator 540, and a coupler 530. The signal light from the amplification medium 510 leaves the system via the coupler 532, isolator 542 and optical splitters 522, 516.

Preferably, the present embodiment has an oscillation decision circuit for maintaining oscillation in the first and second resonators. Light in the first resonator is split off by the optical splitter 538 and then entered to the oscillation decision circuit 534 as a monitor signal. In turn, light in the second resonator is split off by the optical splitter 536 and then entered to the oscillation decision circuit 534 as a monitor signal. The light serving as a monitor signal is preferably converted into an electric signal by an optoelectronic transducer or the like. Based on the two monitor signals, the intensity of pump light emitted from each of the pump light sources 526, 528 are adjusted so that the two resonators may oscillate.

The third embodiment of the invention relates to an optical amplifier configured to use control light for holding the gain profile of the optical amplifier constant.

Control light is introduced in the optical amplifier, and the gain profile of the optical amplifier is controlled to be constant with reference to this control light. The feature of the third embodiment is to monitor a gain at a wavelength (or a wavelength region) of a light in order to adjust a control light source.

Now the third embodiment is described with reference to FIG. 8.

The optical amplifier 600 of the third embodiment has monitoring means 601, 603, an amp unit 602 and a control system 604. The monitoring means 601 is constructed by an optical detector included in the control light source 610. The monitoring means 603 is constructed by an optical splitter 634 and an optical detector 635 such as an optoelectronic transducer. The monitoring means 601 shown in FIG. 8 is an example where the optical detector is included in the control light source 610, but the present invention is not limited thereto, the optical detector may be provided separately. In such a case, an optical splitter (splitter) is provided to the optical amplifier, and part of signal light input may be split. The signal from the optical detector is inputted to the control system. The optical detector includes an optoelectronic transducer or the like, for example. The amp unit 602 comprises a control light source 610, amplification medium 612, pump light sources 614, 616, coupler 618 combining light from the control light source, and couplers 620, 622 that combine light from the pump light sources. Referring to FIG. 8, the amp unit preferably has isolators 624, 626.

The control light source 610 may preferably contain a photodetector. In the third embodiment, the control light source is not limited to such a case, and it does not need to contain the photodetector therein. In the case where the control light source 610 contains the photodetector, it can transmit a first signal 628 for monitoring. In the third embodiment, one or more control light source may be present in the optical amplifier.

The control system 604 has a control unit 630 that controls the control light source and a calculation unit 632. To this calculating unit, a second signal 636 is sent from the optical splitter 634 that samples part of the output light from the amp unit 602. The calculation unit 632 calculates the gain of control light from the first signal provided by the control light source 610 and the second signal provided by the optical splitter 634, and then calculates a current for the control light source 610 so that the gain becomes equal to a prescribed value. The calculation result is sent to the control unit 630. The control unit 630 controls the intensity of control light in the control light source 610 in accordance with the current value sent from the calculation unit 632. The control system 604 is also referred as control unit in the specification. In such a case, the control unit includes control unit 630 and the calculation unit 632 having the above functions.

Figure 8:
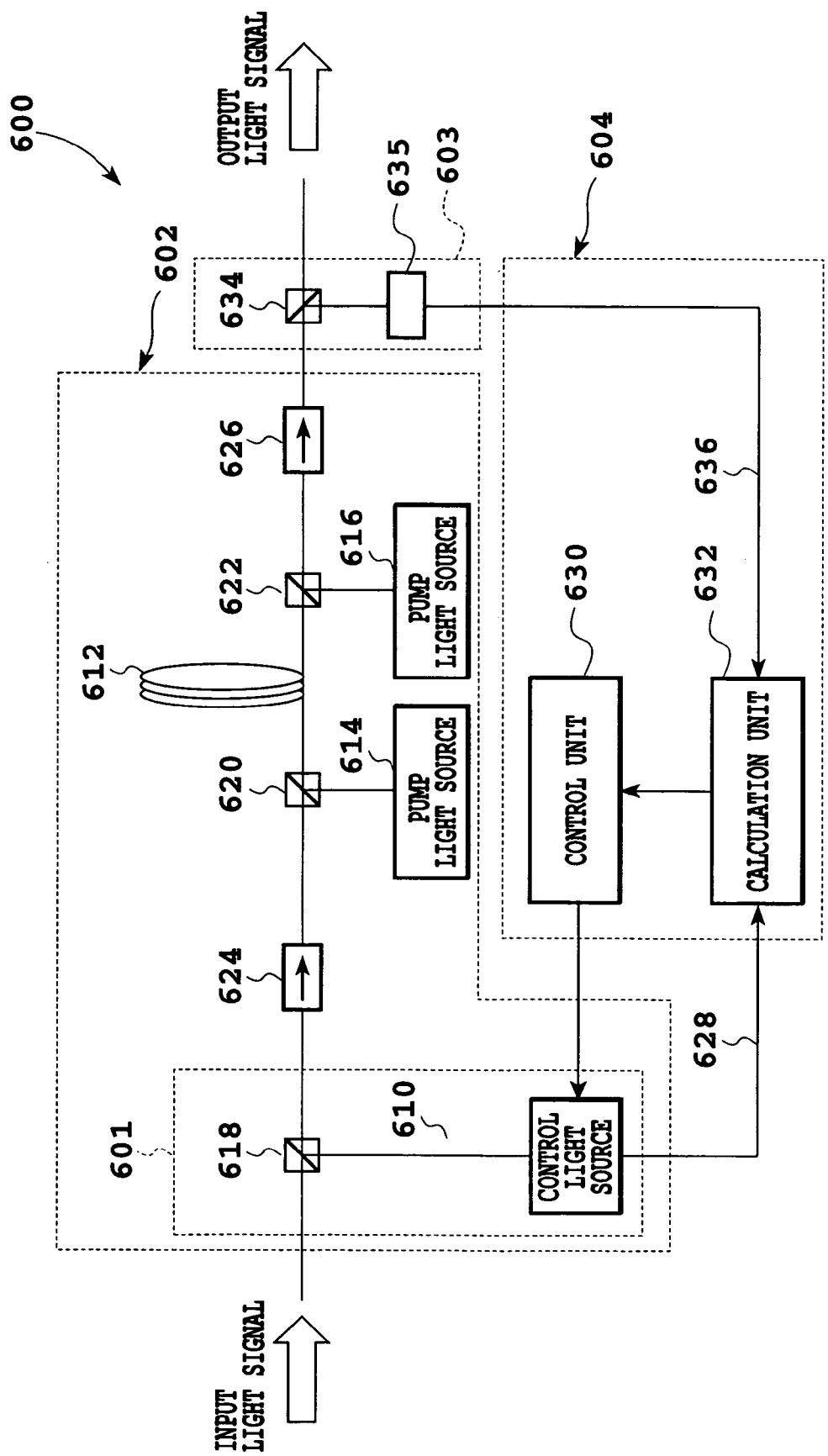
FIG. 8 is a diagram illustrating a third embodiment of the optical amplifier of the invention.

The constituting elements comprising the optical resonators of the embodiment may take various configurations other than that shown in FIG. 8. For example, the optical amplifier shown in FIG. 8 takes a configuration of bi-directional excitation, but the present invention may employ either forward or backward excitation.

The components used in the first embodiment can be used also in this embodiment.

Specifically, the amplification medium may be a rare-earth ion doped optical fiber of which host glass is silica glass, Bismuth-based glass, fluoride-based ZBLAN glass of little non-radiation transition, In—Pb glass or Tellurite glass, for example. Rare-earth ion is not limited, but it is preferably to use Thulium ion ($Tm^{3+}$), Holmium ion ($Ho^{3+}$) or Erbium ion ($Er^{3+}$). The couplers and splitters may be fusion spliced fibers (split type, wavelength division multiplexing type), dielectric multi-layered films, or circulators combined with fiber gratings. The control light source that emits control light and the pump light sources that emit pump light are, for example, solid lasers such as Nd-YLF laser, Nd-YAG laser, Ti sapphire laser, semiconductor lasers or fiber lasers.

Now the control method (operation of the optical amplifier of the invention) using the optical amplifier of the present embodiment will be specifically described below. The following explanation is a case where the optical detector in the monitoring means 601 is included in the control light source, and a gain of a control light is monitored.

Signal light is combined by the coupler 618 with control light provided by the control light source 610. Next, the combined signal light passing through the isolator 624 is combined by the coupler 620 with pump light sent from the pump light source 614. The signal light combined with pump light enters the amplification medium 612. The amplification medium is excited by the pump light sources 614, 616 from both sides. Signal light coming out from the amplification medium passes the coupler 622 and the isolator 626, and split by the splitter 634. Part of the signal light that is not split at the splitter 634 is outputted as output signal light.

The control light injected from the control light source to the optical fiber 612 is detected by a photodetector inside the control light source 610, and the power of the control light is sent to the calculation unit 632 as the first signal. The control light coming out from the amplification medium is split by the splitter, and the power of the control light is sent to the calculation unit 632 as the second signal 636. The powers of control light at the input and output sides are preferably converted into electric signals before entering the calculation unit 632.

The calculation unit 632 calculates the gain of control light based on the received detected value, calculates a current for the control light source 610 so that the gain becomes equal to the prescribed value, and this value is sent to the control unit 630. The control unit 630 adjusts the light intensity of the control light source 610 so that the current becomes equal to the value sent from the calculation unit 632.

Because the wavelength of control light falls in the amplification band, the gain profile can be held constant by adjusting the control light so that the gain of control light becomes constant.

In the present embodiment, the signal inputted to the calculation unit is not limited to the signal based on the control light. The signal includes one which is based on at least one channel signal light, or which is based on a light within a prescribed wavelength band in an amplification band. In the control method of the present embodiment, correction is made to correct the value from the monitoring means, or the gain, the difference of gains and the sum of gains that are calculated in the control unit in accordance with the value obtained from the monitoring means by correction means.

In the present embodiment, preferably, the monitoring means comprises an optical band-pass filter, and a monitor signal is passed through the filter.

In the optical amplifiers of the above embodiments, the direction the signal light travels in the amplification medium was not specified. However, the optical amplifier may take (a)-(c) configurations, and the signal light may travel in the direction shown below.

(a) An optical isolator is connected to either of the input or output side of the amplification medium or both of them. Signal light travels only one direction in the amplification medium (called the single-path in this specification).

(b) An optical circulator is connected to either side of the amplifier, and the other side is connected to a device having a mirror function that reflects at least single light. Signal light travels in the amplification medium via the optical circulator, and then the 1 is amplified. Next, the single light is reflected by the mirror and travels in the reverse direction in the amplification medium for amplification. Amplified signal light goes out via the circulator (called the double-path in the specification). Considering the above first to third monitoring methods where an optical splitter is installed for sampling a monitor signal from signal light, it can be installed in each of the signal output port that is disposed via an optical circulator with looking from the optical amplifier side. The optical splitting means may be installed between the optical circulator and the amplification medium. In this case, the directivity of the optical splitting means can be used to distinguish the input side monitoring signal from the output side monitoring signal.

(c) An optical circulator is connected to both sides of the amplification medium. Two signal lights travel in different directions in the amplification medium simultaneously or in separate time periods for amplification (hereinafter, called the bi-directional optical amplifier). In this case, considering the above first to third monitor methods, an optical splitting means is installed to sample a monitor signal from the signal light, and its position may be input and output side of the amplification medium with reference to either of the signal lights traveling in opposite directions. Specifically, the splitting means may be disposed outside of the circulator or between the circulator and the amplification medium.

EXAMPLES

Now the embodiments of the invention will be described with reference to the accompanying drawings.

Example 1

The present example is an example of a first embodiment of the invention, and particularly relates to an optical amplifier and control method according to above (1).

Figure 9A:
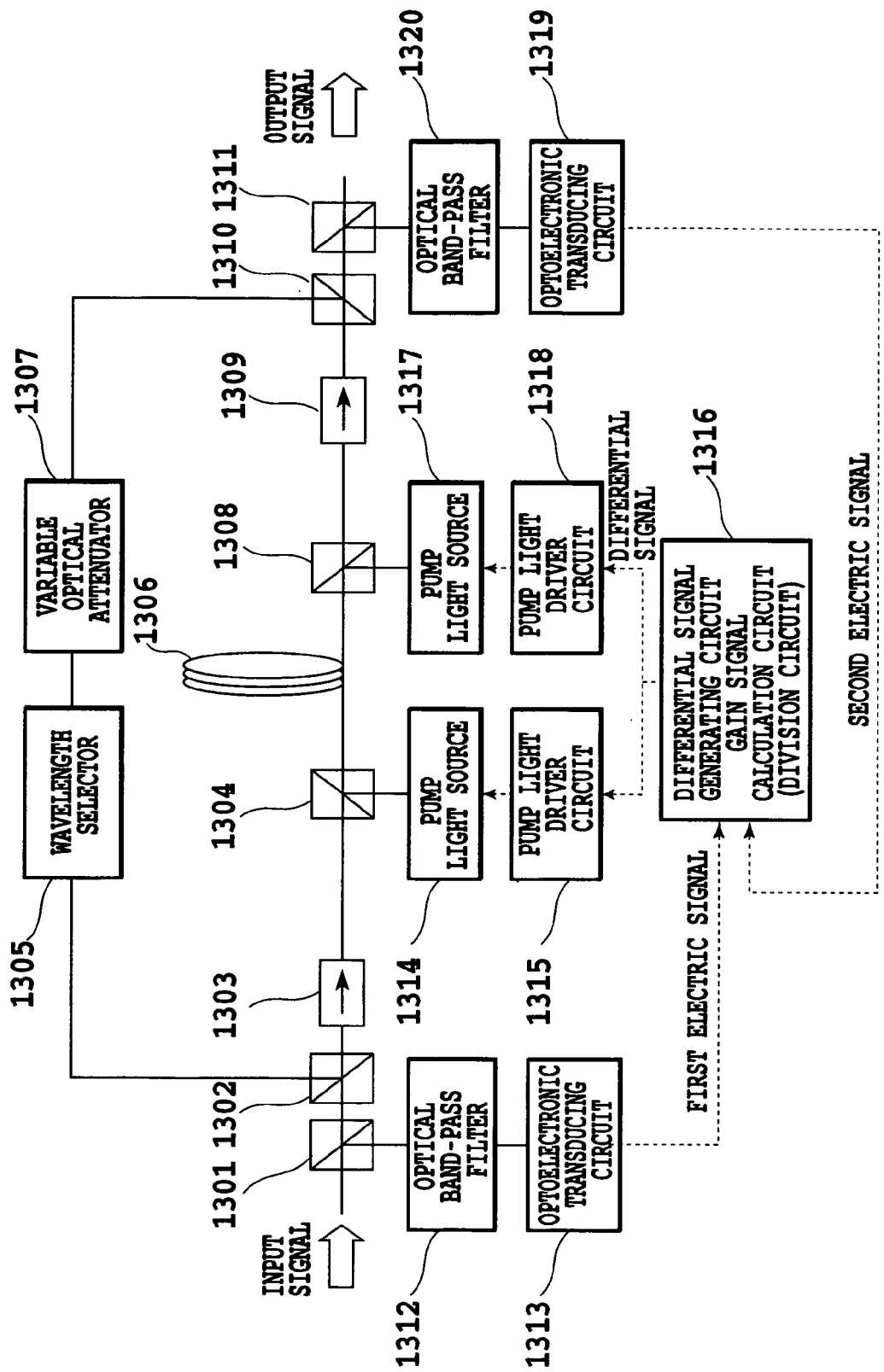
FIG. 9A is a diagram illustrating Example 1 of the optical amplifier of the invention.

FIG. 9A is a diagram illustrating the optical amplifier of the invention. Referring now to FIG. 9A, the optical amplifier of the invention includes an optical resonator, monitoring means, and a control unit. The optical resonator includes an amplification medium 1306, pump light sources 1314, 1317 for exiting the amplification medium, a wavelength selector 1305, a variable optical attenuator 1307, optical splitters for branching signal light to the wavelength selector and variable attenuator, and an optical splitter 1302 for combining signal light coming from the wavelength selector and variable attenuator. The monitoring means has an optical splitter 1301 for sampling the first monitored signal light, splitter 1311 for sampling the second monitored signal, control unit 1316, optical band pass filters 1312, 1320 for permitting only wavelengths common in the first and second monitored signal lights, and optoelectronic transducing circuits 1313, 1319 for converting these monitored signal lights into electric signals. The control unit has pump light driver circuits 1315, 1318 for controlling the pump light sources. The present example is an example of bi-directional excitation, but the invention is not limited to this example and may use either forward or backward excitation.

The employed amplification medium 1306 was glass where Tm was doped to host glass, ZBLAN glass, which was one of fluoride-based glasses. The concentration of doped Tm ions was 6000 ppm. The Tm-dope ZBLAN fluoride-based fiber was 5 m. The pump light sources 1314, 1317 were semiconductor lasers of which oscillation wavelengths were 1400-1430 nm. The optical splitters 1301, 1311 in the monitor signal light sampling areas were mirrors made of dielectric multi-layered films capable of sampling 1% of incident signal light by reflection.

The light signals were 16 wavelengths in the 1480-1510 nm range at intervals of 2 nm. The optical band-pass filters 1312, 1320 permitting light of which central wavelength was 1480 nm of a 0.8 nm half-width. The optoelectronic transducing circuits 1313, 1319 were InGaAs-PIN-PDs. The optical splitters 1302, 1310 comprising the optical resonator had a loss of 0.2 dB or less in 1480-1510 nm, and a splitting ratio of 95% in 1513-1516 nm.

The wavelength selector 1305 was a dielectric multi-layered film permitting light of which central wavelength was 1513 nm of a 0.8 nm half-width with a loss of 0.5 dB. The variable optical attenuator 1307 was controlled so that the loss in 1513-1516 nm during one round of travel in the optical resonator was 18 dB. The variable attenuator was a device used in common optical amplifiers.

The monitoring means 1316 included a division circuit for calculating the gain of signal light based on the ratio between the first monitor signal (the first electric signal in this example) and second monitor signal (the second electric signal in this example). More specifically, it included a differential signal generating circuit that generated differential signal and a gain signal calculating circuit (division circuit).

Now the operation of the optical amplifier of the invention will be specifically described with reference to the configuration shown in FIG. 9A. Signal light comes in from the left side in FIG. 9A, and part of the signal light is sampled by branching at the optical splitter 1301. The sampled monitored signal light enters the optoelectronic transducing circuit 1313 via an optical band-pass filter 1312 and becomes the first electric signal. The signal light that has passed the optical splitter 1301 comes in the amplification medium 1306 via an optical splitter 1302, isolator 1303 and pump light/signal light coupler 1304.

Pump light may be injected from the back side via the pump light/signal light coupler 1308. Amplified signal light passes the isolator 1309 and optical splitters 1310, 1311 before leaving the system. The optical splitter 1311 monitors part of the output signal light, which becomes the second electric signal entering the optoelectronic transducing circuit 1319 via an optical band-pass filter 1320.

The signal light is WDM light of at least one wavelength channel. The two optical band-pass filters 1312, 1320 permit the same wavelength which agrees with the wavelength of a specific one channel in the WDM signal light.

The optical splitter 1310 samples part of the signal light and ASE light emitted from the isolator 1309, and the sampled light returns to the amplification medium 1306 via the variable optical attenuator 1307, wavelength selector 1305 and optical splitter 1302. These components form the optical resonator.

The oscillation wavelength of the optical resonator can be decided by splitters 1302, 1310 which have wavelength-dependency, or the function of the wavelength selector 1305, or both. At this wavelength, the optical resonator oscillates at the point where the loss during one round of travel in the resonator becomes equal to the gain of the amplification medium 1306. When a stable oscillation is possible, the gain of the amplification medium 1306 does not change at the oscillation wavelength even if pump light of an intensity higher than that needed for oscillation is provided.

The above first and second electric signals are converted by the division circuit 1316 into gain signals. Based on the gain signals, the pump light driver circuits 1315, 1318 are adjusted so that the light intensity of the pump light source agrees with a prescribed value. Pump light is injected in the amplification medium via the pump light/signal light couplers 1304, 1308.

Figure 9B:
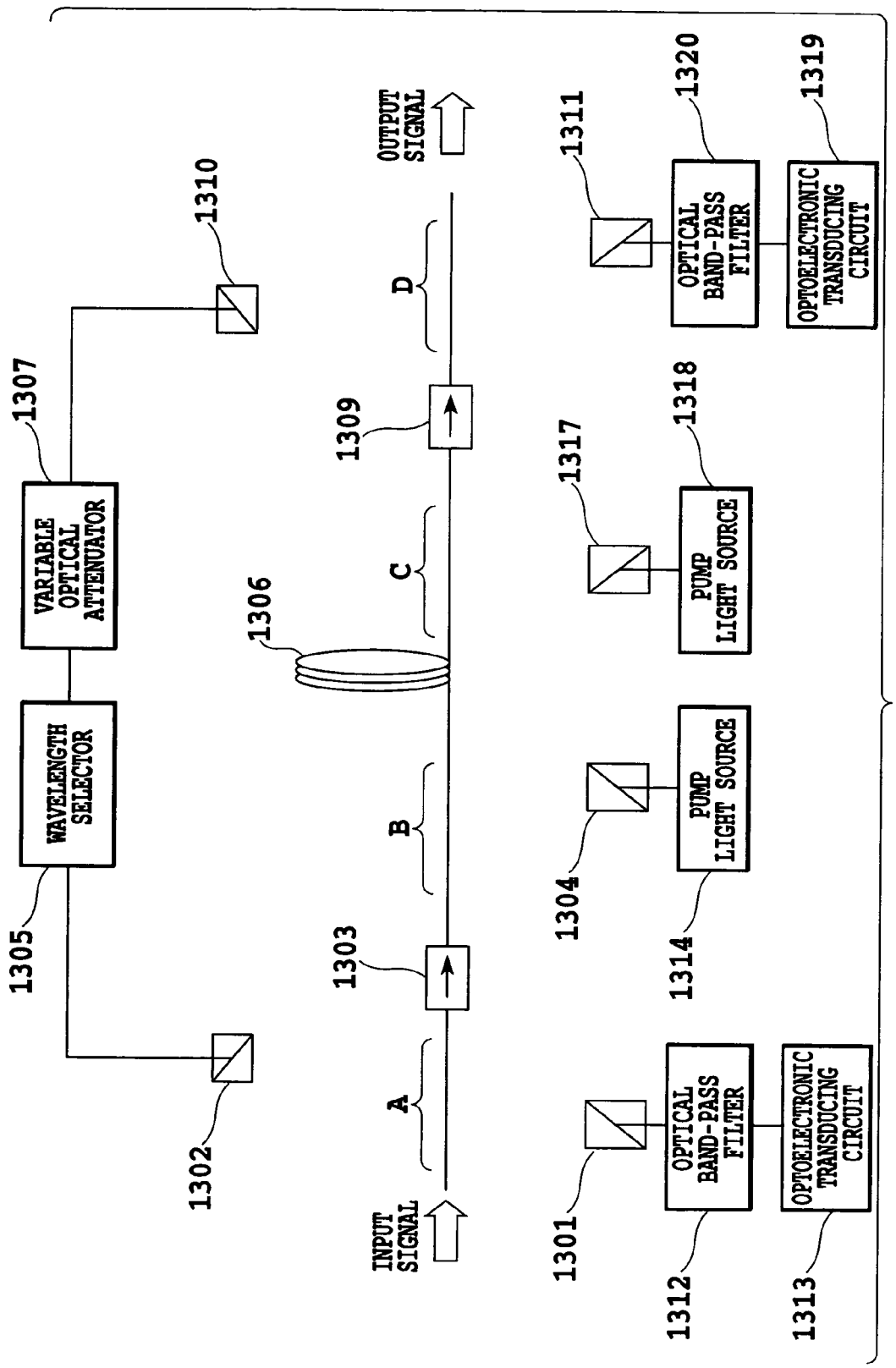
FIG. 9B is a diagram illustrating the positions of optical splitters used in the optical resonator of the example shown in FIG. 9A.

FIG. 9B is a diagram illustrating the positions of splitters comprising the optical resonator. The same components have the same numerals in FIGS. 9A and 9B. The optical splitters 1302, 1310 comprising the optical resonator may be installed in various positions. The optical resonator is a loop comprising an optical splitter 1302, amplification medium 1306, optical splitter 1310, variable optical attenuator 1307 and wavelength selector 1305. The optical splitters 1302, 1301 and pump light/signal light coupler 1304 may be inserted in A or B sandwiching the optical isolator 1303.

Particularly when the loss in the optical isolator 1303 for the excitation wavelength is high, the pump light/signal light coupler 1304 is preferably inserted in B. These components are inserted in A or B in light of losses in splitters and coupler at the excitation wavelength, but may be inserted in positions other than those shown in FIG. 9A.

Likewise, the optical splitters 1311, 1310 and pump light/signal light coupler 1317 may be inserted in C or D. In general, since the optical isolator 1309 has an excellent capability of blocking light traveling in the reverse direction over a wide range of wavelengths, the pump light/signal light coupler 1317 should be inserted in C in most cases. The optical splitters 1311, 1310 and pump light/signal light coupler 1317 are inserted in C or D in light of losses in splitters and coupler at the excitation wavelength, but may be inserted in positions other than those shown in FIG. 9A.

Figure 9C:
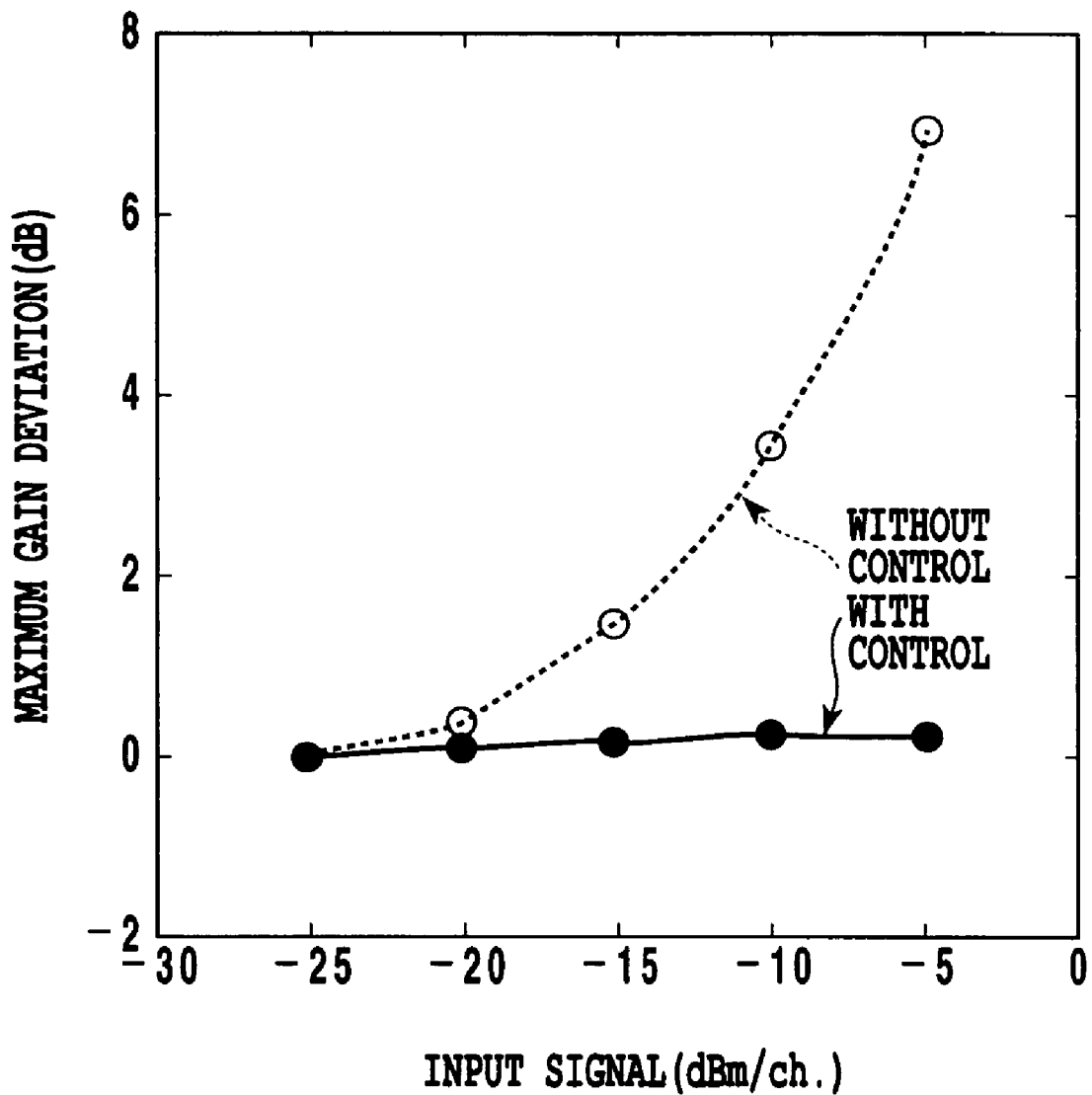
FIG. 9C is a diagram where the maximum deviations of gain profile are plotted against varied input signal levels.

FIG. 9C is a graph where the maximum values in deviations in gain profile are plotted against varied input signal levels. With reference to the gain spectrum at −25 dBm/ch, the maximum deviations of gain spectra observed when the input signal levels set at −25, −20, −15 and −10 dBm/ch were inputted, were plotted in this graph.

The intensity of pump light was set at a value approximately 1.3 times the threshold value needed for oscillation of the optical resonator. The gains were estimated by scanning a −35 dBm weak probe light. The dotted line in FIG. 9C shows the result obtained with no gain control using monitored signal lights. The solid line in FIG. 9C shows the values obtained when the control is performed so that the gain at 1480 nm was held constant by the control circuit that monitored the 1480 nm signal light. FIG. 9C demonstrates that the proposed control succeeded in holding the gain profile constant.

Example 2

This example is an example of the optical amplifier described in above (1).

Figure 10A:
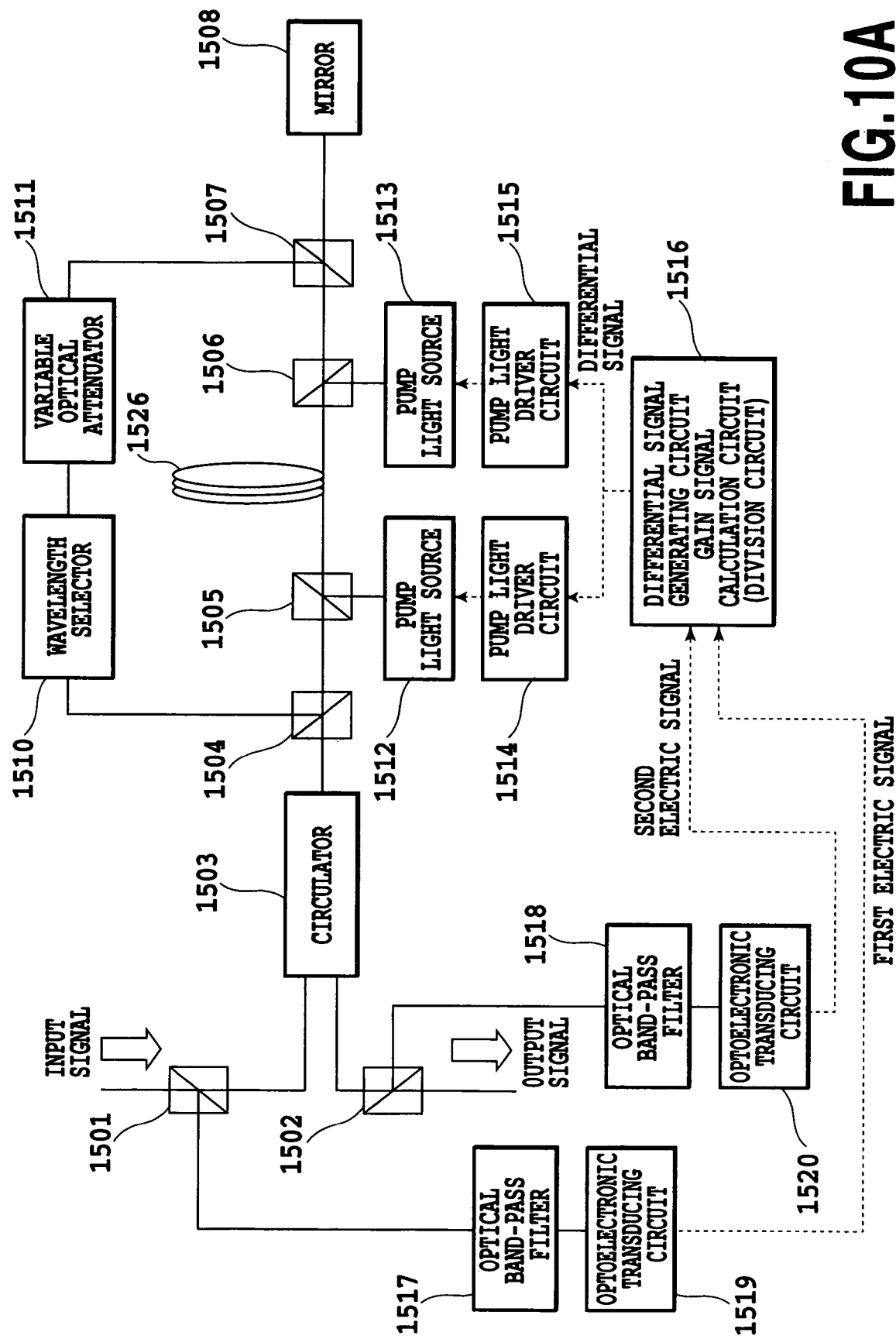
FIG. 10A is a diagram illustrating Example 2 of the optical amplifier of the invention.

FIG. 10A is a diagram illustrating a second example of the optical amplifier of the invention. This example is an example of the double-path type amplifier, and in particular an example of the reflection type optical amplifier.

The optical resonator of the example has the same configuration as that of the first example. The present example has a circulator 1503 at the input side of the optical resonator and a mirror 1508 at the output side of the optical resonator. Referring now to FIG. 10A, the monitoring means of the optical resonator of the example has the same configuration as that of the first example except that the optical splitter 1502 sampling the second signal light is installed on the output side of the circulator 1503 sampling the amplified output signal. Although the present example shows an example of the bi-directional excitation, the invention may use the forward or backward excitation.

Referring to FIG. 10A, the amplification medium 1526 used an In-based fluoride fiber where 2000 ppm Tm ions were doped. This fiber was 20 m long. Its pump light source was an InGaAs distorted quantum well LD of which oscillation wavelength was 1030 nm. The optical amplifier of the present example includes a mechanism for sampling a first electric signal and a mechanism for sampling a second electric signal in order to split off monitored signal light. The mechanism for sampling a first electric signal includes an optical splitter 1501, an optical band-pass filter 1517 and an optoelectronic transducing circuit 1519. The mechanism sampling a second electric signal includes an optical splitter 1502, an optical band-pass filter 1518 and an optoelectronic transducing circuit 1520.

The optical splitters 1501, 1502 are devices each using a dielectric multi-layered film mirror for splitting off 1% of input signal light by reflection.

Light signals were 16 wavelengths from 1460 to 1490 nm at intervals of 2 nm. The optical band-pass filters 1517, 1518 passed light of which central wavelength was 1460 nm of a 0.8 nm half-width. The optoelectronic transducing circuits 1519, 1520 were InGaAs-PIN-PDs. The optical splitters 1504, 1507 which are included in the optical resonator had a passing loss of 0.2 dB or less and a splitting ratio of 95% in 1493-1496 nm.

The wavelength selector 1510 was a device using a dielectric multi-layered film that passed light of a central wavelength of 1493 nm of a 0.8 nm half-width with a passing loss of 0.5 dB. The variable attenuator 1511 was adjusted so that the loss in 1493-1496 nm during one round of travel in the optical amplifier became 20 dB.

Now the operation of the optical amplifier of the invention will be specifically described below with reference to the configuration shown in FIG. 110A. Signal light that has passed the optical splitter 1501 enters the amplification medium 1526 via the circulator 1503, then reflected by the mirror 1508, passes the amplification medium 1526 again, and goes out to the optical splitter 1502 via the circulator 1503.

The optical splitters 1501, 1502 split off part of signal light as monitored signal light. Only necessary light signals are selected by screening the sampled monitored signal light in the optical band-pass filters 1517, 1518 that screen the same band, and the taken out signals are entered to the optoelectronic transducing circuits 1519, 1520 to be converted into electric signals. The first and second electric signals are taken out as gain signals by the division circuit 1516. Based on this gain signal, the pump light driver circuits 1514, 1515 are controlled to adjust the intensity of pump light in the pump light sources 1512, 1513 so that the gain agrees with the prescribed value. Pump light is injected to the amplification medium via the pump light/signal light couplers 1505, 1506.

The optical resonator is a loop comprising optical splitters 1504, 1507, a wavelength selector 1510, a variable optical attenuator 1511 and an amplification medium 1526. Otherwise, it is possible to add an isolator in the optical path extending from the optical splitter 1504 to the optical splitter 1507 via the wavelength selector 1510 and the variable optical attenuator 1511 to fix the travel direction of oscillated light in the optical resonator. Regardless of the presence/absence of this isolator, the gain in the amplification medium at the wavelength of laser oscillation is fixed by the loss during one round of travel in the optical amplifier, and the gain of monitored signal light at the selected wavelength is also fixed by an electric feedback system using the division circuit 1516. Then the gain profile of the amplifier is uniquely held constant.

Figure 10B:
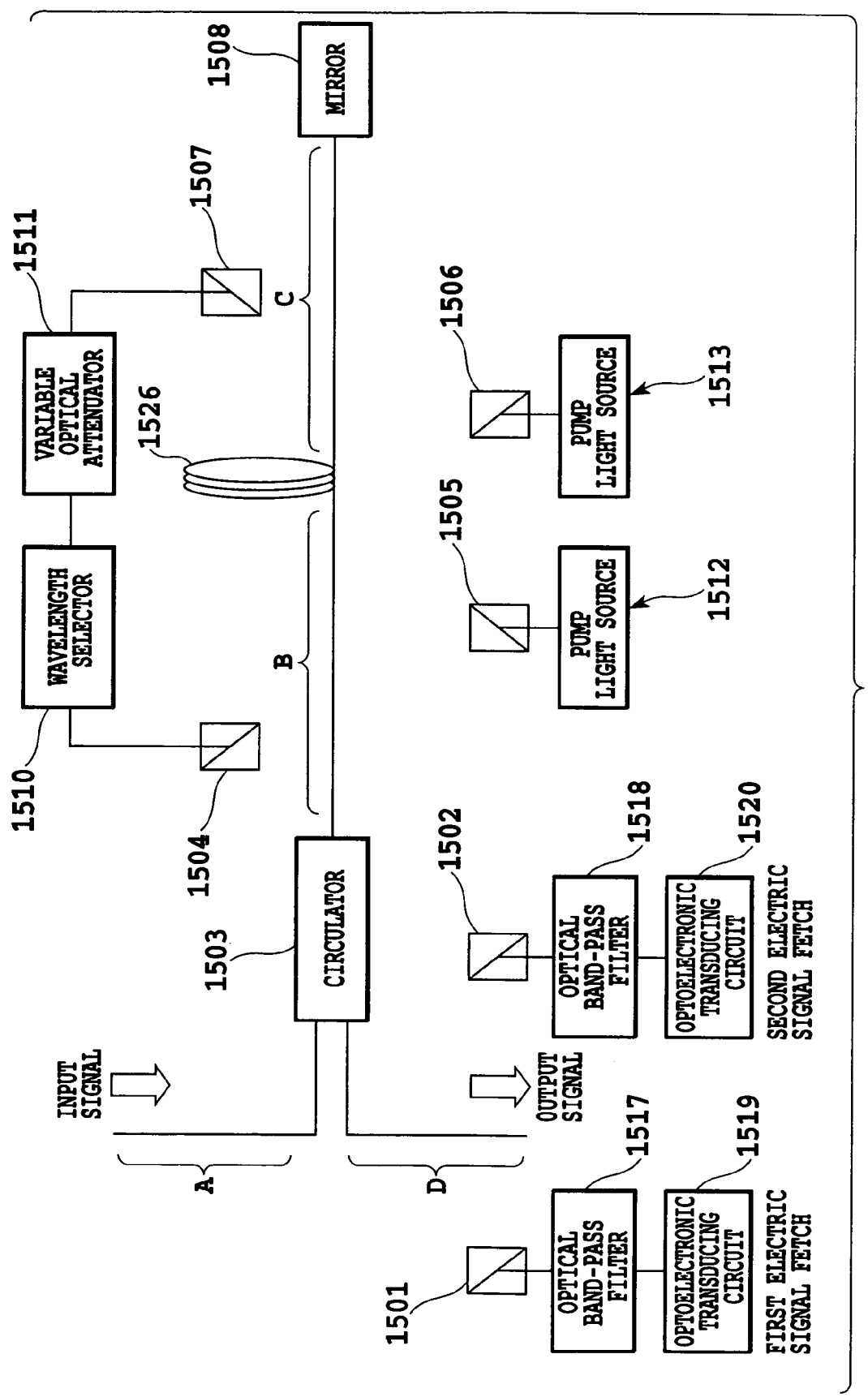
FIG. 10B is a diagram illustrating the insertion positions of optical splitters in example 2 (of a double-path configuration)

FIG. 10B is a diagram illustrating the positions where the optical splitters are installed with a double-path configuration. The optical splitters included in a monitoring means, optical resonator and excitation means may be installed in various positions other than those indicated in FIG. 10A. In FIG. 10B, when the components are the same as those in FIG. 10A, the same numerals as those in FIG. 10A are used.

Now the relative positions of the monitor circuit for input signal light (combination of the optical splitter 1501, optical band-pass filter 1517 and optoelectronic transducing circuit 1519), the monitor circuit for output signal light (combination of the optical splitter 1502, optical band-pass filter 1518 and optoelectronic transducing circuit 1520), the circuit for pump light (combination of the pump light/signal light coupler 1505, pump light source 1512, pump light/signal light coupler 1506 and pump light source 1513) and the optical resonator (combination of the optical splitters 1504, 1507, variable optical attenuator 1511, and wavelength selector 1510) are explained below.

If the optical splitters 1501, 1502 are directional couplers, the optical splitter 1501 may be installed in A or B; and optical splitter 1502 may be installed in D or B. Meanwhile, the optical splitters 1504 and 1507 may be installed in A and D, B and C, A and C, or D and C, respectively. The pump light/signal light coupler 1506 is preferably positioned in C. The pump light/signal light coupler 1505 is preferably positioned in B, although it may be positioned also in A or D, if its forward or backward loss in the circulator 1503 at the oscillation wavelength is sufficiently low. These devices may be installed anywhere within the A-D range if their optical performance is well taken into account.

Figure 10C:
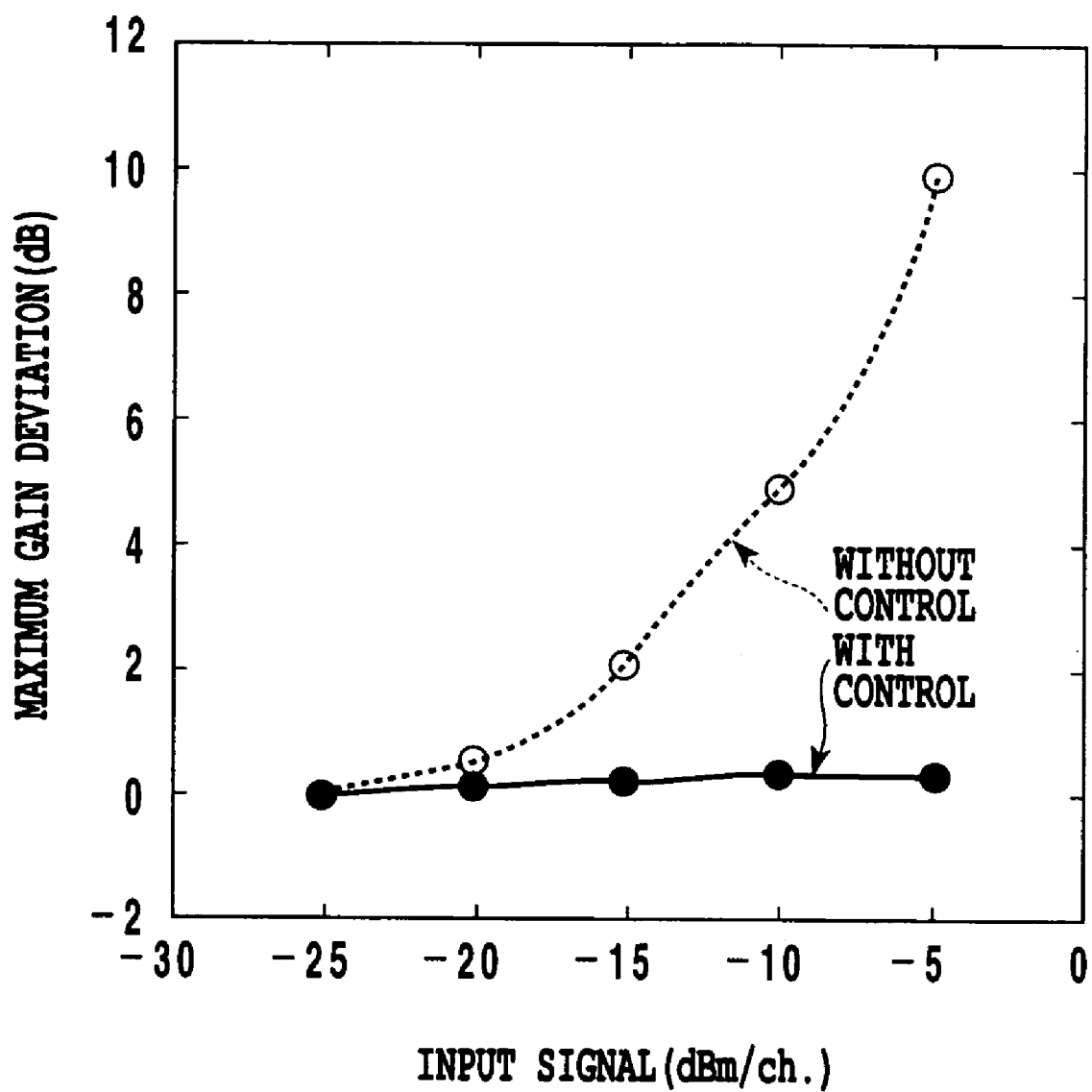
FIG. 10C is a diagram where the maximum deviations of gain profile are plotted against input signal levels varied from −25 to 10 dBm/ch.

FIG. 10C is a graph where the maximum values in deviations in gain profile are plotted against varied input signal levels. With reference to the gain spectrum at −25 dBm/ch, the maximum deviations of gain spectra observed when the input signal level was varied from −25 to −10 dBm/ch are plotted in this graph. The dotted line in FIG. 10C shows the result obtained with no gain control at the wavelengths of monitored signal lights, while the solid line shows the result obtained when the gain control was carried out. FIG. 10C demonstrates that the proposed control succeeded in holding the gain profile constant.

Example 3

This example is an example of the optical amplifier described in above (1).

Figure 11A:
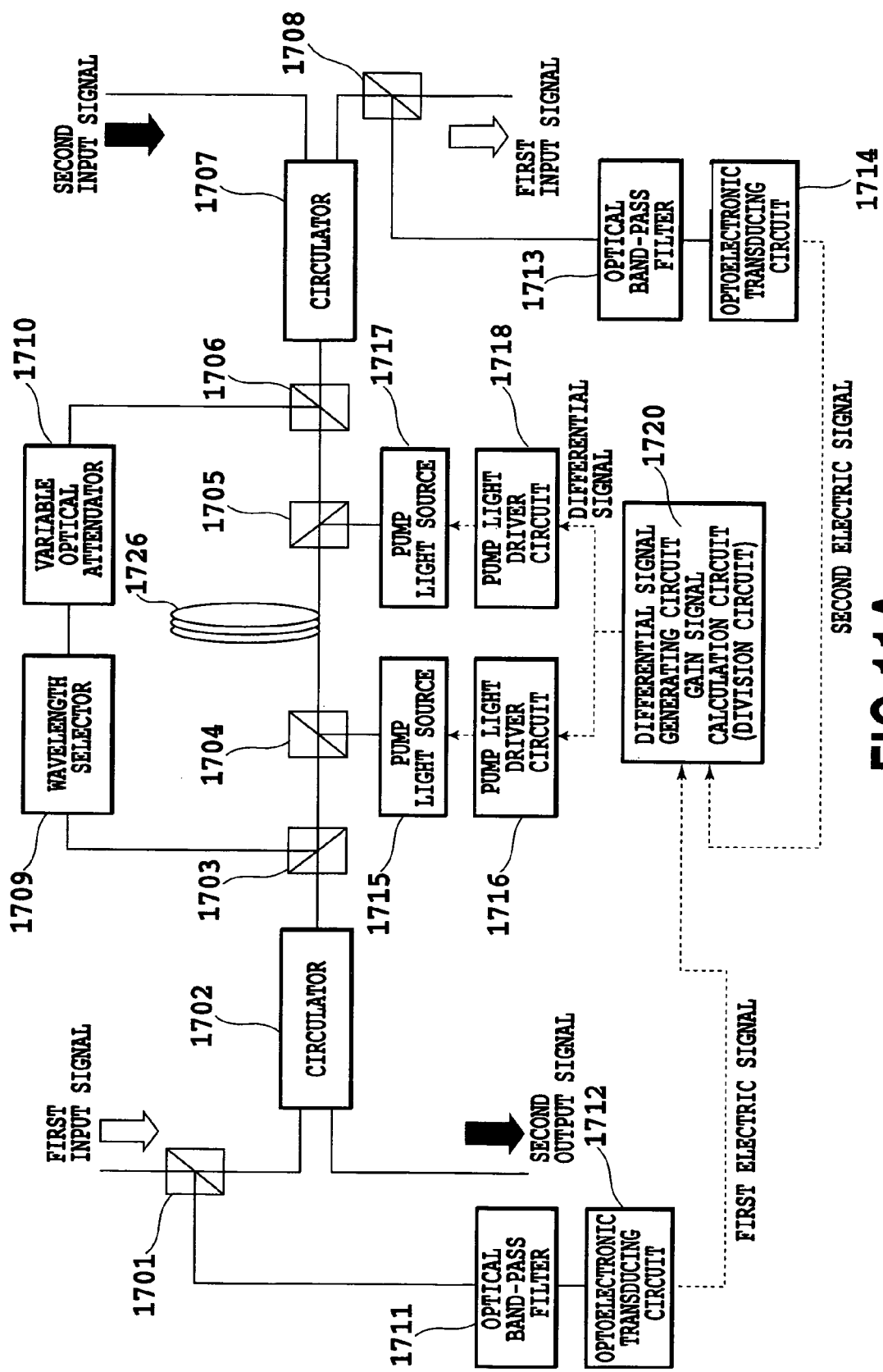
FIG. 11A is a diagram illustrating Example 3 of the optical amplifier of the invention.

FIG. 11A is a diagram illustrating a third example of the optical amplifier of the invention. This example is an example of the bi-direction amplifier. The optical resonator, monitoring means and control unit of this example have the same structures as those of the first example. Referring now to FIG. 11A, the present example has circulators 1702, 1707 at both sides of the optical resonator, and the first and second light signals come in the resonator from the opposite directions. Although the present example shows an example of the bi-directional excitation, the invention may use the forward or backward excitation.

The amplification medium 1726 used a Tellurite-based fiber where 2000 ppm of Tm ions were doped. This fiber was 20 m long. The pump light source 1715 was a LD of which oscillation wavelength was 1400 nm, while the pump light source 1717 used combined light emitted by LDs that oscillated at 1400 nm and 1600 nm, respectively.

The present example monitors a state of a gain profile by using monitored signal lights, and holds the gain profile constant by controlling the pump light sources with the pump light driver circuits 1716, 1718. The two LDs that were connected to the pump light driver circuit 1718 and oscillated at 1400 nm and 1600 nm respectively were controlled by feedback to drive these pump light sources. Sampling of monitored signal lights was carried out by optical splitters 1701, 1708, which were fusion spliced type fiber couplers. These optical splitters are the devices that take out 1% of input signal light by reflection.

Light signals were 16 wavelengths from 1480 to 1510 nm at intervals of 2 nm.

The optical band-pass filters 1711, 1713 passed light of which central wavelength was 1510 nm of a 0.8 nm half-width. The optoelectronic transducing circuits 1712, 1714 were InGaAs-PIN-PDs. The optical splitters 1703, 1706 included in the optical resonator had a passing loss of 0.2 dB or less in 1480-1510 nm and a splitting ratio of 95% in 1474-1477 nm wavelengths.

The wavelength selector 1709 was a device using a dielectric multi-layered film that passed light of a central wavelength of 1476 nm of a 0.8 nm half-width with a passing loss of 0.5 dB. The variable attenuator 1710 was adjusted so that the loss in 1474-1477 nm during one round of travel in the optical amplifier became 20 dB.

The input signal level was changed between −25 and −10 dBm/ch, and the gain profile at −25 dBm/ch was determined as the reference gain profile. The maximum deviation from this reference observed against varied input levels appeared at 1510 nm. Its deviation was 7 dB with no gain control, while 0.3 dB with gain control.

Now the operation of the optical amplifier of the invention will be specifically described below with reference to the configuration shown in FIG. 11A. Signal light that has passed the optical splitter 1701 enters the amplification medium 1726 via the circulator 1702. That is, signal light enters again the amplification medium 1726 for amplification via the optical splitter 1703 and pump light/control light coupler 1704. Backward-excited light is combined by the pump light/signal light coupler 1705.

The amplified signal light passes the optical splitter 1706 and circulator 1707, and then the light is split off by the optical splitter 1708 for sampling. Part of input signal light is converted into electric signals by the optical splitter 1701, optical band-pass filter 1711 and optoelectronic transducing circuit 1712. Meanwhile, part of output signal light is converted into electric signals by the optical splitter 1708, optical band-pass filter 1713 and optoelectronic transducing circuit 1714.

The individual electric signals are converted into gain signals by the division circuit 1720. Based on this gain signal, the pump light driver circuits 1716, 1718 control the intensity of pump light in the pump light sources 1715, 1717 so that the gain agrees with the prescribed value. The gain at the wavelength of monitored signal light in the input signal light is controlled by electric feedback.

Meanwhile, the optical resonator is a loop comprising optical splitters 1703, 1706, a wavelength selector 1709, a variable optical attenuator 1710 and an amplification medium 1726.

Otherwise, it is possible to add an isolator in the light path extending from the optical splitter 1703 to the optical splitter 1706 via the wavelength selector 1709 and the variable optical attenuator 1710 to fix the travel direction of oscillated light in the optical resonator. Regardless of the presence/absence of this isolator, the gain in the amplification medium at the wavelength of laser oscillation is fixed by the loss during one round of travel in the optical amplifier, and the gain of monitored signal light at the selected wavelength is also fixed by an electric feedback system using the division circuit 1720. Then the gain profile of the amplifier is uniquely held constant.

Figure 11B:
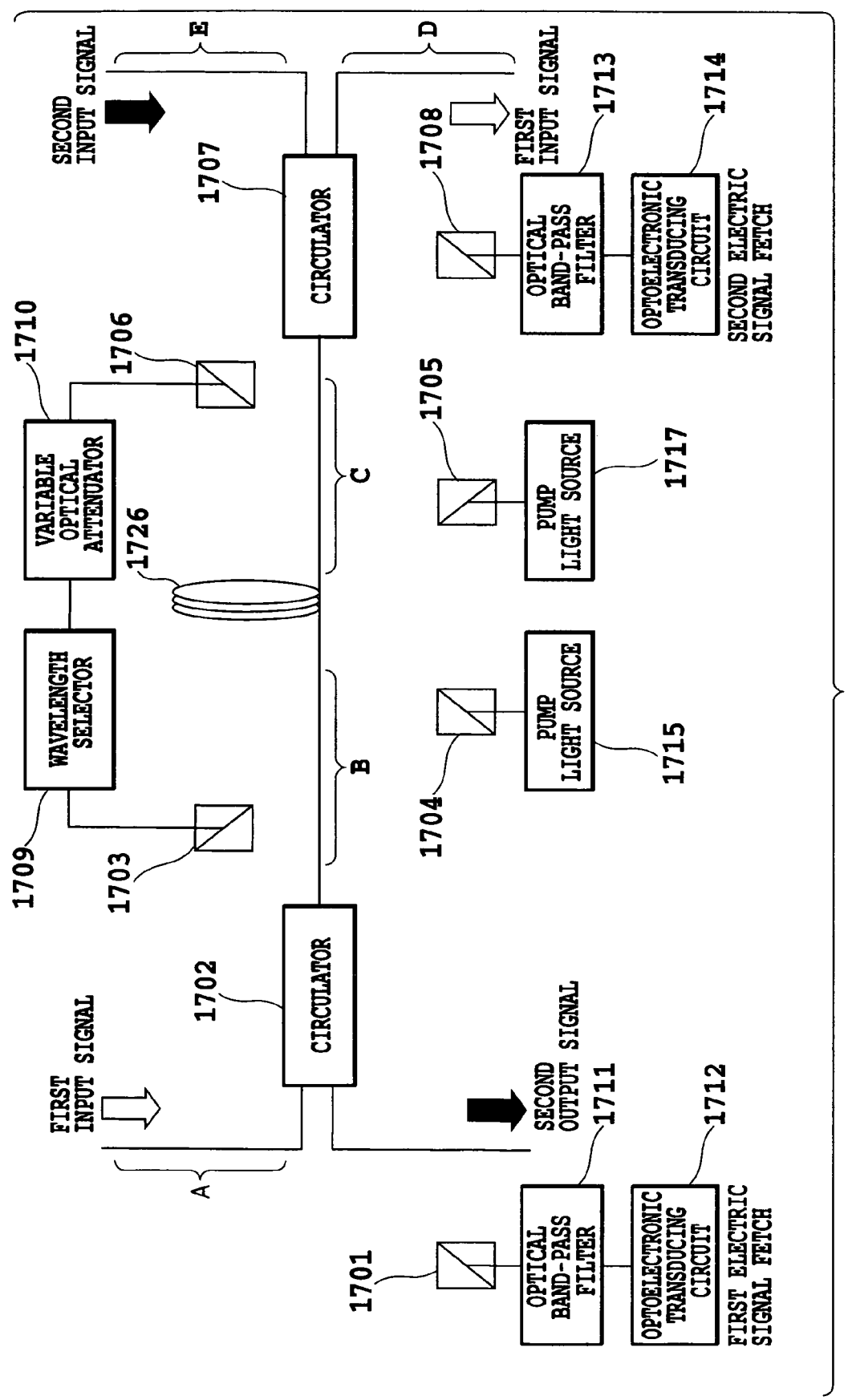
FIG. 11B is a diagram illustrating the insertion positions of optical splitters used in example 3.

FIG. 11B is a diagram illustrating the positions where the optical splitters included in the monitoring means, optical resonator and excitation means are installed in a configuration shown in FIG. 11A. The optical splitters included in the monitoring means and optical resonator may be installed various positions other than those indicated in FIG. 11A. The same components have the same numerals in FIGS. 11A and 11B.

Now the relative positions of the monitor circuit for input signal light (combination of the optical splitter 1701, optical band-pass filter 1711 and optoelectronic transducing circuit 1712), the monitor circuit for output signal light (combination of the optical splitter 1708, optical band-pass filter 1713 and optoelectronic transducing circuit 1714), the circuit of pump light (combination of the pump light/signal light coupler 1704, pump light source 1715, pump light/signal light coupler 1705 and pump light source 1717) and the optical resonator (combination of the optical splitters 1703, 1706, variable optical attenuator 1710 and wavelength selector 1709) are explained below.

The optical splitter 1701 may be installed in A or B; and optical splitter 1708 may be installed in C or D. Meanwhile, the optical splitters 1703 and 1706 may be installed in A and D, B and C, A and C, or B and C, respectively. The pump light/signal light coupler 1704 may be positioned in A or B, but preferably in B. The pump light/signal light coupler 1705 is preferably placed in C, although it may be positioned in C or E. These devices may be installed anywhere within the A-E range if their optical performance is well taken into account.

Example 4

The present example is an example of the optical amplifier described in above (2).

Figure 12:
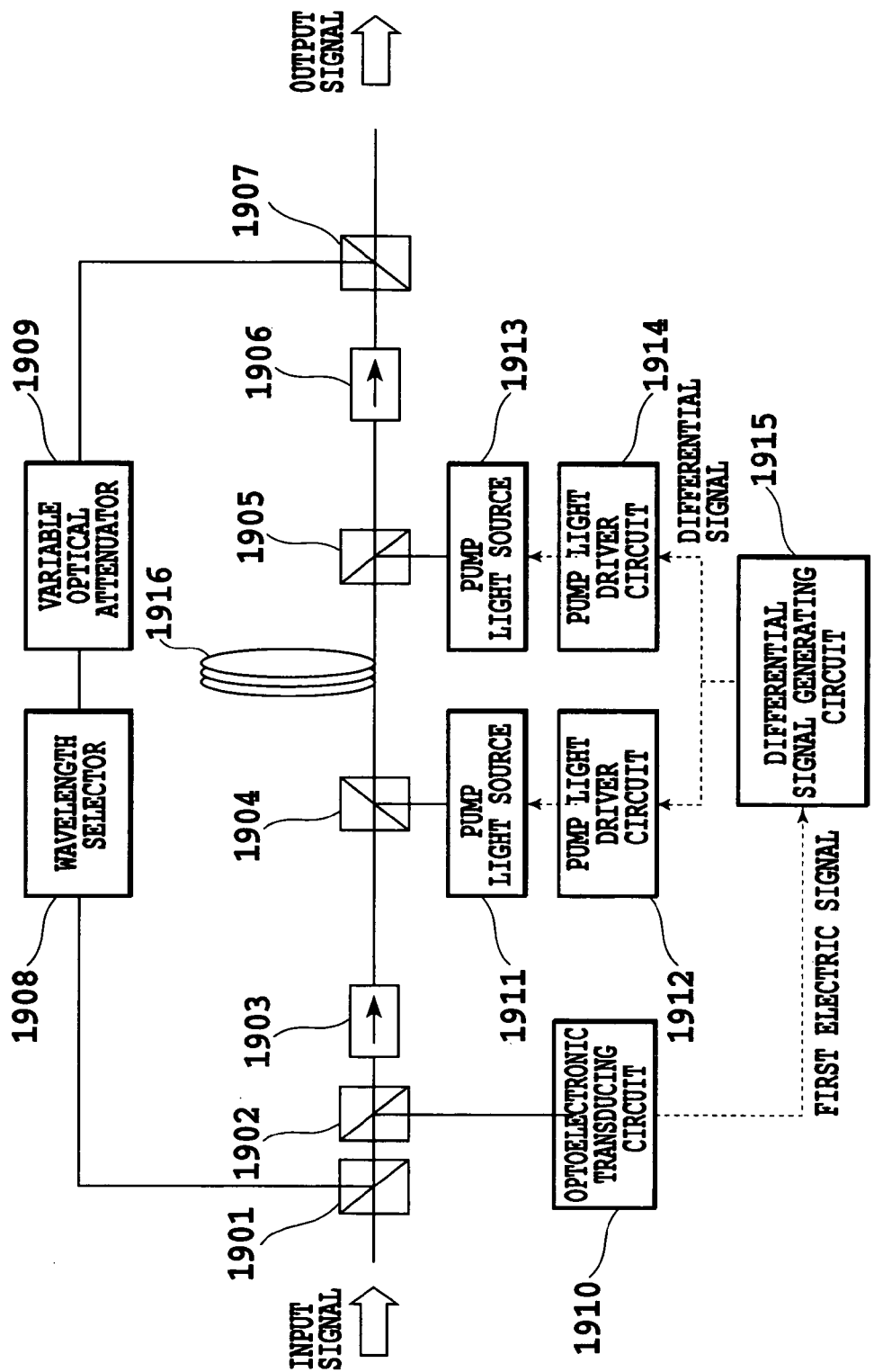
FIG. 12 is a diagram illustrating Example 4 of the optical amplifier of the invention.

FIG. 12 illustrates a fourth example of the optical amplifier of the invention, which has a single-path configuration. The optical amplifier of the invention includes an optical resonator of the same configuration as that employed in the first example, and a monitoring means that monitors the sum of the entire power of input signals and the power of oscillated light in the resonator at an input side of the amplification medium and control unit that controls the pump light sources. The monitoring means comprises an optical splitter 1920 for sampling signal light and oscillation light, an optoelectronic transducing circuit 1910 for converting light power into electric signals, and a monitoring unit (for example, a differential signal generating circuit) 1915 that sends a signal to the pump light driver circuits 1912, 1914 based on the electric signals. The control unit includes pump light driver circuits 1912, 1914 that control the pump light sources 1911, 1913.

The employed amplification medium 1916 was a Zr-based fluoride fiber where 2000 ppm of Er ions were doped. This fiber was 7 m long.

The pump light sources 1911, 1913 employed multi-polarized pumping units where LDs oscillating at 980 nm were installed so that polarized waves crossed at right angles. The present example monitors a state of a gain profile by using monitor signal lights, and holds the gain profile constant by controlling the pump light sources with the pump light driver circuits 1912, 1914. In the present example, all the LDs (pump light sources) are controlled by feedback; and the intensity of pump light from the pump light/signal light coupler 1905 became 1.4 times that of pump light from the pump light/signal light coupler 1904.

The monitor signal light sampling unit comprises an optical splitter 1902 and an optoelectronic transducing circuit 1910. The optical splitter 1902 is a bulk type coupler using a dielectric multi-layered film as a filter. Its splitting ratio was 1% in the 900-1000 nm and 2500-3000 nm ranges. Light signals were 16 wavelengths from 2600-2630 nm at intervals of 2 nm. The optoelectronic transducing circuit 1910 was a PIN-PD.

The optical splitters 1901, 1907 included in the optical resonator had a passing loss of 0.2 dB or less in 2600-2630 nm and a splitting ratio of 95% in 2610-2650 nm. The wavelength selector 1908 was a device using a dielectric multi-layered film that passed light of a central wavelength of 2630 nm of a 0.8 nm half-width with a passing loss of 0.5 dB. The variable attenuator 1909 was adjusted so that the loss in 2610-2650 nm during one round of travel in the optical resonator became 20 dB.

The input signal level was changed between −25 and −10 dBm/ch, and the gain profile at −25 dBm/ch was determined as the reference gain profile. The maximum deviation from this reference observed against varied input levels was 5 dB with no gain control, while 0.2 dB with gain control.

Now the operation of the optical amplifier of the invention will be specifically described below with reference to the configuration shown in FIG. 12. This example can be applied to optical amplifiers of the single-path configuration, double-path configuration and bi-directional configuration.

The optical amplifier of the present example uses an optical resonator and the second monitoring method at a time. Particularly in this example, the second monitoring method is featured by conducting sampling of the total signal light and sampling of oscillated laser light at the input side of the amplification medium in the resonator, with a single optical splitter. The power of the sampled total signal light and the power of oscillated laser are entered together to a single optoelectronic transducer to be converted into an electric signal.

The pump light driver circuit is controlled so that the difference between this electric signal and a prescribed level becomes zero. The structure of the pump light driver circuit is the same as that in the above example. The employed optical components are the same as those described in the above example.

Signal light that has passed the optical splitters 1901, 1902, isolator 1903 and pump light/signal light coupler 1904 enters the amplification medium. The amplified signal light passes the pump light/signal light coupler 1905, isolator 1906 and optical splitter 1907 before leaving the system. The optical resonator is a loop comprising optical splitters 1901, 1907, a wavelength selector 1908, a variable optical attenuator 1909 and an amplification medium 1916.

The optical splitter 1902 has a function of taking out the oscillation light and the total input signal light in the optical resonator at a prescribed ratio, and the taken out monitor signal light is converted into an electric signal by the optoelectronic transducing circuit 1910. This electric signal has a signal level proportional to the intensity of light coming in the amplification medium 1916, and this level is compared with a prescribed level. The compared signal level is provided as a differential signal by a differential signal generating circuit 1915 that generates the differential signal as output, and the pump light driver circuit and pump light source are controlled by feedback based on this differential signal.

This control makes the light coming in the amplification medium 1916 agree with a prescribed value or an externally decided value. The splitters can be installed in various patterns. Denoted 1912, 1914 are pump light driver circuits.

Example 5

Figure 13:
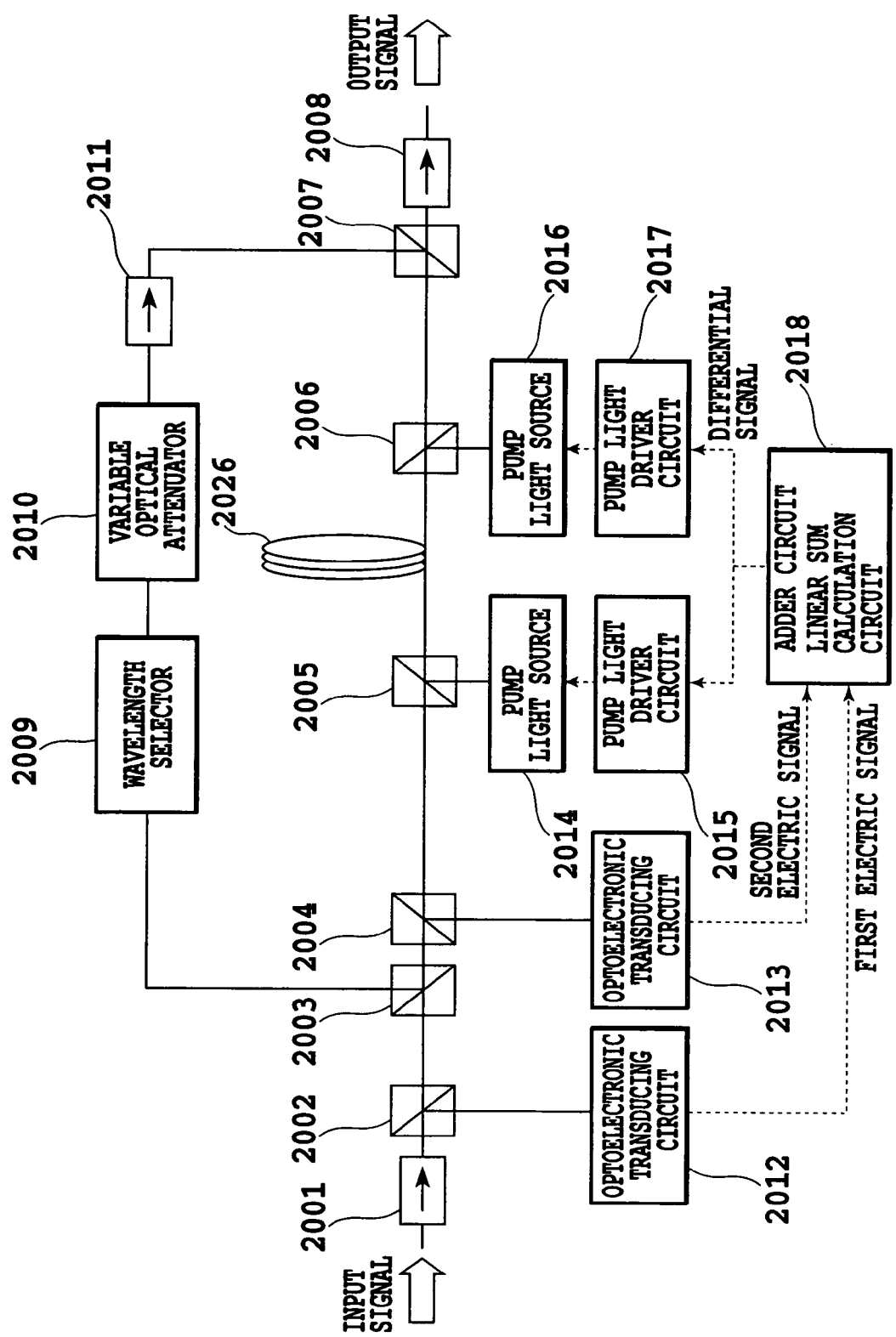
FIG. 13 is a diagram illustrating Example 5 of the optical amplifier of the invention.

FIG. 13 illustrates a fifth example of the optical amplifier of the invention, which has a single-path configuration.

Referring to FIG. 13, the present example has the same configuration as that for example 4 except that it comprises an optical splitter 2002 for sampling the first monitored signal light at the input side of the resonator, a monitored signal light sampling unit including an optoelectronic transducing circuit 2012 for transducing the sampled monitored signal light into an electric signal and an isolator 2011 between the variable optical attenuator 2010 and the optical splitter 2007.

The employed amplification medium 2026 was a Zr-based fluoride fiber where 6000 ppm of Tm ions were doped. This fiber was 7 m long. The pump light sources 2014, 2016 were LDs that oscillate at 1400 nm.

The present example monitors a state of a gain profile by using monitor signal lights, and holds the gain profile constant by controlling the pump light sources with the pump light driver circuits 2015, 2017. In the present example, all the LDs that oscillate at 1400 nm and are connected to the pump light driver circuits 2015, 2017 are subject to a feedback control. Assuming that the pump light intensity at the pump light/signal light coupler 2005 is P1 and that at the pump light/signal light coupler 2006 is P2, P1 and P2 are controlled so as to meet the following relations:

$P2$ (mW)=400$t$ $P1$ (mW)=100$t$+300 where t is a real number between 0 and 1.

The optical splitters 2002 in the monitored signal light sampling unit, the optical splitters 2004 in the monitor signal light sampling unit are fusion spliced type fiber couplers. These are fusion spliced type couplers that have an almost constant splitting ratio of 1% in 1470-1530 nm. The optical splitter 2002 splits only light traveling from the left to the right in FIG. 13, while the optical splitter 2004 splits only light traveling from the right to the left in FIG. 13. Light signals were 16 wavelengths from 1480 to 1510 nm at intervals of 2 nm.

The optoelectronic transducing circuits 2012, 2013 were InGaAs-PIN-PDs. The optical splitters 2003, 2007 included in the optical resonator had a passing loss of 0.2 dB or less in 1480-1510 nm and a splitting ratio of 95% in 1513-1517 nm.

The wavelength selector 2009 was a device using a dielectric multi-layered film that passed light of a central wavelength of 1515 nm of a 0.8 nm half-width with a passing loss of 0.5 dB. The variable attenuator 2010 was adjusted so that the loss at 1515 nm during one round of travel in the optical resonator became 17 dB.

The input signal level was changed between −25 and −10 dBm/ch, and the gain profile at −25 dBm/ch was determined as the reference gain profile. The maximum deviation from this reference observed at 1515 nm against varied input levels was 6 dB with no gain control, while 0.3 dB with gain control. Denoted 2001, 2008 and 2011 in the figure are optical isolators.

Now the operation of the optical amplifier of the invention will be specifically described below with reference to the configuration shown in FIG. 13. The present example uses the above second monitoring method, and the optical splitter that samples the total signal light is a separate device from the optical splitter that samples laser oscillation light at the input side of the amplification medium in the resonator. By these splitters, the different light beams are introduced into separate optoelectronic transducers and then converted into independent electric signals corresponding to individual light powers. The obtained electric signals are converted by a certain electric means into an electric signal that is a linear combination of the two signals or their sum. This signal is taken out, and then the pump light driver circuits are adjusted so that the difference between this electric signal and a prescribed level becomes zero. The operation of the pump light driver circuit is the same as that in the above example. The optical components are the same as those described in the above example.

Signal light that has passed the optical splitters 2002, 2003, isolator 2001 and pump light/signal light coupler 2005 enters the amplification medium 2026. The amplified signal light passes the pump light/signal light coupler 2006, optical splitter 2007 and isolator 2008 before leaving the system.

The optical resonator is a loop comprising optical splitters 2003, 2007, a wavelength selector 2009, a variable optical attenuator 2010, an isolator 2011 and an amplification medium 2026. The optical splitters 2002, 2004 both work as directional couplers. This optical splitter 2004 takes out only laser oscillation light traveling in the direction opposite to the signal light in the optical resonator.

The monitored signal light and the monitor signal light corresponding to input signal light and the monitor signal light corresponding to laser oscillation light, which are sampled by the optical splitters 2002, 2004, are converted into electric signals by the optoelectronic transducing circuits 2012, 2013. Those signals are summed up in the adder signal generating circuit 2018, and this sum is compared with the externally decided level to provide their differential signal.

The pump light driver circuits 2015, 2017 and pump light sources 2014, 2016 are controlled by feedback so that the differential signal becomes zero. The optical splitters can be installed with flexibility as to location.

Example 6

This example is an example of the optical amplifier described in above (3).

Figure 14:
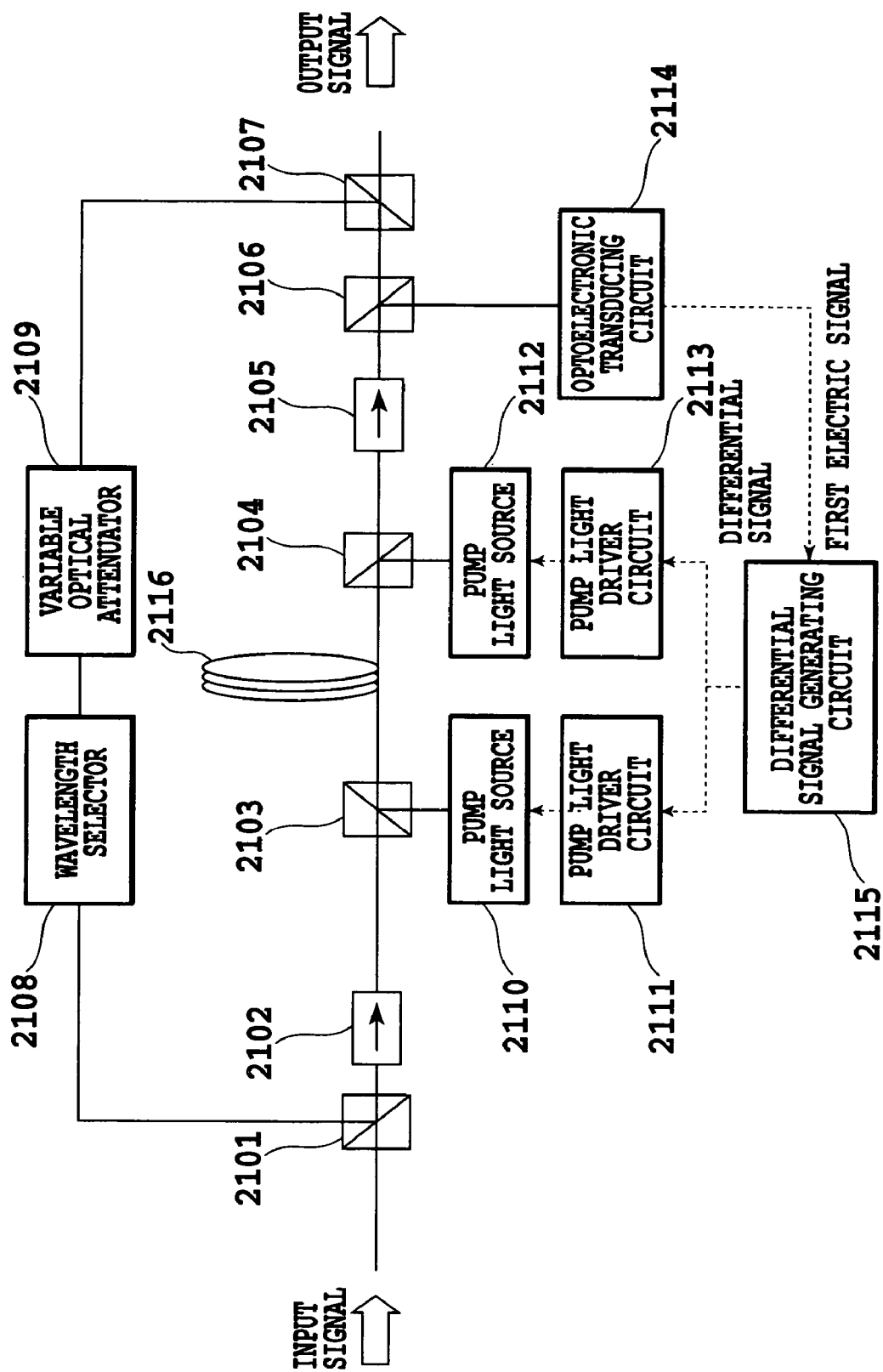
FIG. 14 is a diagram illustrating Example 6 of the optical amplifier of the invention.

FIG. 14 illustrates a sixth example of the optical amplifier of the invention, which has a single-path configuration.

The present example is the same as Embodiment 4 except that it has replaced the monitoring means and the control unit, which monitors the sum of the power of total input signal light and the power of oscillation light in the resonator at an input side of the amplification medium and controls the pump light sources based on this sum, by a monitoring means and a control unit that monitors the sum of the power of total output signal light and the power of oscillation light in the resonator at an output side of the amplification medium and controls the pump light sources based on this sum. This control unit is inserted between the isolator 2105 and the optical splitter 2107, as shown in FIG. 14.

The employed amplification medium 2116 was a Zr-based fluoride fiber where 6000 ppm of Tm ions were doped. This fiber was 7 m long. The pump light sources 2110, 2112 were LDs that oscillate at 1400 nm.

The present example monitors a state of a gain profile by using monitor signal lights, and holds the gain profile constant by controlling the pump light sources with the pump light driver circuits 2111, 2113. In the present example, all the LDs that oscillate at 1400 nm and are connected to the pump light driver circuits 2111, 2113 are subject to a feedback control. Assuming that the light intensity of pump light from the pump light/signal light coupler 2103 is P1 and that from the pump light/signal light coupler 2104 is P2, P1 and P2 are controlled so as to meet the following relations:

$$P1\ (mW) = 2 \times P2\ (mW).$$

The optical splitter 2106 employed in monitor signal light sampling area is a fusion spliced type fiber coupler. This is a fusion spliced type coupler that has an almost constant splitting ratio of 1% in 1470-1530 nm. Light signals were 16 wavelengths from 1480 to 1510 nm at intervals of 2 nm. The optoelectronic transducing circuit 2114 was an InGaAs-PIN-PD.

The optical splitters 2101, 2107 comprising the optical resonator had a passing loss of 0.2 dB or less in 1480-1510 nm and a splitting ratio of 95% in 1513-1517 nm. The wavelength selector 2108 was a device using a dielectric multi-layered film that passed light of a central wavelength of 1515 nm of a 0.8 nm half-width with a passing loss of 0.5 dB. The variable attenuator 2109 was adjusted so that the loss at 1515 nm during one round of travel in the optical resonator became 17 dB.

The input signal level was changed between −25 and −10 dBm/ch, and the gain profile at −25 dBm/ch was determined as the reference gain profile. The maximum deviation from this reference observed at 1515 nm against varied input levels was 6 dB with no gain control, while 0.3 dB with gain control.

Now the operation of the optical amplifier of the invention will be specifically described below with reference to the configuration shown in FIG. 14. The present example uses an optical resonator along with the above third monitoring method.

Signal light that has passed the optical splitter 2101, isolator 2102 and pump light/signal light coupler 2103 enters the amplification medium. The amplified signal light passes the pump light/signal light coupler 2104, isolator 2105 and optical splitters 2106, 2107 before leaving the system.

The optical resonator is a loop comprising optical splitters 2101, 2107, a wavelength selector 2108, a variable optical attenuator 2109, and an amplification medium 2116. The optical splitter 2106 is a splitting device that does not work as a directional coupler but split off the total signal light and the oscillation laser light at a given ratio as monitor elements. The monitor signal light split by the optical splitter 2106 is converted into an electric signal corresponding to the power of the monitor signal light by the optoelectronic transducing circuit 2114. This signal is compared with an externally decided level by the differential signal generating circuit 2115, and the difference between them is provided as output.

The pump light driver circuits 2111, 2113 and pump light sources 2110, 2112 are controlled by feedback so that the differential signal becomes zero. The optical splitters can be installed with flexibility as to location. Optical splitters may be prepared for each of the laser oscillation light element and amplified signal light element.

Example 7

This example is an example of the optical amplifier described in above (4).

Figure 15:
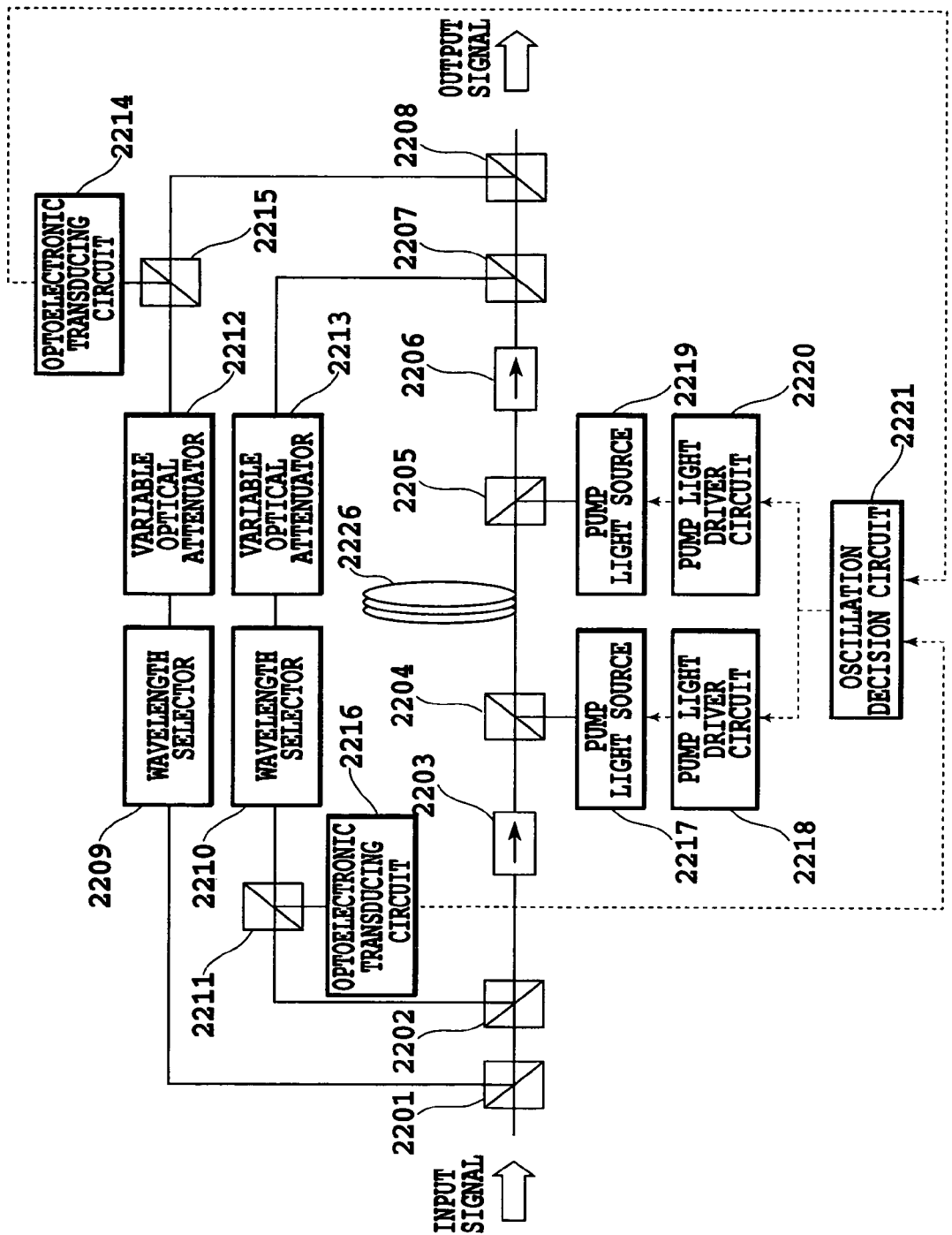
FIG. 15 is a diagram illustrating Example 7 of the optical amplifier of the invention.

FIG. 15 illustrates a seventh example of the optical amplifier of the invention, which has a single-path configuration.

The present example holds the gain profile of the optical amplifier using two optical resonators. Since the two resonators share the same amplification medium, the content of rare-earth ions in the amplification medium is fixed. Thus, even when two resonators are controlled to hold the gain profile constant, the requirement that the total number of rare-earth ions in the resonators be constant is fulfilled.

The employed amplification medium 2226 was a Zr-based fluoride fiber where 6000 ppm of Tm ions were doped. This fiber was 7 m long. The pump light sources 2217, 2219 were LDs that oscillate at 1400 nm. In the present control, all the LDs that oscillate at 1400 nm and are connected to the pump light driver circuits 2218, 2220 are subject to a feedback control.

The optical splitters 2201, 2208 comprising the first optical resonator had a passing loss of 0.2 dB or less in 1480-1510 nm and a splitting ratio of 95% in 1513-1517 nm. The wavelength selector 2209 was a device using a dielectric multi-layered film that passed light of a central wavelength of 1515 nm of a 0.8 nm half-width with a passing loss of 0.5 dB. The variable attenuator 2212 was adjusted so that the loss at 1515 nm during one round of travel in the optical resonator became 17 dB.

The optical splitters 2202, 2207 comprising the second optical resonator had a passing loss of 0.2 dB or less in 1480-1510 nm and a splitting ratio of 95% in 1600-1800 nm. The wavelength selector 2210 was a device using a dielectric multi-layered film that passed light of a central wavelength of 1700 nm of a 0.8 nm half-width with a passing loss of 0.5 dB. The variable attenuator 2213 was adjusted so that the loss at 1700 nm during one round of travel in the optical resonator became 16 dB.

This example has a control part that makes the two resonators oscillate at all times, and this control part has a monitor signal light sampling unit. The monitor signal light sampling unit includes optical splitters 2215, 2211 and optoelectronic transducing circuits 2214, 2216. The optical splitters 2215, 2211 are fusion spliced type fiber couplers, and have an almost constant splitting ratio of 1% in 1470-1750 nm. The optoelectronic transducing circuits 2216, 2214 were InGaAs-PIN-PDs. Light signals were 16 wavelengths from 1480 to 1510 nm at intervals of 2 nm.

The feedback control of the pump light sources is carried out by an oscillation decision circuit 2221 so that the first and second resonators maintain oscillation all the times based on the electric signal from the optoelectronic transducing circuits 2216, 2214.

The input signal level was changed between −25 and −10 dBm/ch, and the gain profile at −25 dBm/ch was determined as the reference gain profile. The maximum deviation from this reference observed against varied input levels was 6 dB with no gain control, while 0.3 dB with gain control.

Now the operation of the optical amplifier of the invention will be specifically described below with reference to the configuration shown in FIG. 15. This is an example which uses two optical resonators that are a first optical resonator and a second optical resonator. In this example, the two optical resonators must be controlled to keep oscillation together in the optical amplifier. For this goal, the optical amplifier includes a function of monitoring each laser oscillation condition (function composed of an optical splitter 2211, optoelectronic transducing circuit 2216, oscillation decision circuit 2221, optical splitter 2215, and optoelectronic transducing circuit 2214, oscillation decision circuit 2221 and others). This function monitors the status of laser oscillation and controls the pump light sources to cause laser oscillation in both resonators all the times.

As shown in FIG. 15, the optical amplifier may include variable attenuators 2212, 2213 and the like that can change the loss during one round of travel in the optical resonator.

Signal light that has passed the optical splitters 2201, 2202, isolator 2203 and pump light/signal light coupler 2204 enters the amplification medium 2226. The amplified signal light from the amplification medium 2226 passes the pump light/signal light coupler 2205, isolator 2206 and optical splitters 2207, 2208 before leaving the system.

The optical resonators are a first optical resonator having an optical splitter 2201, a wavelength selector 2209, a variable optical attenuator 2212, and optical splitters 2215, 2208, and a second optical resonator having optical splitters 2202, 2211, a wavelength selector 2210, a variable optical attenuator 2213, and an optical splitter 2207.

The optical splitter 2215 splits off light in the first resonator and provides it to the optoelectronic transducing circuit 2214. The obtained electric signal is sent to the oscillation decision circuit 2221. The optical splitter 2211 splits off light in the second resonator and provides it to the optoelectronic transducing circuit 2216. The obtained electric signal is sent to the oscillation decision circuit 2221. Based on these electric signals, the pump light driver circuits 2218, 2220 control the intensity of pump light provided by the pump light sources 2217, 2219 so that both resonators may oscillate. The optical splitters can be installed with flexibility as to location.

Example 8

Figure 16:
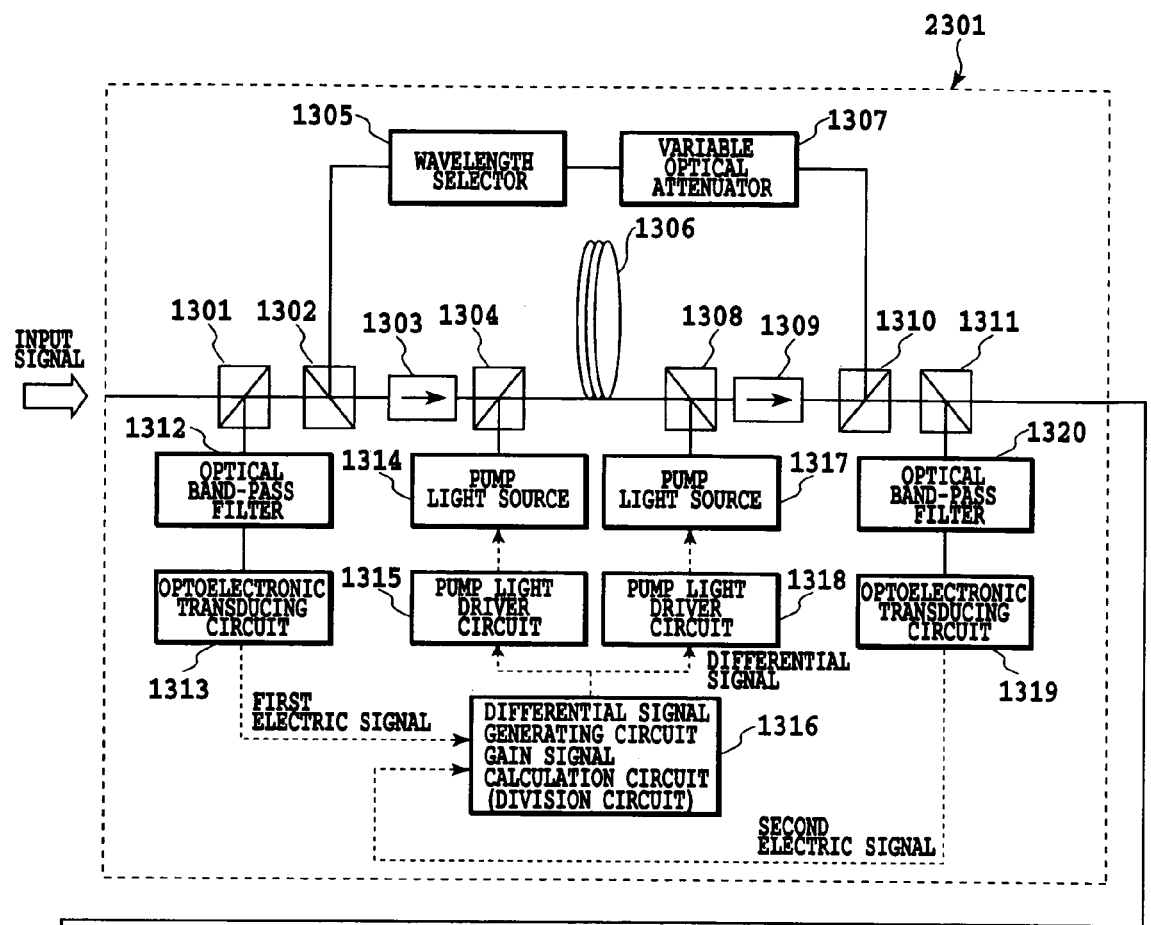
FIG. 16 is a diagram illustrating Example 8 of the optical amplifier of the invention.
Figure 16:
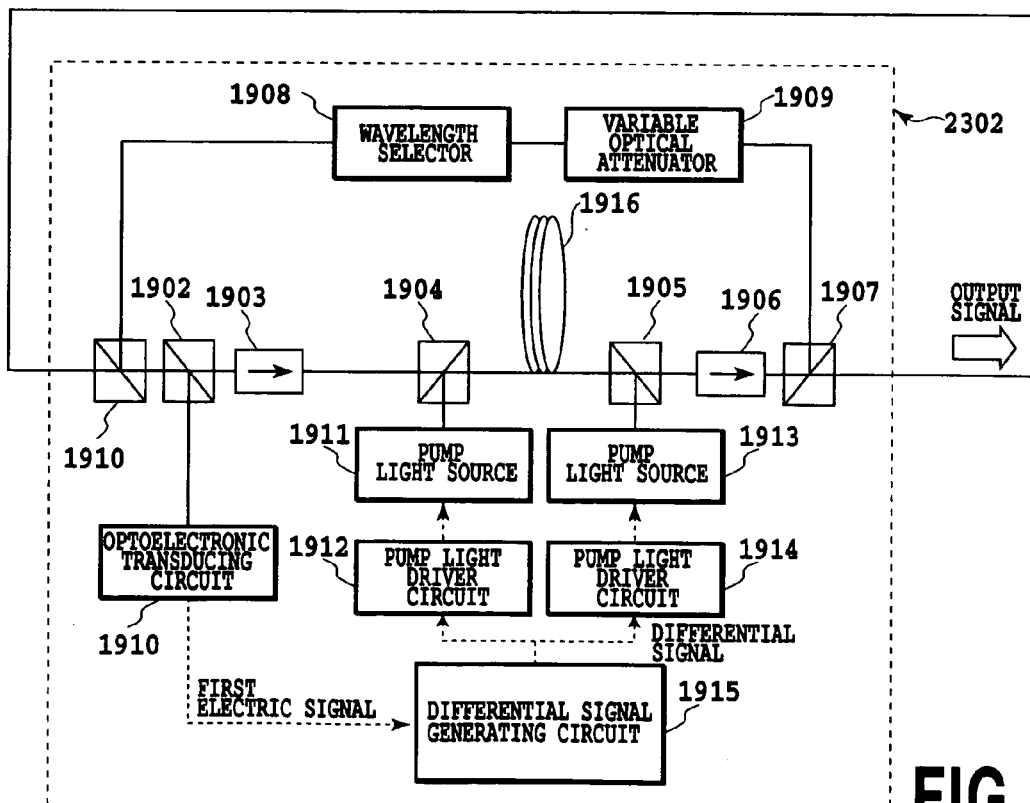

FIG. 16 illustrates an eighth example of the optical amplifier of the invention, which is the case where two single paths are serially connected. Now the first optical amplifier is described. The first optical amplifier 2301 is the same one as that shown in FIG. 9A. Thus the configuration and operation of the optical amplifier 1 is the same as that described in Example 1.

The second optical amplifier 2302 is the same one as that shown in FIG. 12 (Example 4). Thus FIG. 12 is used to describe individual components of this amplifier.

The employed amplification medium 1916 was a Zr-based fluoride fiber where 6000 ppm of Tm ions were doped. This fiber was 7 m long. The pump light sources 1911, 1913 were multi-polarized pumping units where LDs oscillating at 1400 nm were installed so that polarized waves crossed at right angles. The present example using monitor signal lights applied feedback control to all the LDs so that the intensity of pump light from the pump light/signal light coupler 1905 became twice that from the coupler 1905.

The optical splitter 1902 in the monitor signal light sampling part was a bulk type coupler using a dielectric multi-layered film as a filter. Its splitting ratio was 1% in 1460-1530 nm. Light signals were 16 wavelengths from 1480 to 1510 nm at intervals of 2 nm.

The optoelectronic transducing circuit 1910 was a PIN-PD. The optical splitters 1901, 1907 included in the optical resonator had a passing loss of 0.2 dB or less in 1480-1510 nm and a splitting ratio of 95% in 1470-1477 nm. The wavelength selector 1908 was a device using a dielectric multi-layered film that passed light of a central wavelength of 1475 nm of a 0.8 nm half-width with a passing loss of 0.5 dB. The variable attenuator 1909 was adjusted so that the loss at 1475 nm during one round of travel in the optical resonator became 15 dB.

The input signal level was changed between −25 and −10 dBm/ch, and the gain profile at −25 dBm/ch was determined as the reference gain profile. The maximum deviation from this reference observed against varied input levels was 10 dB with no gain control, while 0.3 dB with gain control.

It is possible to arbitrarily select optical amplifiers described in Examples 2, 3, 5, 6 and 7 and serially connect them. Serially connected optical amplifiers are expected to show a high operating efficiency.

Example 9

Figure 17:
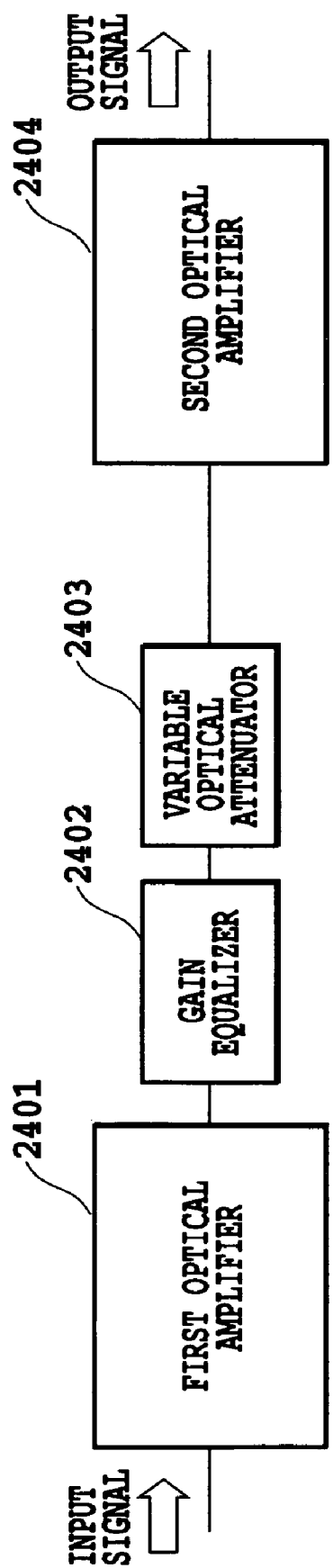
FIG. 17 is a diagram illustrating Example 9 of the optical amplifier of the invention.

FIG. 17 illustrates a ninth example of the optical amplifier of the invention, which is the case where two single paths are serially connected. The optical amplifier of the present example is a device where a gain equalizer 2402 and a variable optical attenuator 2403 are inserted in the junction of the two-stage type optical amplifier described in Example 8.

The gain equalizer 2402 uses a long-interval fiber grating, while the variable optical attenuator 2403 has a flatness of loss of 0.1 dB or less in 1480-1510 nm.

By employing the gain equalizer 2402 and the variable optical attenuator 2403, the present example succeeded in lowering the gain flatness to 2%, compared with 30% obtained for 1480-1510 nm light in Example 8.

The gain flatness is defined as follows:

(Gain flatness)={(Maximum gain in the amplification band)−(Minimum gain in the amplification band)}/(Minimum gain in the amplification band)

The input signal level was changed between −25 and −10 dBm/ch, and the gain profile at −25 dBm/ch was determined as the reference gain profile. The maximum deviation from this reference against varied input levels was 10 dB with no gain control, while 0.3 dB with gain control.

The first and second optical amplifiers 2401 and 2404 can be selected from those described in Examples 1-7. The gain equalizer 2402 is inserted to flatten the gain profile, while the variable optical attenuator 2403 adjusts the intensity of input signal light provided to the second amplifier.

Example 10

Figure 18:
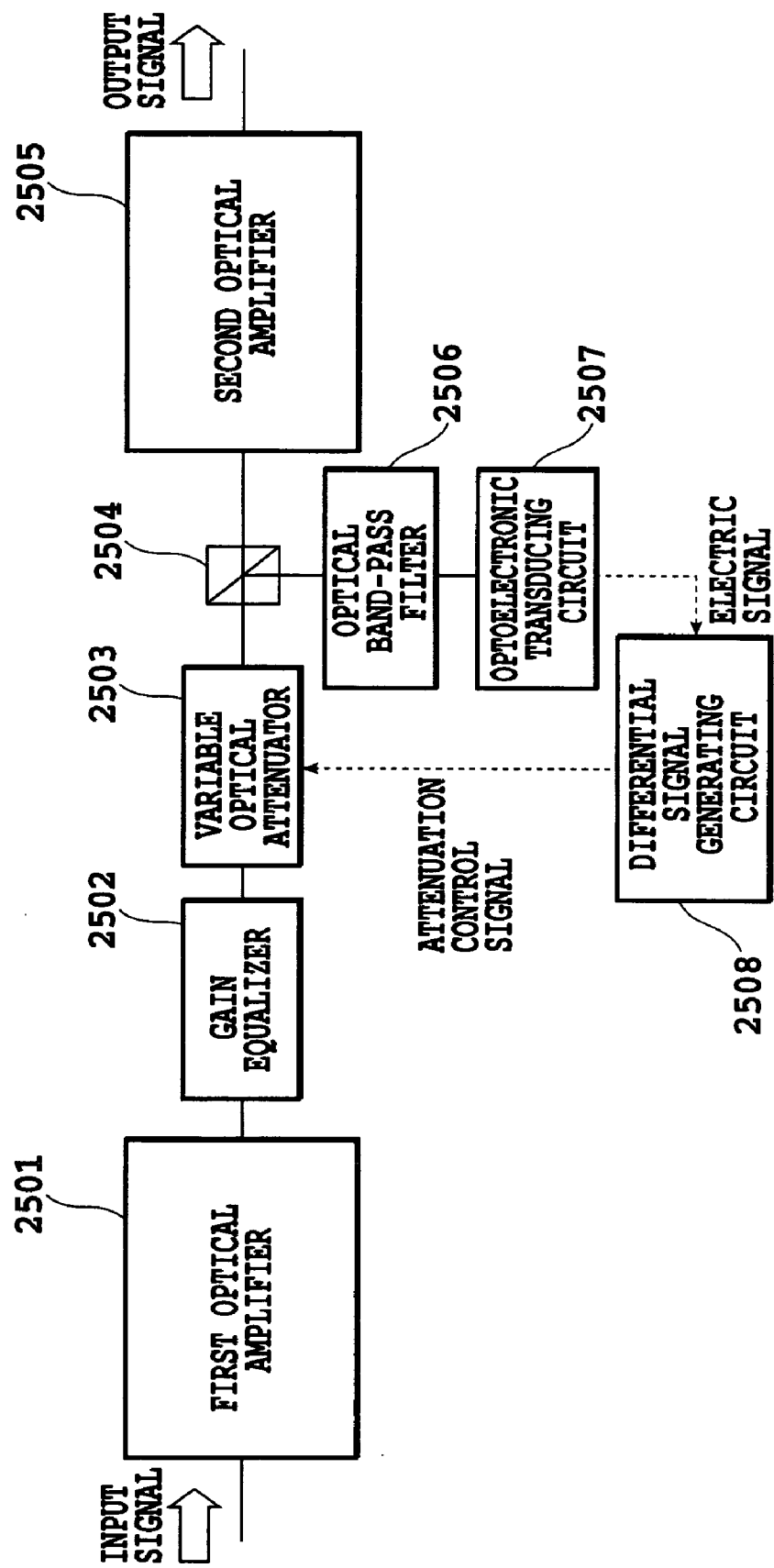
FIG. 18 is a diagram illustrating Example 10 of the optical amplifier of the invention.

FIG. 18 illustrates a tenth example of the optical amplifier of the invention, which is the case where two single paths are serially connected. The optical amplifier of the present example is a device where a gain equalizer 2502 and a variable optical attenuator 2503 are inserted in the junction of the two-stage type optical amplifier described in Example 8. The optical amplifier of the present example further comprises an optical splitter 2504, optical band-pass filter 2506, optoelectronic transducing circuit 2507 and differential signal generating circuit 2508. The optical splitter 2404 is a bulk-type device of a splitting ratio of 1% in 1480-1510 nm. The optical band-pass filter 1506 is a device using a dielectric multi-layered film that passes light of a central wavelength of 1480 nm of a 0.8 nm half-width with a passing loss of 1 dB.

The gain equalizer 2502 uses a long-interval fiber grating, while the variable optical attenuator 2503 has a flatness of loss of 0.1 dB or less in 1480-1510 nm, being capable of controlling the degree of attenuation based on external signals.

In the present example, we monitored the 1480 nm signal light with the above control unit, and applied a feedback control to the variable optical attenuator 2503 via the differential signal generating circuit 2508 in the control unit so as to keep the signal level constant. By such feedback control, the light signals in individual channels show constant levels in the second amplifier 2505.

The present example succeeded in lowering the gain flatness to 2%, compared with 30% obtained for 1480-1510 nm light in Example 8.

The gain flatness is defined as follows:

(Gain flatness)={(Maximum gain in the amplification band)−(Minimum gain in the amplification band)}/(Minimum gain in the amplification band)

The input signal level was changed between −25 and −10 dBm/ch, and the gain profile at −25 dBm/ch was determined as the reference gain profile. The maximum deviation from this reference against varied input levels was 10 dB with no gain control, while 0.3 dB with gain control. The levels of individual WDM signals were kept at a constant value of 3 dBm at the signal output side of the optical amplifier of the Example.

As described in Example 10, the optical amplifier of the invention can include a control unit that controls the variable optical attenuator. The degree of attenuation by the variable attenuator in the optical amplifier can be controlled by such a control unit that has the function of electric control based on sampled monitor signal lights.

The first and second optical amplifiers 2501 and 2505 can be selected from those described in Examples 1-7. The gain equalizer 2502 is inserted to flatten the gain profile. The optical splitter 2504 splits off part of signal light. The optical band-pass filter 2506 takes out signals in an arbitrary channel, and the optoelectronic transducing circuit 2507 converts such signals into electric signals. From the electric signal and a prescribed value set in the differential signal generating circuit 2508, a control signal is generated and this control signal is used to control the variable optical attenuator.

The degree of attention in the variable optical attenuator is controlled by feedback so that the gap between the outputs from the first optical amplifier 2501 and the second optical amplifier 2505 becomes smaller, and preferably zero.

In this example, the input levels in individual channels of WDM signals become equal to each other in the second optical amplifier.

Example 11

Figure 19:
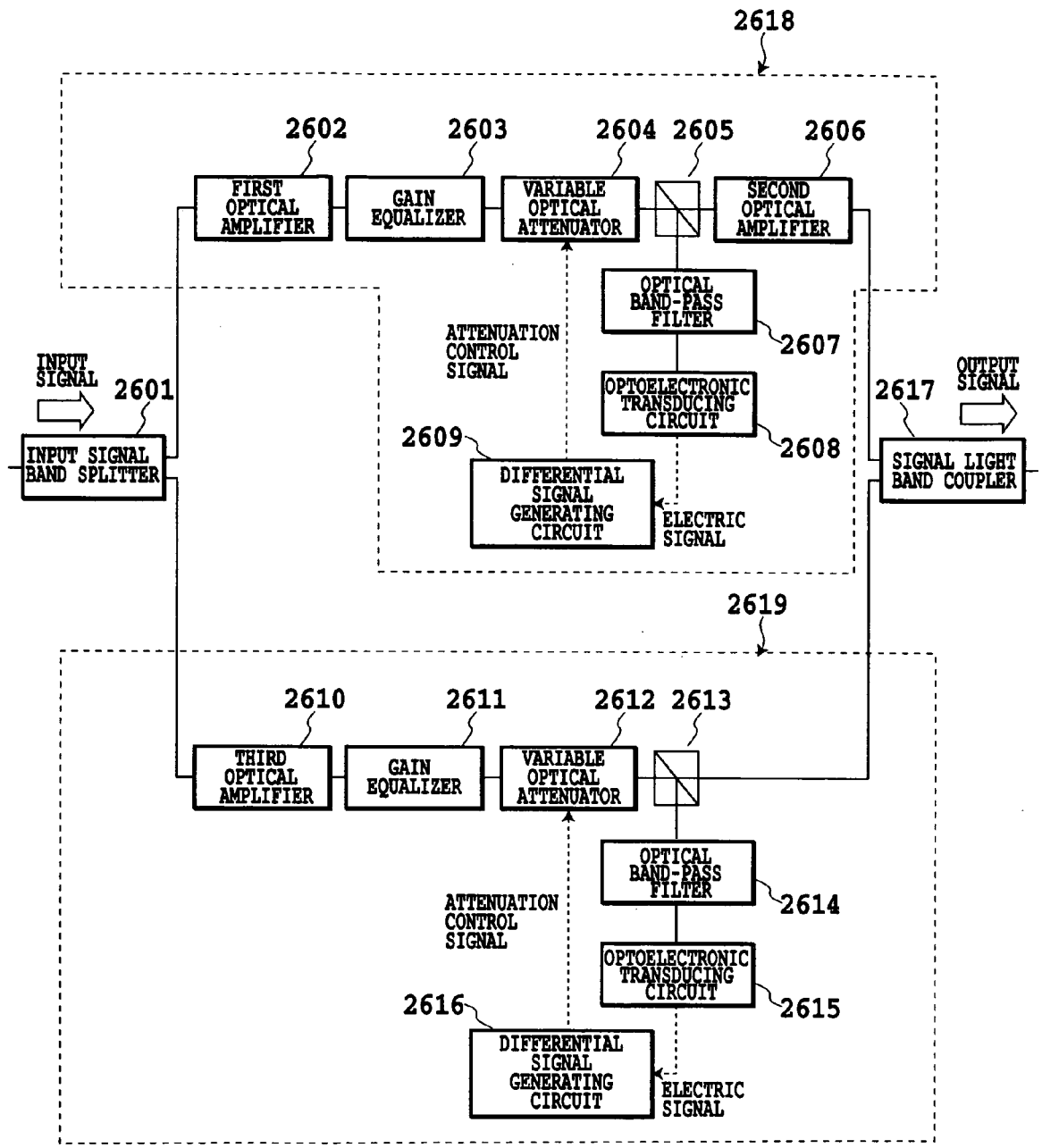
FIG. 19 is a diagram illustrating Example 11 of the optical amplifier of the invention.

FIG. 19 illustrates an eleventh example of the optical amplifier of the invention, which is the case where more than one single path is serially connected. This example uses two optical amplifiers 2618, 2619. This example is an example of dividing the input signal provided to the optical amplifier into two bands, amplifying the divided signals with individual amplifiers, and combining the amplified signals again. In the figure, denoted 2602 is a first optical amplifier, 2603 a gain equalizer, 2604 a variable optical attenuator, 2605 an optical splitter, 2606 a second optical amplifier, 2607 an optical band-pass filter, 2608 and 2615 optoelectronic transducing circuits, and 2609 a differential signal generating circuit.

The optical amplifier 2618 is the same as that used in Example 10. Thus the configuration and operation of the optical amplifier 2618 is the same as that described in Example 10. Now the optical amplifier 2619 is described below.

A third optical amplifier 2610 in the optical amplifier 2619 is the optical amplifier used in Example 1. The optical splitter 2613 is a device for wavelengths between 1460-1490 nm and a bulk-type device of a splitting ratio of 1%. The optical band-pass filter 2614 is a device using a dielectric multi-layered film that passed light of a central wavelength of 1460 nm of a 0.8 nm half-width with a passing loss of 1 dB.

The gain equalizer 2611 uses a long-interval fiber grating, while the variable optical attenuator 2612 has a flatness of loss of 0.1 dB or less in 1460-1490 nm, being capable of controlling the degree of attenuation based on external signals.

The control using the optical amplifier of the present example monitors the 1460 nm signal light and applies a feedback control to the variable optical attenuator 2612 via the differential signal generating circuit 2616 so that the monitored signal becomes constant. Then the levels of the individual light signals coming out from the optical amplifier 2619 become constant.

The signal band splitter 2601 and the signal band coupler 2617 combine the 1460-1476 nm band and the 1480-1510 nm band. The employed light signals are 25 WDM waves in total consisting of 9 waves from 1460 to 1476 nm at intervals of 2 nm and 16 waves from 1480 to 1510 nm at intervals of 2 nm.

When the input signal level was changed between −25 and −10 dBm/ch, the level of output light from the signal coupler 2617 fluctuated 10 dB or more under no control of the invention, while fell in 5.0-5.2 bBm when the control of the invention was employed.

Example 12

This example is an example using the optical amplifier described in third embodiment.

Figure 20A:
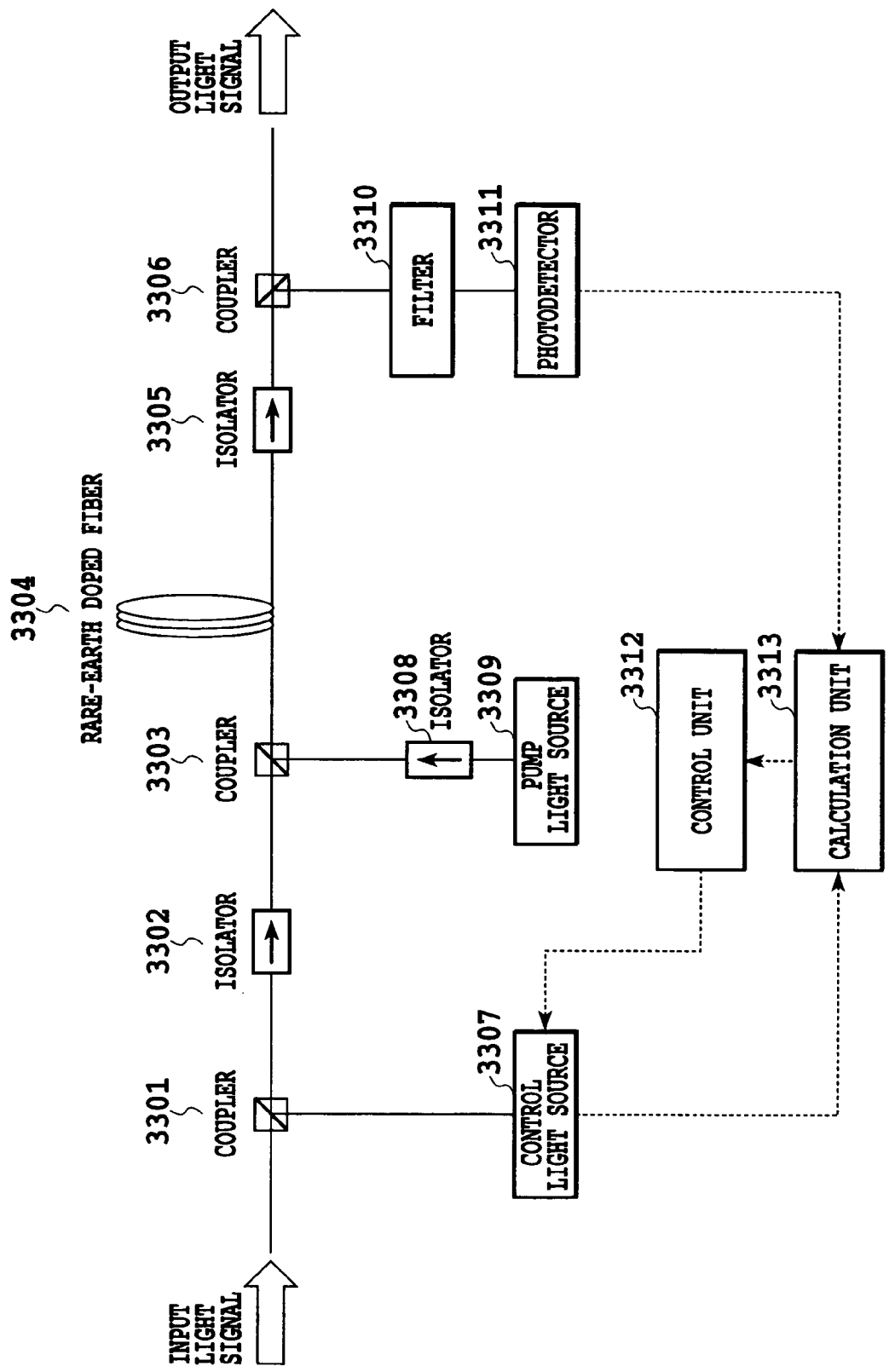
FIG. 20A is a diagram illustrating Example 12 of the optical fiber amplifier of the invention.

FIG. 20A illustrates a diagram illustrating the present example of the optical amplifier of the invention. Referring now to FIG. 20A, this optical amplifier has an amplification medium, for example, an optical fiber 3304 of which core is doped with rare-earth ions, isolators 3302, 3305, 3308, a coupler 3301 for coupling control light and signal light, a coupler 3303 for coupling signal/control light from the isolator 3302 with pump light supplied by a pump light source 3309 via an isolator 3308, a splitter 3306 for splitting off output light taken out from the fiber 3304 via an isolator 3305, a filter 3310 for extracting control light from an output of the splitter 3306, a control light source 3307 having a photodetector therein, a pump light source 3309 for generating pump light, a photodetector 3311 for detecting control light from the filter 3310, a calculation unit 3313 that receives the signal from the control light source 3307 and the signal from the photodetector 3311, and a control unit 3312 for controlling the control light source 3307 based on the output from the calculation unit 3313.

The host glass of the rare-earth doped optical fiber can be silica-based glass, bismuth-based glass, fluoride-based ZBLAN glass that is less likely to cause non-radiation transition, In—Pb glass and Tellurite glass.

The coupler 3301 and the splitter 3306 may be fusion spliced fibers (splitter type, wavelength division multiplexing type), dielectric multi-layered film, or a circulator coupled with a fiber grating. As the coupler 3303, a fusion spliced fiber, a dielectric multi-layered film, or a circulator coupled with a fiber grating can be used. The control light source 3307 that emits control light and the pump light source 3309 that emits pump light can be solid lasers such as Nd-YLF laser, Nd-YAG laser, Ti-sapphire laser, semiconductor lasers or fiber lasers. The filter 3310 can be a dielectric multi-layered film, a fiber grating or the like.

In the present example, the light signals were 16 waves from 1480 to 1510 nm at intervals of 2 nm, the optical fiber 3304 for the amplification was a 5 m fiber of which host glass was ZBLAN fluoride glass with core where 6000 ppm of Thulium ions were doped, the wavelength of control light was 1520 nm, the wavelength of pump light was 1400 nm, the central wavelength of isolators 3302, 3305 was 1480 nm, the coupler 3301 and the splitter 3306 were dielectric multi-layered film type wavelength division multiplexing couplers that split/combined the 1512 nm or shorter bands and the 1518 nm or longer band, the coupler 3303 was a dielectric multi-layered film type wavelength division multiplexing coupler that split/combined the 1430 nm or shorter band and the 1440 nm or longer band, and the filter 3310 passed light of a central wavelength of 1520 nm of a 0.8 nm half-width. The power of pump light was fixed at 300 mW.

As shown in FIG. 20A, the signal light was combined with the control light from the control light source 3307 by the coupler 3301, passing the isolator 3302, combined with pump light from the isolator 3308 by the coupler 3303, passing the optical fiber 3304 and the isolator 3305, and split off signal light as output at the splitter 3306.

The power of the input control light provided to the optical fiber 3304 was detected by a photodetector installed in the control light source 3307. The power of output control light from the optical fiber 3304 was split by the splitter 3306, passing the filter 3310, detected by the photodetector 3311, and then sent to the calculation unit 3313 in the form of an electric signal.

The calculation unit 3313 calculated the gain of control light from the received detection value, calculated the current for the control light source 3307 that was equal to the prescribed value, and the value was sent to the control unit 3312.

The control unit 3312 controlled the light intensity in the control light source 3307 so that its current became equal to that sent from the calculation unit 3313.

Since the wavelength of control light lies in the amplification band, the gain profile can be held constant by adjusting the intensity of control light so that the gain of the control light does not change.

Figure 20B:
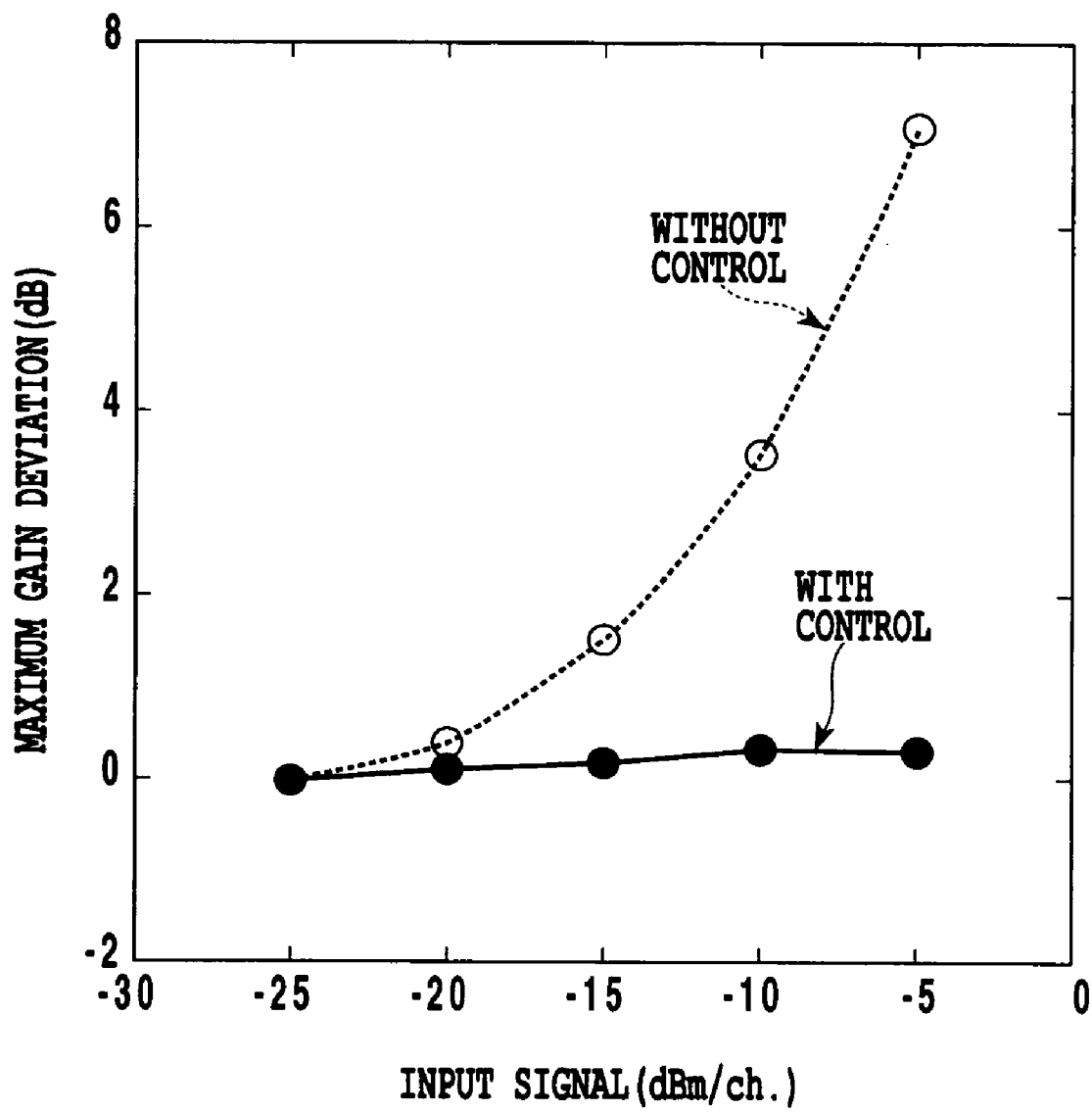
FIG. 20B is a diagram where the maximum deviations of gain profile are plotted against varied input signal levels.

FIG. 20B is a graph where the maximum values in deviations in gain profile were plotted against varied input signal levels in Example 12. With reference to the gain spectrum at −25 dBm/ch, the maximum deviation of each gain spectrum observed when the input signal levels set at −25, −20, −15 to −10 dBm/ch were inputted, were plotted in this graph. The gains were measured by scanning a −35 dBm weak probe light. The dotted line in FIG. 20B shows the result provided by a conventional method adopting no gain control using monitored signal lights. The solid line in FIG. 20B shows the values obtained when the gain at 1520 nm was held constant by the monitoring system using 1520 nm control light. FIG. 20B demonstrates that the proposed control succeeded in holding the gain profile constant.

Example 13

Figure 21A:
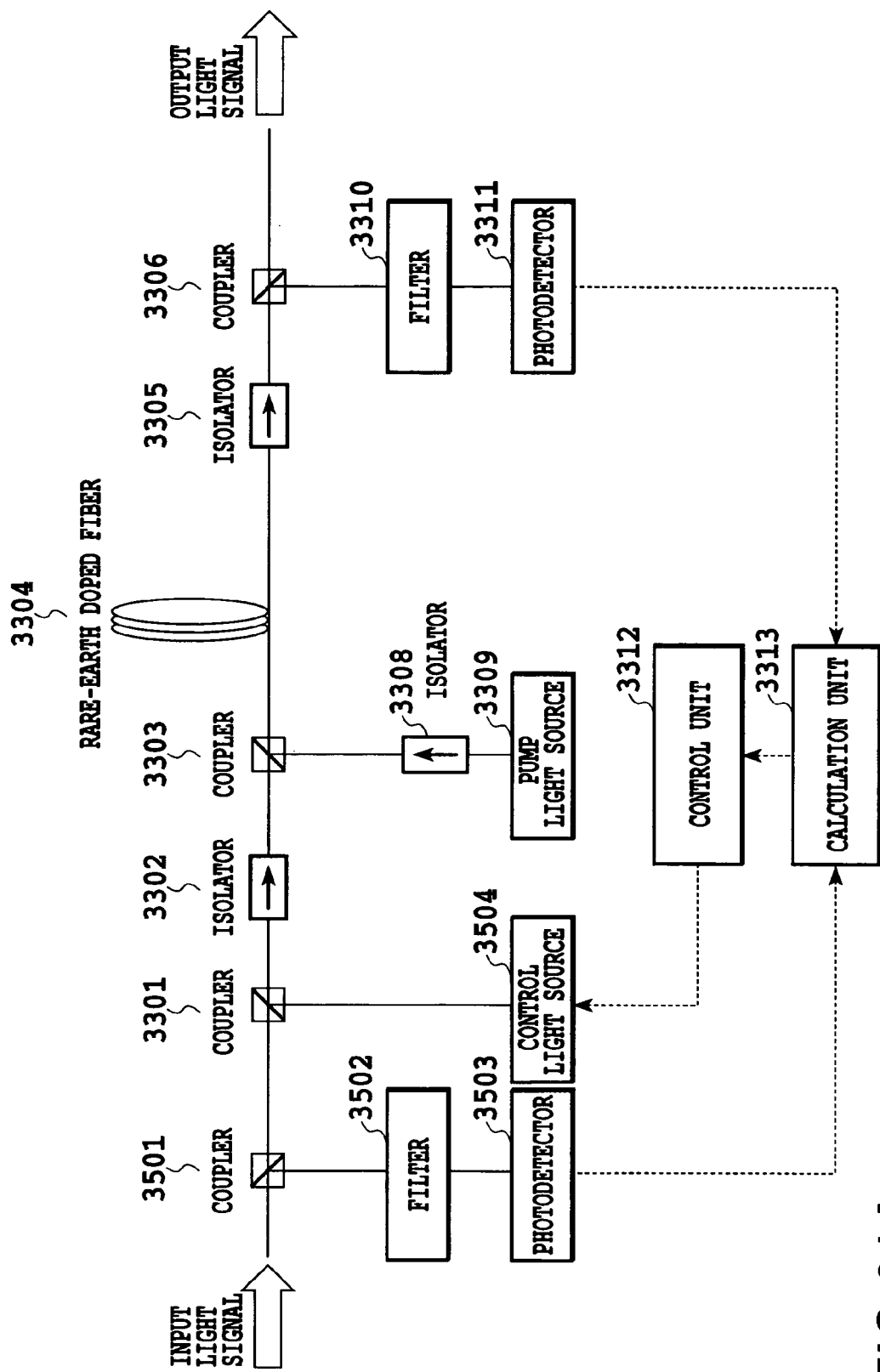
FIG. 21A is a diagram illustrating Example 13 of the optical fiber amplifier of the invention.

FIG. 21A is a diagram illustrating the 13th example of the optical amplifier of the invention. The same components have the same numerals in FIGS. 21A and 20A, and their description is not repeated here. Referring now to FIG. 21A, in addition to the components shown in FIG. 20A, this optical amplifier has a splitter 3501 that splits off signal light sent to/from the amplifier, a filter 3502 for extracting signal light from the splitter 3501, a control light source 3504, and a photodetector 3503 that detects the power of signal light sent from the filter 3502. In the present example, the splitter 3306 splits output signal light, filter 3310 extracts signal light and photodetector 3311 detects the signal light power.

The splitter 3501 may be a fusion spliced fiber (splitter type, wavelength division multiplexing type), dielectric multi-layered film, or a circulator coupled with a fiber grating. The control light source 3504 that emits control light can be solid lasers such as Nd-YLF laser, Nd-YAG laser, Ti-sapphire laser, semiconductor lasers or fiber lasers. The filter 3502 can be a dielectric multi-layered film, a fiber grating or the like.

In the present example, the signal waves were 16 waves of 1470 to 1500 nm at intervals of 2 nm, the optical fiber 3304 was a 10 m fiber of which host glass was ZBLAN fluoride glass with core where 4000 ppm of Thulium ions were doped, the wavelength of control light was 1460 nm, the wavelength of pump light was 1400 nm, the central wavelength of isolators 3302, 3305 was 1480 nm, the coupler 3501 and the splitter 3306 were fiber couplers of a splitting ratio of 95:5, the coupler 3301 was a dielectric multi-layered film type wavelength division multiplexing coupler that split/combined the 1462 nm or shorter band and the 1468 nm or longer band, the coupler 3304 was a dielectric multi-layered film type wavelength division multiplexing coupler that split/combined the 1430 nm or shorter band and the 1440 nm or longer band, and the filters 3502, 3310 passed light of a central wavelength of 1510 nm of a 0.8 nm half-width. The power of pump light was fixed at 300 mW. One channel of wavelength division multiplexed light to be monitored was 1510 nm input light.

As shown in FIG. 21A, the signal light was split by the splitter 3501, the signal light split by the splitter 3501 was combined with control light from the control light source 3504 by the coupler 3301, passing the isolator 3302, combined with pump light from the isolator 3308 by a WDM coupler 3303, passing the optical fiber 3304 and the isolator 3305, and split off to provide signal light as output at the splitter 3306.

The power of the 1510 nm input signal light was split by the splitter 3501, passing the filter 3502, detected by the photodetector 3503, while the 1510 nm output signal light was split by the splitter 3506, passing the filter 3310, detected by the photodetector 3311, and the detected value was sent to the calculation unit 3313 in the form of an electric signal.

The calculation unit 3313 calculated the gain of the 1510 nm signal light based on the received detection value, and the current in the control light source 3504 was calculated so as to agree with a prescribed value, and the calculated current value was sent to the control unit 3312. The control unit 3312 controlled the light intensity of the control light source 3504 so that its current became equal to the current sent from the calculation unit 3313. In this example, the light intensity of the control light source 3504 was controlled with reference to the detected signal light power of one channel at 1510 nm. However, two or more channels can be used for such control. Further, such control can be implemented by utilizing the entire signal light of the prescribed wavelength range for monitored signal light. For example, the signal light power in each channel in 1470-1500 nm is summed up, and the gain calculated from this sum can be used to control the light intensity in the control light source 3504 as described above.

Figure 21B:
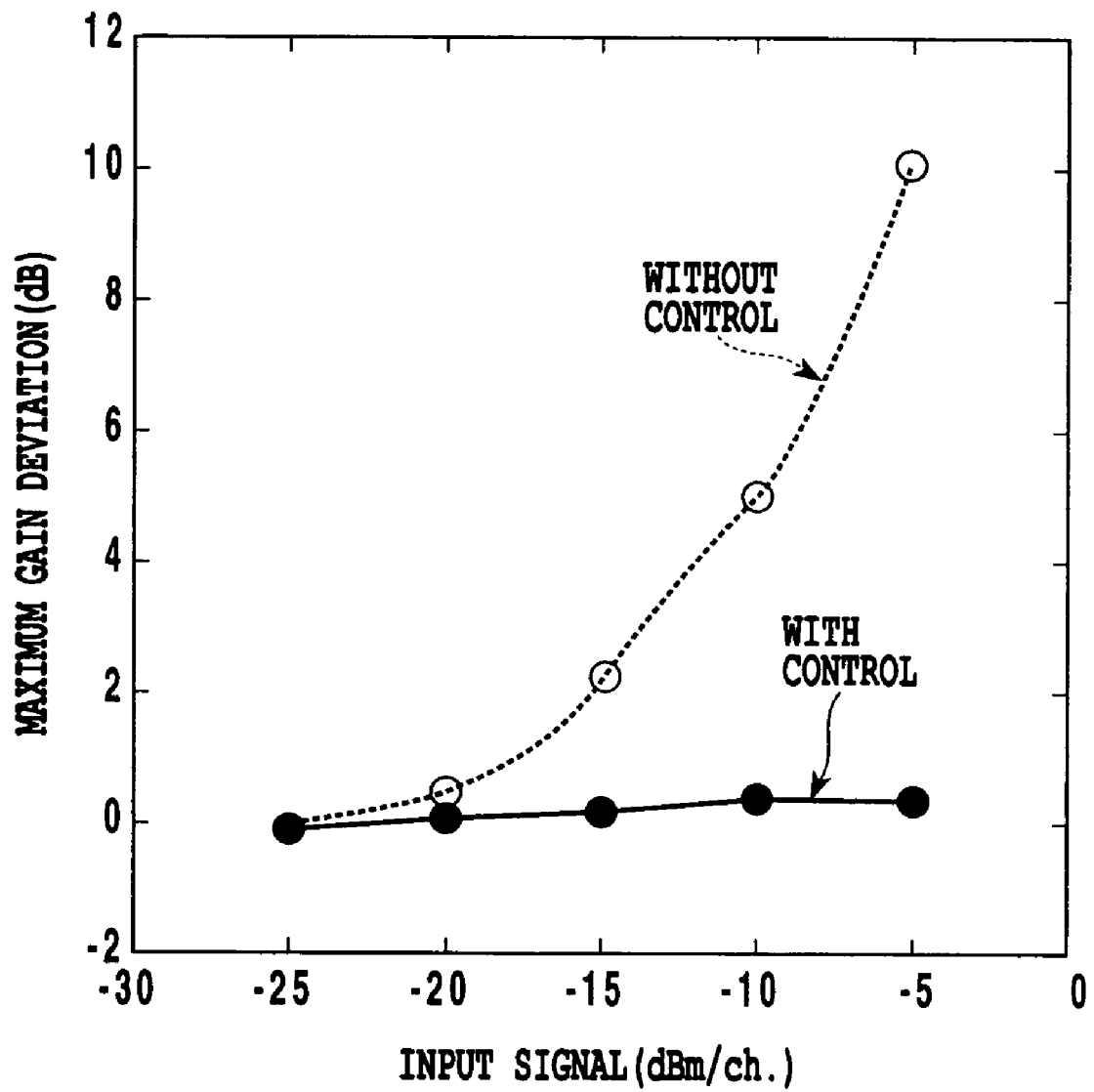
FIG. 21B is a diagram where the maximum deviations of gain profile are plotted against varied input signal levels.

FIG. 21B is a graph where the maximum values in deviations in gain profile were plotted against varied input signal levels. With reference to the gain spectrum at −25 dBm/ch, the maximum deviation of each gain spectrum observed when the input signal levels set at −25, −20, −15 and −10 dBm/ch were inputted, were plotted in this graph. The gains were measured by scanning a −35 dBm weak probe light. The dotted line in FIG. 21B shows the result provided by a conventional method adopting no gain control using monitored signal lights. The solid line in FIG. 21B shows the values obtained when the gain at 1510 nm was held constant by the monitoring system utilizing 1510 nm signal light. This figure demonstrates that the proposed control succeeded in holding the gain profile constant.

Example 14

Example 14-1

Figure 22A:
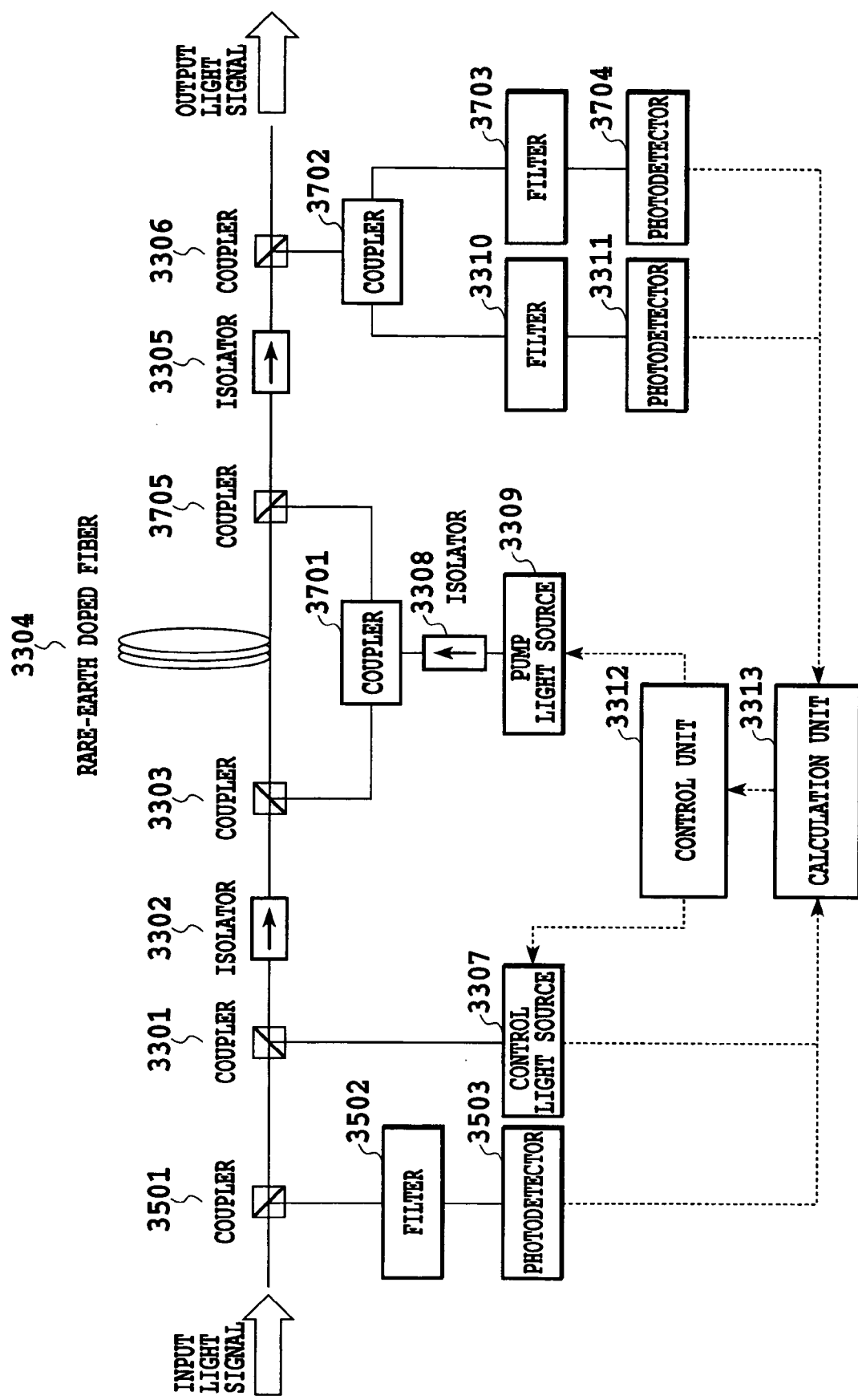
FIG. 22A is a diagram illustrating a Example 14-1 of the optical fiber amplifier of the invention.

FIG. 22A is a diagram illustrating a 14$^{th}$ example of the optical amplifier of the invention. The same components have the same numerals in FIGS. 21A and 22A, and their description is not repeated here. Referring now to FIG. 22A, in addition to the components shown in FIG. 21A, this optical amplifier has a splitter 3702 that splits output light from the splitter 3306, a filter 3703 for extracting control light from the splitter 3702, a photodetector 3704 that detects the power of control light extracted by the filter, a splitter 3701 splits pump light from the isolator 3308 to couplers 3303, 3705, and a coupler 3705 that combines signal light from the optical fiber 3304 and pump light from the splitter 3701. The control light source 3307 has a photodetector therein that detects the power of input control light source.

The coupler 3705 may be a fusion spliced fiber dielectric multi-layered film, or circulator coupled with a fiber grating. As the filter 3703, a dielectric multi-layered film or a fiber grating can be used.

In the present example, the signal light waves were 16 waves of 1460 to 1490 nm at intervals of 2 nm, the optical fiber 3304 was a 20 m fiber of which host glass was ZBLAN fluoride glass with core where 2000 ppm of Thulium ions were doped, the wavelength of control light of the control light source 3307 was 1450 nm, the wavelength of pump light was 1390 nm, the central wavelength of isolators 3302, 3305 was 1480 nm, the splitters 3501, 3306 were fiber couplers of a splitting ratio of 95:5, the coupler 3301 was a dielectric multi-layered film type wavelength division multiplexing coupler that split/combined the 1452 nm or shorter band and the 1458 nm or longer band, the splitters 3701, 3702 were fiber couplers of which splitting ratio was 3 dB, the couplers 3303, 3705 were dielectric multi-layered film type wavelength division multiplexing couplers that split/combined the 1430 nm or shorter band and the 1440 nm or longer band, the filters 3502, 3310 passed light of a central wavelength of 1490 nm of a 0.8 nm half-width, and the filter 3703 passed light of a central wavelength of 1450 nm of a 0.8 nm half-width. The monitored signal lights were 1450 nm control light and 1490 nm signal light.

Now suppose that the gains of two monitored signal lights are expressed by G(1450 nm) and G(1490 nm), and define the sum of gains Gs and the gain difference $\Delta G$ as follows:

$$Gs = G(1450 \text{ nm}) + G(1490 \text{ nm}) \quad (1)$$

$$\Delta G = G(1450 \text{ nm}) - G(1490 \text{ nm}) \quad (2)$$

If Gs and $\Delta G$ are determined uniquely, then G(1450 nm) and G(1490 nm) are determined. Thus G(1450 nm) and G(1490 nm) can be controlled by adjusting Gs and $\Delta G$.

Figure 22B:
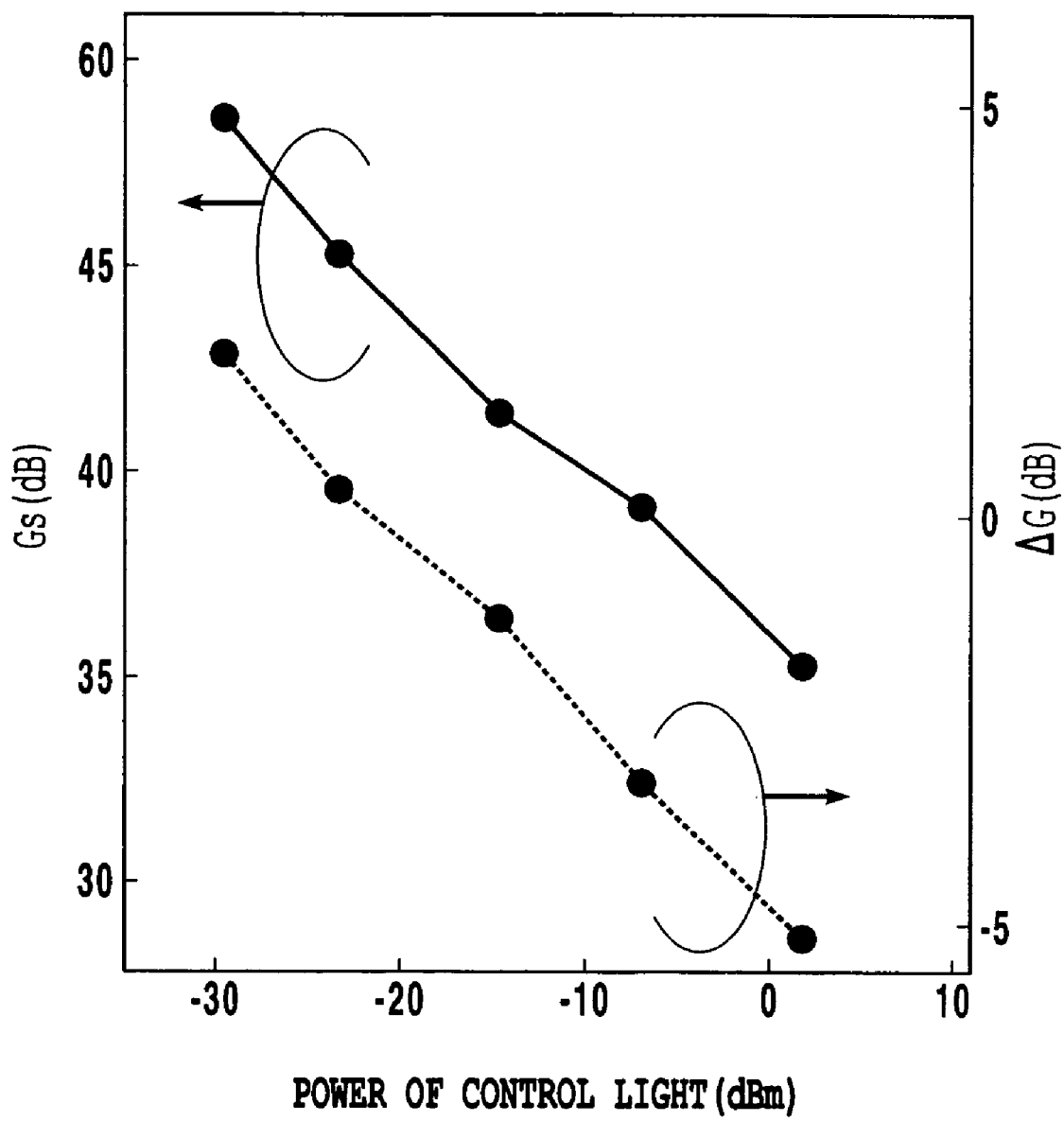
FIG. 22B is a diagram where the sum Gs of gains of two monitored signal lights and their gain difference ΔGs were plotted when the input signal light power was fixed at −15 dBm/ch, the pump light power was fixed at 400 mW and the power of control light was varied.

FIG. 22B is a graph that plotted the gain sum Gs and gain difference $\Delta G$ of two monitored signal lights observed when the control light power was varied, with the input signal light power and the pump light power being fixed at −15 dBm/ch and 400 nW, respectively, in this example. Gs is shown with a solid line, while $\Delta G$ is shown with a broken line. Gs and $\Delta G$ decreased monotonously as the control light power increased.

Figure 22C:
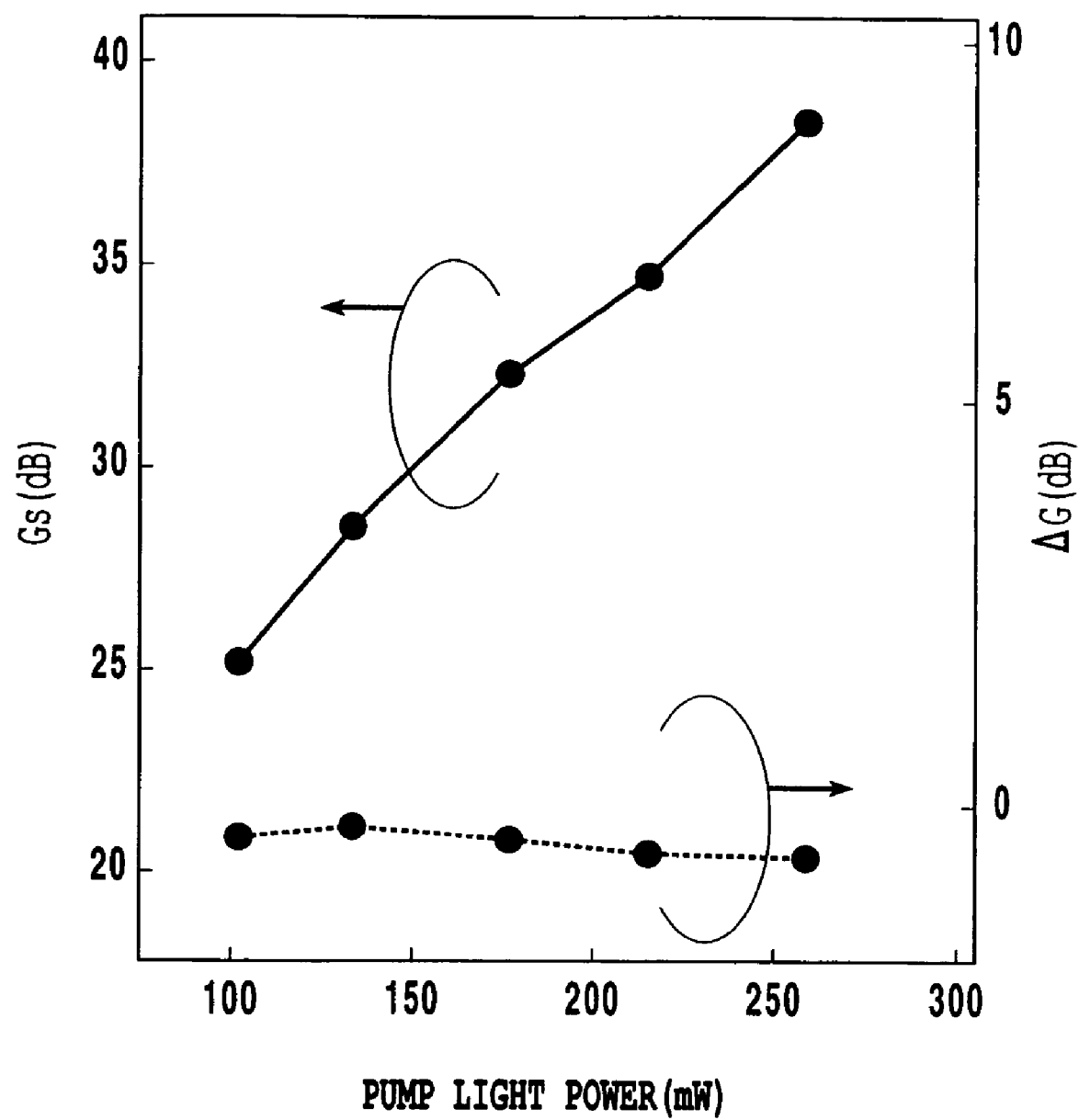
FIG. 22C is a diagram where the sum Gs of gains of two monitored signal lights and their gain difference ΔGs were plotted when the input signal light power was fixed at −15 dBm/ch, the control light power was fixed at −15 dBm and the pump light power was varied.

FIG. 22C is a graph that plotted the gain sum Gs and gain difference $\Delta G$ of two monitored signal lights observed when the control light power was varied, with the input signal light power and the control light power being fixed at −15 dBm/ch and −15 dBm, respectively, in the this example. Like FIG. 22B, Gs is shown with a solid line, while $\Delta G$ is shown with a broken line. Gs increased monotonously as the control light power increased, while $\Delta G$ did not change almost at all.

The results shown in FIGS. 22B and 22C indicate that the gain spectrum can be controlled by the following control algorithm. If the monitored signal light gain has changed, the control light power, which does not change almost at all even when the pump light power is varied, is controlled so that $\Delta G$ becomes a desired value, while fixing the pump light power. Next, the control light power is fixed, and the pump light power is adjusted to get a desired Gs. The gain spectrum can thereby be controlled.

As shown in FIG. 22A, the signal light is partially split by the splitter 3501, combined with control light from the control light source 3307 by the coupler 3301, passing the isolator 3302, combined with pump light from the splitter 3701 by the coupler 3303, passing the optical fiber 3304 and then the coupler 3705 that combines pump light from the splitter 3701 with signal light, further passing the isolator 3305, and partially split by the splitter 3306 to be outputted as output signal light.

From the signal light partially split by the splitter 3501, the filter 3502 extracts only 1490 nm signal light, and then the photodetector 3503 detects this signal light. The photodetector in the control light source 3307 detects the power of control light provided to the amplifier. The output light split off by the splitter 3306 is further split by the splitter 3702. From one of the split light beams, only 1490 nm signal light is extracted by the filter 3310, and the extracted light is detected by the photodetector 3311. Meanwhile, from the other split light beam, only 1450 nm control light is extracted by the filter 3703 and detected by the photodetector 3704. These detected light signals are converted into electric signals, and then sent to the calculation unit 3313.

The calculation unit 3313 calculates the gains of signal light and control light based on the received detection values to calculate Gs and $\Delta G$, then calculates the currents for the control light source and the pump light source so that Gs and $\Delta G$ agree with prescribed values. These calculated current values are sent to the control unit 3312.

The control unit 3312 adjusts the control light source 3307 and pump light source 3309 so as to attain the current values sent from the calculation unit 3313.

Figure 22D:
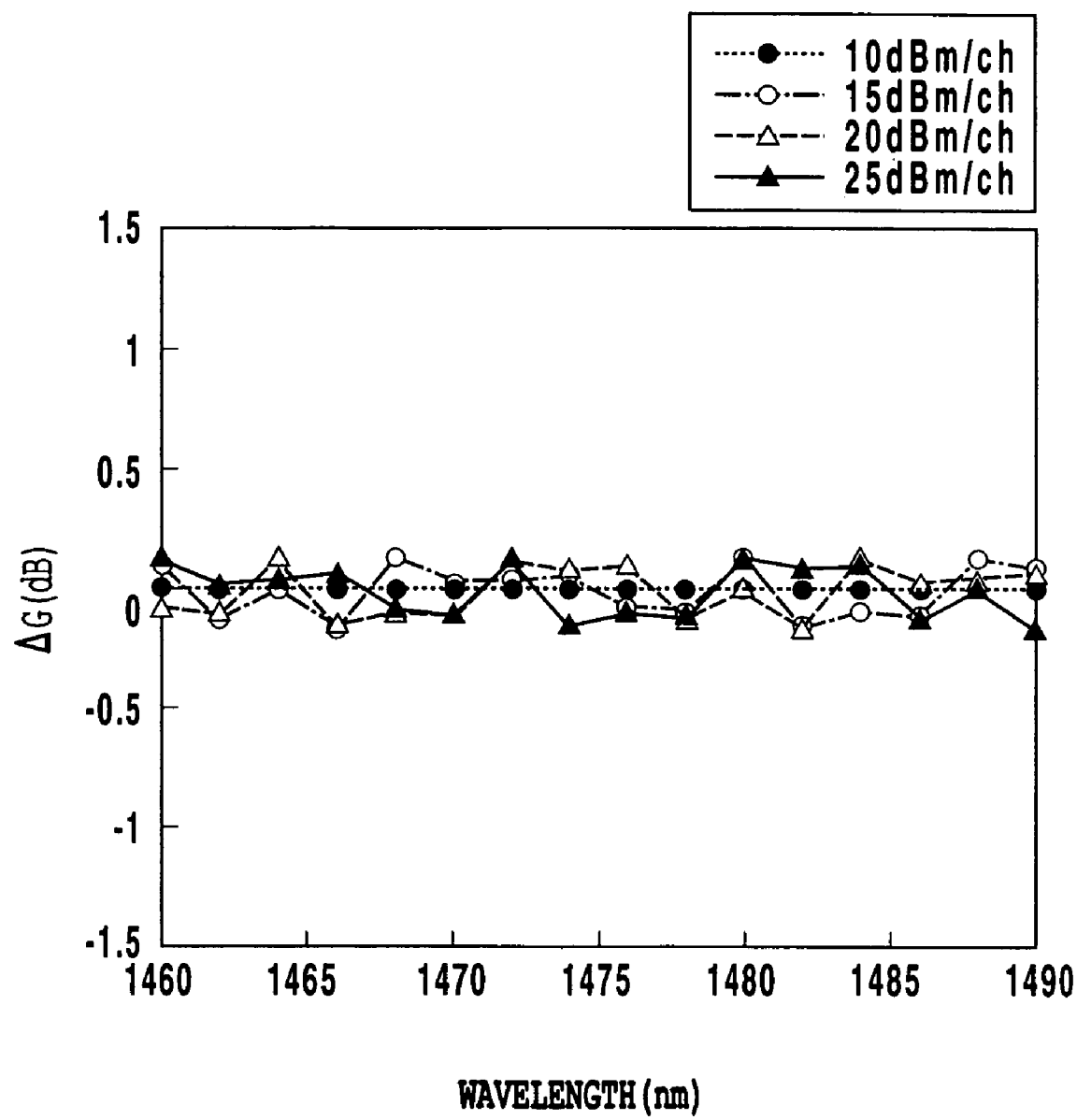
FIG. 22D is a diagram demonstrating the results where the deviations of gain spectra at individual input conditions (−25, −20, −15 and −10 dBm/ ch) were plotted based on the gain spectra when the gain is controlled and when −10 dBm/ch is inputted.

FIG. 22D is a graph where gain spectrum deviations from the reference gain spectrum at −10 dBm/ch observed when the input signal levels (−25, −20, −15 and −10 dBm/ch) were varied under the gain control of the invention are plotted. The deviations were 0.3 dB or less for all the input conditions, and this demonstrates the effectiveness of the present invention.

Example 14-2

Figure 22E:
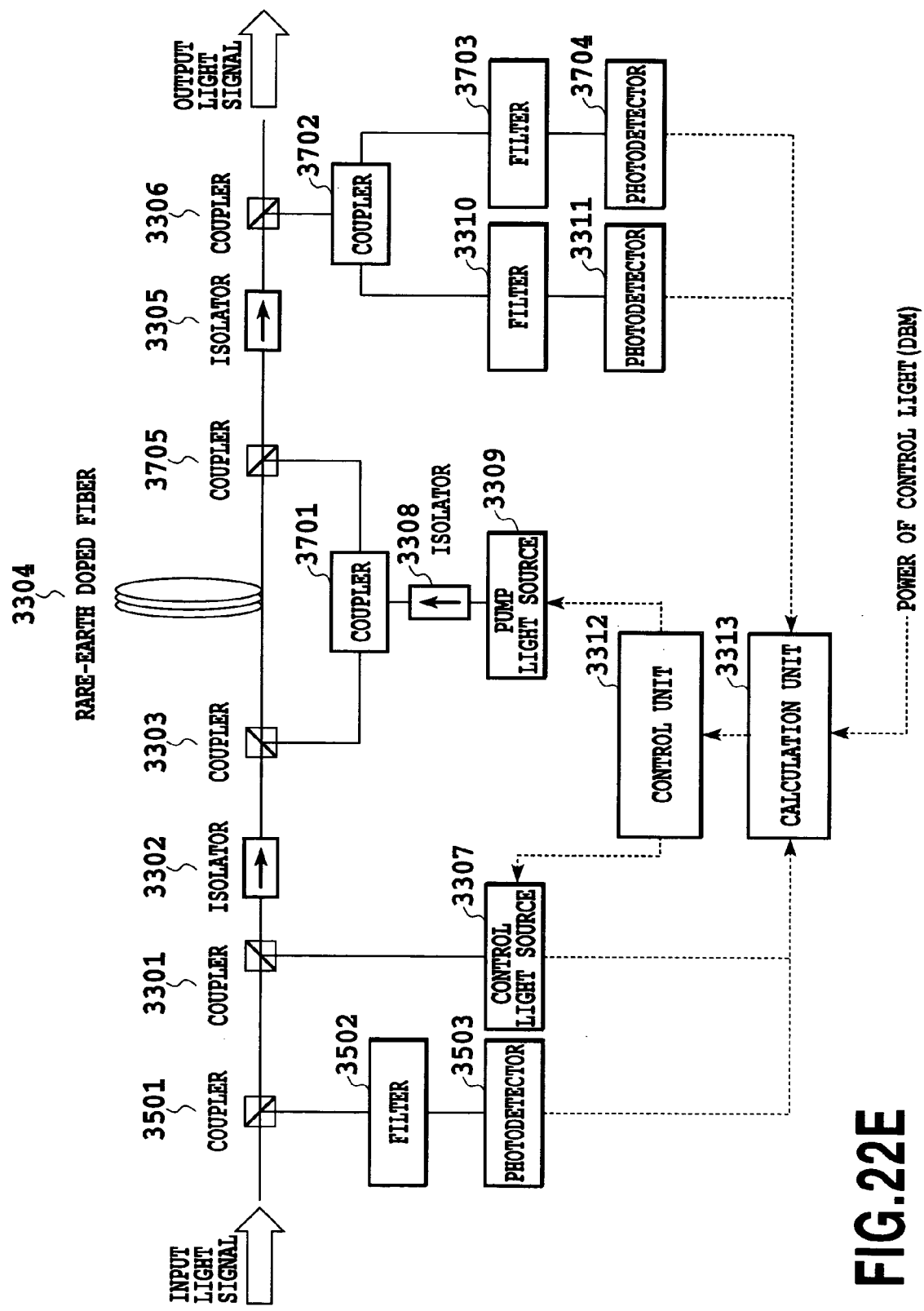
FIG. 22E is a diagram illustrating the configuration of Examples 14-2 to 14-4.

The configuration of the present example is the same as that described in Example 14-1 referred to FIG. 22A, except for performing numerical settings in the calculation unit. Thus the components and units other than the calculation unit are the same as those employed in Example 14-1. The following description refers to FIG. 22E.

In the present example, the signal light waves were 16 waves of 1490 to 1520 nm at intervals of 2 nm, the optical fiber 3304 was a 4 m fiber of which host glass was ZBLAN fluoride glass with core where 8000 ppm of Thulium ions were doped, the wavelength of control light of the control light source 3307 was 1470 nm, the wavelength of pump light was 1400 nm, the central wavelength of isolators 3302, 3305, 3308 was 1470 nm, the splitters 3501, 3306 were fiber couplers of a splitting ratio of 95:5, the coupler 3301 was a dielectric multi-layered film type wavelength division multiplexing coupler that split/combined the 1472 nm or shorter band and the 1478 nm or longer band, the splitters 3701, 3702 were fiber couplers of which splitting ratio was 3 dB, the couplers 3303, 3705 were dielectric multi-layered film type wavelength division multiplexing couplers that split/combined the 1430 nm or shorter band and the 1440 nm or longer band, the filters 3502, 3310 passed waves of 1490-1520 nm, and the filter 3703 passed light of central wavelength of 1470 nm of a 0.8 nm half-width. The monitored signal lights were control light at 1470 nm and all the light signals of prescribed 1490-1520 nm.

Now suppose that the gains of two monitored signal lights are expressed by G(1470 nm) and G(1490–1520 nm), and define the sum of gains Gs and the gain difference ΔG as follows:

$$Gs = G(1470 \text{ nm}) + G(1490-1520 \text{ nm}) \quad (1)$$

$$\Delta G = G(1470 \text{ nm}) - G(1490-1520 \text{ nm}) \quad (2)$$

If Gs and ΔG are determined uniquely, then G(1470 nm) and G(1490–1520 nm) are determined. Thus G(1470 nm) and G(1490–1520 nm) can be controlled by adjusting Gs and ΔG.

Because Gs and ΔG of this example behave like those of Example 14-1 against changes in the pump light power and control light power, the gain spectrum can be controlled by the same control algorithm. As is the case with Example 14-1, the input signal light enters the splitter 3501, being split by the splitter 3306, and one of the split beams comes out as signal light.

From the signal light split by the splitter 3501, the filter 3502 extracts only the prescribed 1490-1520 nm signal light, the photodetector 3503 detects this light. The photodetector in the control light source detects the power of control light to be provided to the optical fiber. The signal light and control light split by the splitter 3306 is further split by the splitter 3702. From one of the split light beams, only 1490-1520 nm signal light is extracted by the filter 3310, and the extracted light is detected by the photodetector 3311. Meanwhile, from the other split light beam, only 1470 nm control light is extracted by the filter 3703 and detected by the photodetector 3704. These detected light signals are converted into electric signals, and then sent to the calculation unit 3313. Much like Example 14-1, the control unit 3312 controls light intensity in the control light source 3307 and pump light source 3309.

Gain spectrum deviations from the reference gain spectrum observed when the input signal level was varied from −25 to −10 dBm/ch under the gain control of the invention were 0.3 dB or less, and this demonstrates the effectiveness of the present invention.

Example 14-3

The configuration of the present example is the same as that described in Example 14-1 referred to FIG. 22A, and the employed components and units are the same as those used in Example 14-1. The optical fiber is, however, a Ho-doped fiber, and this is a difference from Example 14-1. Now the following description refers to FIG. 22A.

In the present example, the signal light waves were 16 waves of 2890 to 2920 nm at intervals of 2 nm, the optical fiber 3304 was a 20 m fiber of which host glass was ZBLAN fluoride glass with core where 1000 ppm of Holmium ions ($Ho^{3+}$) were doped, the wavelength of control light of the control light source 3307 was 2880 nm, the wavelength of pump light was 1200 nm, the central wavelength of isolators 3302, 3305 was 2900 nm, the splitters 3501, 3306 were fiber couplers of a splitting ratio of 95:5, the coupler 3301 was a dielectric multi-layered film type wavelength division multiplexing coupler that split/combined the 2882 nm or shorter band and the 2888 nm or longer band, the splitters 3701, 3702 were fiber couplers of which splitting ratio was 3 dB, the couplers 3303, 3705 were dielectric multi-layered film type wavelength division multiplexing couplers that split/combined the 1300 nm or shorter band and the 1310 nm or longer band, the filters 3502, 3130 passed waves of 2890-2920 nm, and the filter 3703 passed light of central wavelength of 2880 nm of a 0.8 nm half-width. The monitored signal lights were 2880 nm control light and all the light signals of prescribed 2890-2920 nm.

Now suppose that the gains of two monitored signal lights are expressed by G(2880 nm) and G(2890–2920 nm), and define the sum of gains Gs and the gain difference ΔG as follows. As is the case with Example 14-2, gain sum Gs and gain difference ΔG are calculated, the currents in the control light source and pump light source are calculated so that Gs and ΔG become equal to those externally provided, and these current values are sent to the control unit 3312. The control unit 3312 controls the control light source 3307 and pump light source 3309 so that their currents agree with the received values.

$$Gs = G(2880 \text{ nm}) + G(2890-2920 \text{ nm}) \quad (1)$$

$$\Delta G = G(2880 \text{ nm}) - G(2890-2920 \text{ nm}) \quad (2)$$

Gain spectrum deviations from the reference gain spectrum observed when the input signal level was varied from −25 to −10 dBm/ch under the gain control of the invention were 0.3 dB or less, and this demonstrates the effectiveness of the present invention.

Example 14-4

The configuration of the present example is the same as that described in Example 14-1 referred to FIG. 22A, and the employed components and units are the same as those used in Example 14-1. The amplifier filter is, however, an Er-doped fiber and this is a difference from Example 14-1. Now the following description refers to FIG. 22A.

In the present example, the signal light waves were 16 waves of 1690 to 1720 nm at intervals of 2 nm, the optical fiber 3304 was a 15 m fiber of which host glass was ZBLAN fluoride glass with core where 2000 ppm of Erbium ions ($Er^{3+}$) were doped, the wavelength of control light of the control light source 3307 was 1680 nm, the wavelength of pump light was 800 nm, the central wavelength of isolators 3302, 3305 was 1700 nm, the splitters 3501, 3306 were fiber couplers of a splitting ratio of 95:5, the coupler 3301 was a dielectric multi-layered film type wavelength division multiplexing coupler that split/combined the 1682 nm or shorter band and the 1688 nm or longer band, the splitters 3701, 3702 were fiber couplers of which splitting ratio was 3 dB, the couplers 3303, 3705 were dielectric multi-layered film type wavelength division multiplexing couplers that split/combined the 1300 nm or shorter band and the 1310 nm or longer band, the filters 3502, 3310 passed waves of 1690-1720 nm, and the filter 3703 passed light of central wavelength of 1680 nm of a 0.8 nm half-width. The monitored signal lights were 1680 nm control light and the entire light signals of prescribed 1690-1720 nm.

Now suppose that the gains of two monitored signal lights are expressed by G(1680 nm) and G(1690–1720 nm), and define the sum of gains Gs and the gain difference ΔG as follows. As is the case with Example 14-2, gain sum Gs and gain difference ΔG are defined as follows, the currents in the control light source and pump light source are calculated so that Gs and ΔG become equal to those externally provided, and these values are sent to the control unit 3312. The control unit 3312 controls the control light source 3307 and pump light source 3309 so that their currents agree with the received values.

$$Gs = G(1680\ nm) + G(1690\text{--}1720\ nm) \quad (1)$$

$$\Delta G = G(1680\ nm) - G(1690\text{--}1720\ nm) \quad (2)$$

Gain spectrum deviations from the reference gain spectrum observed when the input signal level was varied from −25 to −10 dBm/ch under the gain control of the invention were 0.3 dB or less, and this demonstrates the effectiveness of the present invention.

In Example 14, the doped ions were $Tm^{3+}$, $Ho^{3+}$ and $Er^{3+}$. However, the present invention is not limited by those examples. Instead, the invention can be applied to any rare-earth doped optical amplifiers where the sum of ions in the amplification upper level and the amplification lower level is not constant.

Example 15

Figure 23:
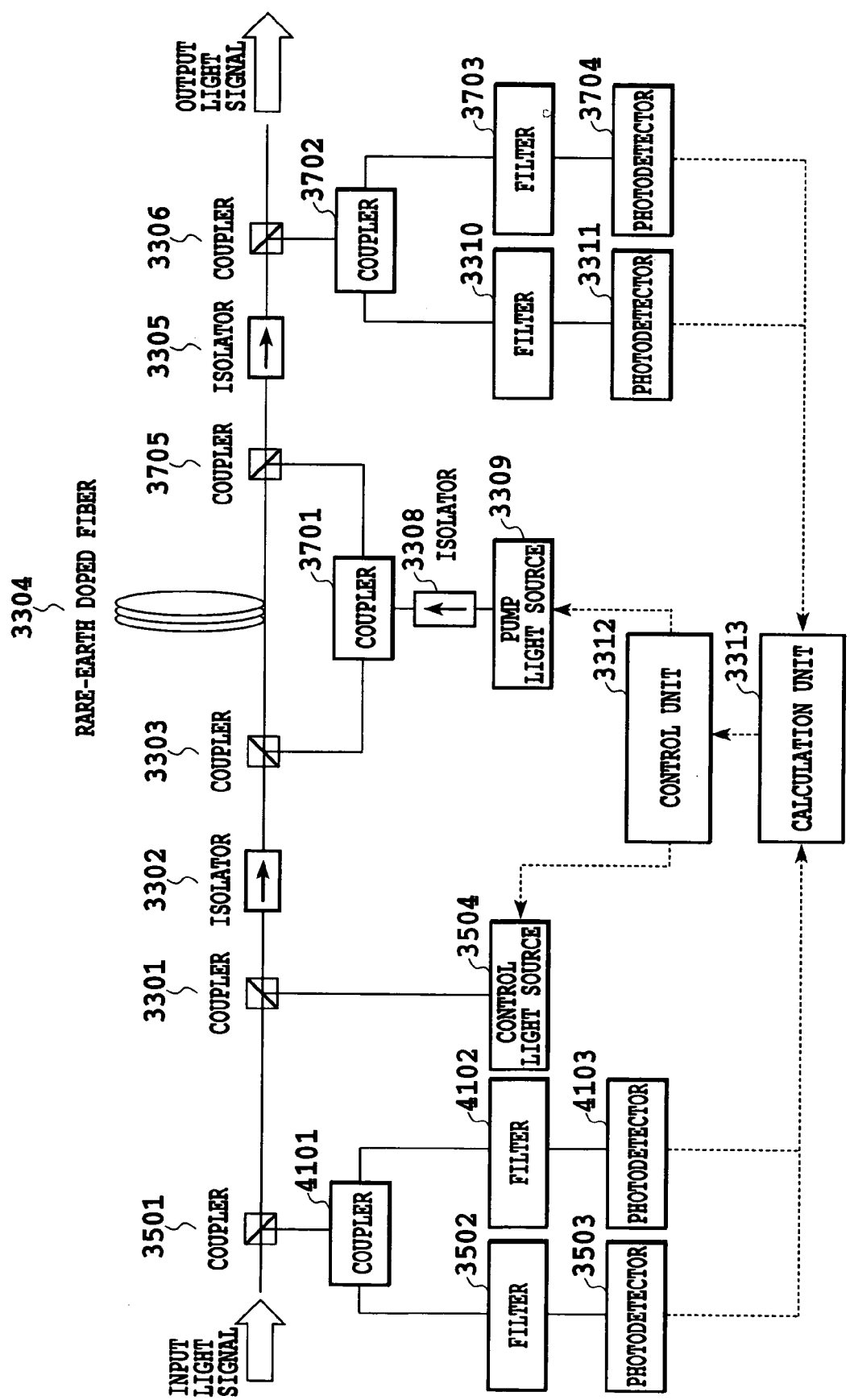
FIG. 23 is a diagram illustrating Example 15 of the optical fiber amplifier of the invention.

FIG. 23 is a diagram illustrating a 15th example of the optical amplifier of the invention. The same components have the same numerals in FIGS. 23 and 22A, and their description is not repeated here. Referring now to FIG. 23, in addition to the components shown in FIG. 22A, this optical amplifier has a splitter 4101 that splits signal light, a filter 4102 for extracting signal light from the splitter 4101, a photodetector 4103 that detects the power of signal light from the filter 4102. Also in this example, the filter 3703 extracts signal light from the splitter 3702, and the detector 3704 detects the power of extracted signal light. The power of pump light was fixed at 400 mW.

The splitter 4101 may be a fusion spliced fiber (splitter type, wavelength division multiplexing type), dielectric multi-layered film, or circulator coupled with a fiber grating. As the filter 4102, a dielectric multi-layered film or a fiber grating can be used.

In the present example, the signal light waves were 16 waves of 1480 to 1510 nm at intervals of 2 nm, the optical fiber 3304 was a 5 m fiber of which host glass was ZBLAN fluoride glass with core where 6000 ppm of Thulium ions were doped, the wavelength of control light of the control light source 3504 was 1470 nm, the wavelength of pump light was 1410 nm, the central wavelength of isolators 3302, 3305, 3308 was 1480 nm, the splitters 3501, 3306 were fiber couplers of a splitting ratio of 95:5, the coupler 3301 was a dielectric multi-layered film type wavelength division multiplexing coupler that split/combined the 1472 nm or shorter band and the 1478 nm or longer band, the splitters 3701, 3702, 4101 were fiber couplers of which splitting ratio was 3 dB, the couplers 3303, 3705 were dielectric multi-layered film type wavelength division multiplexing couplers that split/combined the 1430 nm or shorter band and the 1440 nm or longer band, the filters 3502, 3310 passed light of a central wavelength of 1480 nm of a 0.8 nm half-width, and the filter 4102, 3703 passed light of a central wavelength of 1510 nm of a 0.8 nm half-width. The monitored signal lights were 1480 nm signal light and 1510 nm signal light.

Now suppose that the gains of two monitored signal lights are expressed by G(1480 nm) and G(1510 nm), and define the sum of gains Gs and the gain difference ΔG as follows:

$$Gs = G(1480\ nm) + G(1510\ nm) \quad (1)$$

$$\Delta G = G(1480\ nm) - G(1510\ nm) \quad (2)$$

If Gs and ΔG are determined uniquely, then G(1480 nm) and G(1510 nm) are determined. Thus G(1480 nm) and G(1510 nm) can be controlled by adjusting Gs and ΔG.

Because Gs and ΔG of this example behave like those of Example 14-1 against changes in the pump light power and control light power, the gain spectrum can be controlled by the same control algorithm. As is the case with Example 14-1, Gs and ΔG are calculated, and the light intensities in the control light source 3504 and pump light source 3309 can be controlled.

In this example, two channels (1480 nm and 1510 nm) of the WDM light signals were used to calculate gains and Gs as well as ΔG to control the light intensities of the control light source 3504 and the pump light source 3309. However, more channels can be used for this control. For example, instead of ΔG, the difference in gain between arbitrary two channels can be used. Like the case using Gs and ΔG, it is possible to define parameters so that the gains in individual channels can be controlled for adjusting light intensity.

Gain spectrum deviations from the reference gain spectrum observed when the input signal level was varied from −25 to −10 dBm/ch under the gain control of the invention were 0.3 dB or less, and this demonstrates the effectiveness of the present invention.

Example 16

Figure 24A:
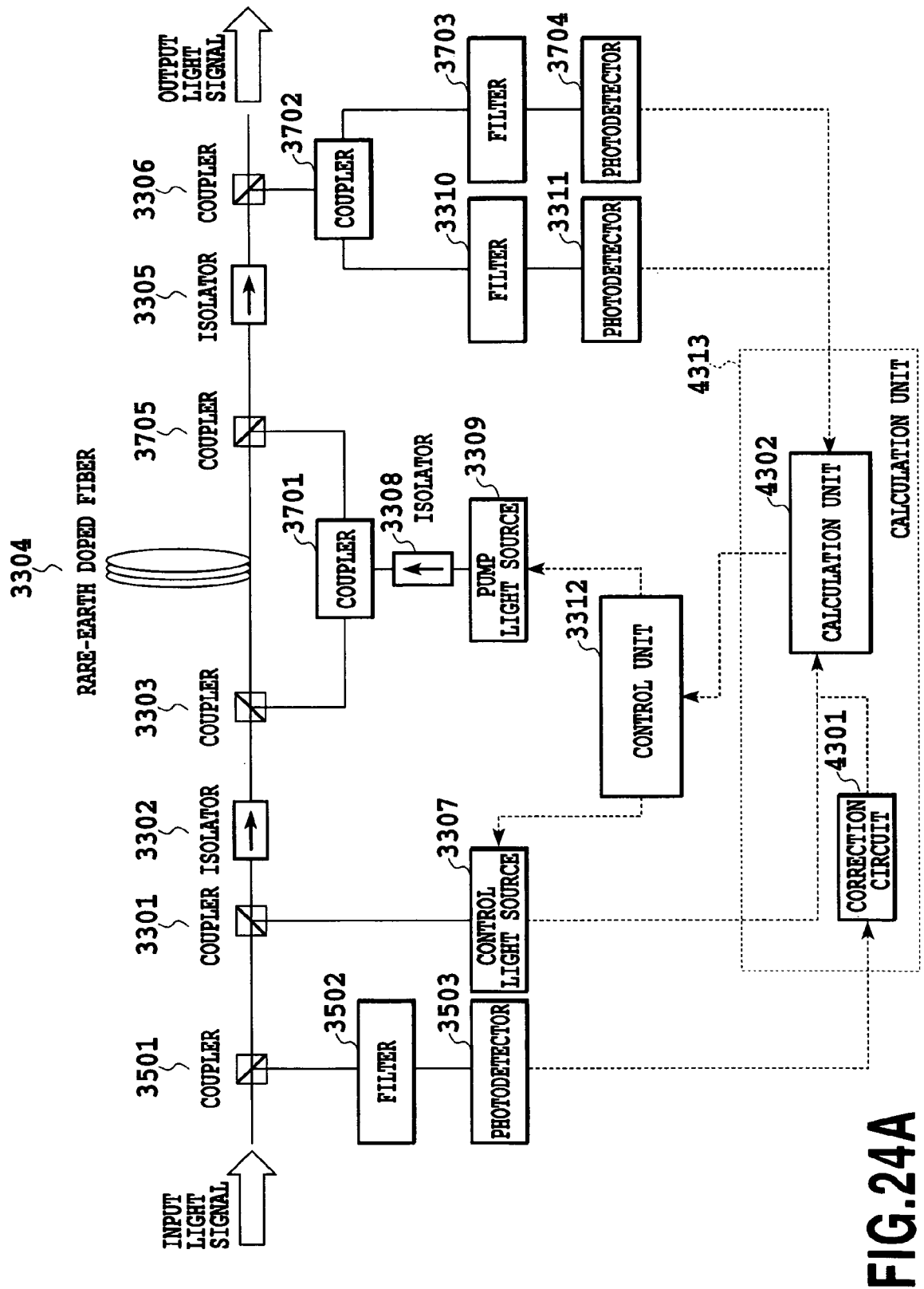
FIG. 24A is a diagram illustrating Example 16 of the optical fiber amplifier of the invention.

FIG. 24A is a diagram illustrating a 16th example of the optical amplifier of the invention. The same components have the same numerals in FIGS. 24A and 22A, and their description is not repeated here. Referring now to FIG. 24A, in addition to the components shown in FIG. 22A, this optical amplifier has a calculation unit 4313 incorporating a correction circuit 4301 that corrects the signal light power detected by the photodetector 3503 and a calculation circuit 4302 that conducts calculation based on the corrected signal light power and sends the calculation result to the control unit 3312. Like Example 14-2, the employed components and units were the same as those used in Example 14-1.

In the present example, the signal light waves were 16 waves of 1480 to 1510 nm at intervals of 2 nm, the optical fiber 3304 was a 5 m fiber of which host glass was ZBLAN fluoride glass with core where 6000 ppm of Thulium ions were doped, the wavelength of control light of the control light source 3307 was 1470 nm, the wavelength of pump light was 1390 nm, the central wavelength of isolators 3302, 3305 was 1480 nm, the coupler 3301 was a dielectric multi-layered film type wavelength division multiplexing coupler that split/combined the 1472 nm or shorter band and the 1478 nm or longer band, the splitters 3701, 3702 were fiber couplers of which splitting ratio was 3 dB, the couplers 3303, 3705 were dielectric multi-layered film type wavelength division multiplexing couplers that split/combined the 1430 nm or shorter band and the 1440 nm or longer band, the splitters 3501, 3306 were fiber couplers of a splitting ratio of 95:5, the filters 3502, 3310 passed 1480-1510 nm waves, and the filter 3703 passed light of a central wavelength of 1470 nm of a 0.8 nm half-width. The monitored signal lights were 1470 nm control light and all the signal light of prescribed 1480-1510 nm.

Now suppose that the gains of two monitored signal lights are G(1470 nm) and G(1480–1510 nm). However, the total signal light power detected by the photodetector 3503 includes light other than signal light (for example, amplified spontaneous emission light) that may have a non-negligible intensity. This phenomenon becomes pronounced in multiple-stage relays. Then the correction circuit 4301 generates a correction value calculated by a function corresponding to input signal light power, and the value is added to or multiplied by G(1480–1510 nm) that was calculated by the calculation unit for correction of G(1480-1510 nm). The corrected G(1480–1510 nm) is now expressed by G'(1480–1510 nm). Gain sum Gs and gain difference ΔG are defined as follows:

$$Gs = G(1470 \text{ nm}) + G'(1480-1510 \text{ nm}) \tag{1}$$

$$\Delta G = G(1470 \text{ nm}) - G'(1480-1510 \text{ nm}) \tag{2}$$

If Gs and ΔG are determined uniquely, then G'(1470 nm) and G'(1480–1510 nm) are determined. Thus G(1470 nm) and G'(1480–1510 nm) can be controlled by adjusting Gs and ΔG.

Because Gs and ΔG of this example behave like those of Example 14-1 against changes in the pump light power and control light power, the gain spectrum can be controlled by the same control algorithm. As is the case with Example 14-1, the input signal light is split off by the splitters 3501, 3306, and the split light goes out as signal light.

From the signal light split by the splitter 3501, the filter 3502 extracts the prescribed 1480-1510 nm signal light, and the photodetector 3503 detects this light. The photodetector 3307 installed in the control light source detects the power of control light. The signal light and control light split by the splitter 3306 is further split by the splitter 3702. From one of the split light beams, 1470 nm control beam is extracted by a filter 3703 and detected by a photodetector 3704. From the other split light beam, the entire 1480-1510 nm signal light is extracted by the filter 3710 and then detected by a photodetector 3311. These detected light signals are converted into electric signals, and sent to the calculation circuit in the calculation unit 3313. The value detected by the photodetector 3503 is sent to a correction circuit 4301.

The value detected by the photodetector 3503 is now corrected by a correction circuit 4301 in the calculation unit 4313 as follows:

$$Pre = Pc \times (1.0029 - 0.2530 \times Pc - 3.0981 \times Pc \times Pc),$$
$$Pc \geq 0.005 \tag{3}$$

Pre: Control light power after correction (mW)

Pc: Control light power before correction (mW)

Figure 24B:
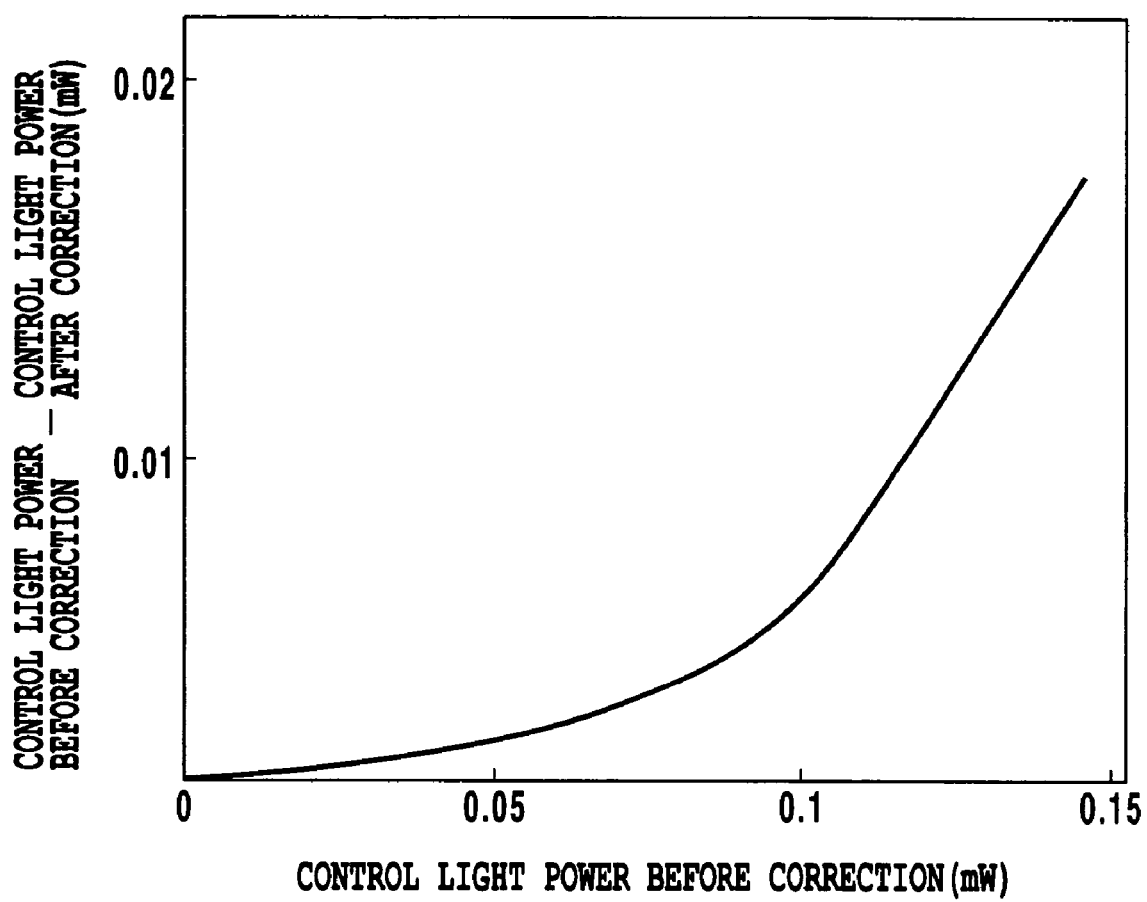
FIG. 24B is a diagram illustrating the outputs of control light observed before and after correction in Example 16.

The above corrections are made to correct the power of control light detected by the photodetector 3503 by adding weights in accordance with the value of the power of control light. FIG. 24B shows the relationship between the power of control light before and after correction. The lateral axis represents the power of control light before correction, while the vertical axis represents the difference (ΔP) between the powers before and after correction. As the power of control light before correction increases, ΔP increases sharply. This correction is an example, and various correction functions may be defined as long as they meet the operation requirements of the amplifier during control. Although in this example only correction of the output from the photodetector 3703 has been described, it is possible to correct the output from the photodetector 3704 or both outputs from the photodetectors 3503 and 3704.

The corrected power of control light after correction is sent to the calculation circuit 4302.

The calculation circuit 4302 calculates these gains of signal light and control light from received detection value and correction value and then calculates Gs and ΔG. Currents for the control light source and pump light source are calculated so that prescribed Gs and ΔG are provided, and those calculated current values are sent to the control unit 3312.

The control unit 3312 adjusts the control light source 3307 and pump light source 3309 so that they have currents sent from the calculation circuit 4302.

Gain spectrum deviations from the reference gain spectrum observed when the input signal level was varied from −25 to −10 dBm/ch under the gain control of the invention were 0.3 dB or less, and this demonstrates the effectiveness of the present invention.

Example 17

Figure 25A:
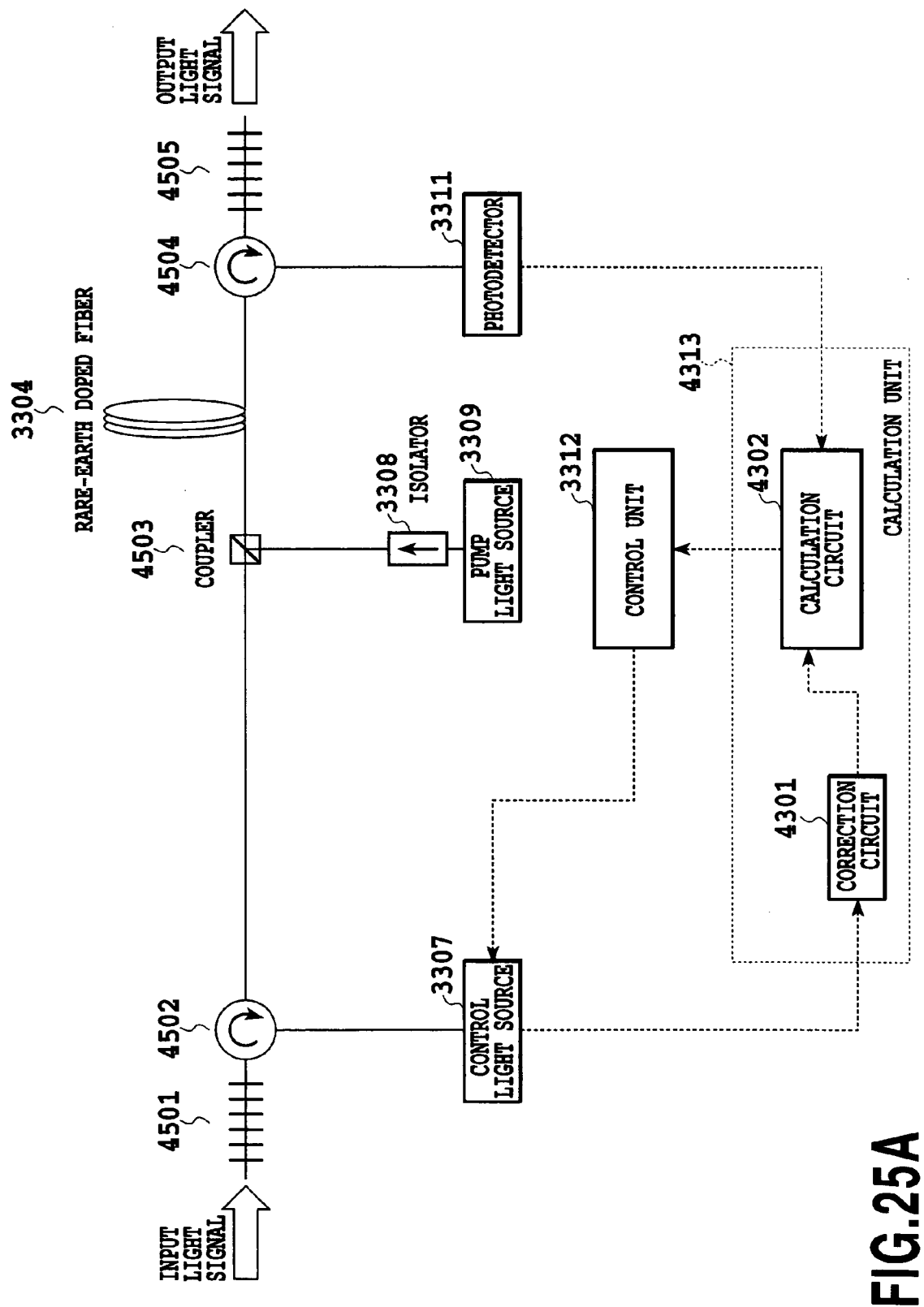
FIG. 25A is a diagram illustrating Example 17 of the optical fiber amplifier of the invention.

FIG. 25A is a diagram illustrating a 17$^{th}$ example of the optical amplifier of the invention. The same components have the same numerals in FIGS. 25A and 24A, and their description is not repeated here. Referring now to FIG. 25A, in addition to the components shown in FIG. 24A, this optical amplifier has circulators 4502, 4504 coupled with fiber gratings 4501, 4505 that combine/split control light and signal light, and a coupler 4503 that combines pump light from the isolator 3308 with signal light and control light from the circulator 4502.

Instead of circulators 4502, 4504 coupled with fiber gratings 4501, 4505, a fusion spliced fiber (splitter type, wavelength division multiplexing type) or dielectric multi-layered film can be employed. As the coupler 4503, a fusion spliced fiber, dielectric multi-layered film or circulator coupled with a fiber grating can be used.

In the present example, the signal light waves were 16 waves of 1478, 1480, 1482, 1484, 1486, 1488, 1490, 1492, 1496, 1498, 1500, 1502, 1504, 1506, 1508 and 1510 nm. The optical fiber 3304 was a 7 m fiber of which host glass was ZBLAN fluoride glass with core where 6000 ppm of Thulium ions were doped, the wavelength of control light of the control light source was 1494 nm, the wavelength of pump light was 1400 nm, the central wavelength of isolators 3308 was 1400 nm, the circulators 4502, 4504 coupled with fiber gratings 4501, 4505 combined/split the 1494 nm wave (band width 0.8 nm), and the coupler 4503 was a dielectric multi-layered film type wavelength division multiplexing coupler that combined the 1430 nm or shorter band and the 1440 nm or longer band. The power of pump light was fixed at 300 mW.

As shown in FIG. 25A, the signal light is combined with control light by the coupler 4501, passing the circulator 4502 coupled with the fiber grating 4501, further combined with pump light by the coupler 4503, passing the optical fiber 3304, and partially split by the circulator 4504 coupled with the fiber grating 4505 to be outputted as an output signal light.

The power of control light entered to the optical fiber 3304 is detected by a photodetector installed in the control light source 3307. The power of control light provided by the optical fiber is divided by the circulator 4504 coupled with the fiber grating 4505, detected by the photodetector 3311, and sent to the calculation unit 3313 in the form of an electric signal.

Figure 25B:
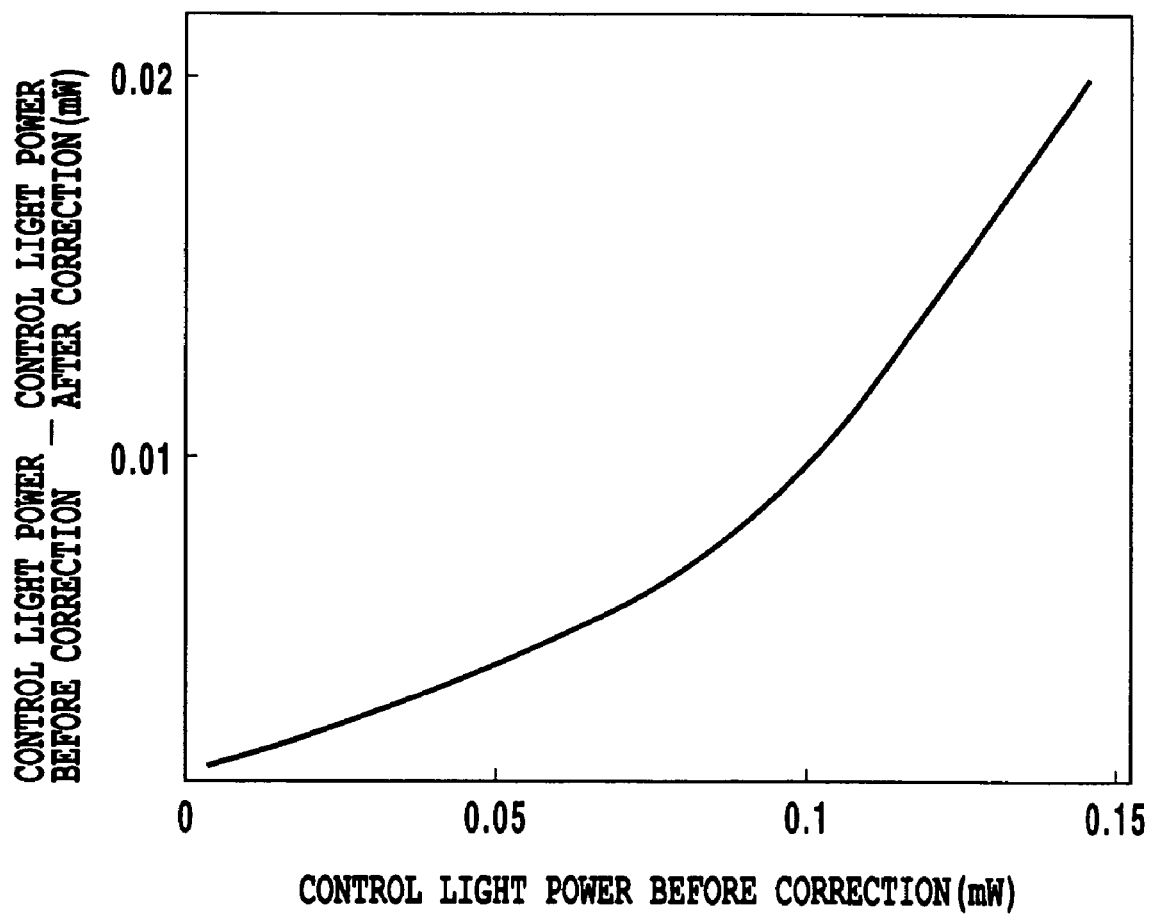
FIG. 25B is a diagram illustrating the outputs of control light observed before and after correction in Example 17.

The detection value detected by the photodetector in the control light source 3307 is now corrected by a correction circuit 4301 in the calculation unit 3313 as follows in the same manner as described in Example 16. FIG. 25B shows the relationship between the powers of control light before and after correction.

$$Pre = Pc \times (1.0106 - 0.73559 \times Pc), Pc \geq 0.005$$

Pre: Control light power after correction (mW)
Pc: Control light power before correction (mW)

This function for correction is an example, and various correction functions may be defined as long as they meet the operation requirements of the amplifier during control. Although in this example only correction of the output from the photodetector in the control light source 3307 has been described, it is possible to correct the output from the photodetector 3311 or from both outputs of the photodetector 3311 and control light source 3307.

The power of control light after correction is sent to the calculation circuit 4302, and the light intensity of the control light source 3307 is adjusted in accordance with this correction.

Gain spectrum deviations from the reference gain spectrum observed when the input signal level was varied from −25 to −10 dBm/ch under the gain control of the invention were 0.3 dB or less, and this demonstrates the effectiveness of the present invention.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An optical amplifier comprising
   a rare-earth doped optical fiber or rare-earth doped optical waveguide serving as an amplification medium in whose core and/or clad rare-earth ions have been doped, the rare-earth ions having three or more energy levels, the rare-earth doped optical fiber or rare-earth doped optical waveguide being configured such that when the ions are excited, an ion density of at least three of the three or more energy levels cannot be approximated to zero,
   an excitation means for exciting the amplification medium,
   an optical resonator that causes laser oscillation at one or more wavelength of spontaneous emission light produced and amplified in the amplification medium,
   a monitoring means that monitors a power of at least one light selected from a power of at least one light with at least one prescribed wavelength band selected from the light inputted to the amplification medium and a power of at least one light selected from a power of at least one light with at least one prescribed wavelength band selected from the light outputted from the amplification medium, and
   a control unit that controls the excitation means based on a value from monitoring means, wherein
   said monitoring means is one which monitors an inputted power and an outputted power of at least one signal light, and
   said control unit is one which calculates a signal gain based on the value from the monitoring means, and controls an intensity of a pumping light emitted from the excitation means so that the signal gain agrees with a prescribed value or an externally decided value.

2. The optical amplifier as claimed in claim 1, wherein said monitoring means is one which monitors a power of a laser oscillation light at an input side of the amplification medium in the optical resonator and a power of signal light inputted to the amplification medium, and
   said control unit is one which calculates a sum of the laser oscillation light power and the power of signal light from the monitoring means, or a value obtained from a linear combination of the laser oscillation light power and the power of signal light, and controls the excitation means so that the value agrees with a prescribed value or an externally decided value.

3. The optical amplifier as claimed in claim 1, wherein said monitoring means is one which takes out simultaneously part of the laser oscillation light in the optical resonator at signal input side of the amplification medium and part of the signal light inputted into the optical amplifier, and monitors the total power thereof; and
   said control unit is one which controls the excitation means so that the value from the monitoring means agrees with a prescribed value or an externally decided value.

4. The optical amplifier as claimed in claim 1, wherein said monitoring means is one which monitors a power of a laser oscillation light at the output side of the amplification medium in the optical resonator and a power of signal light outputted from the amplification medium; and
   the control unit is one which calculates a sum of the laser oscillation light power and the signal light power from the monitoring means, or the value obtained from a linear combination of the laser oscillation light power and the signal light power, and controls the excitation means so that the value agrees with a prescribed value or an externally decided value.

5. The optical amplifier as claimed in claim 1, wherein said monitoring means is one which takes out simultaneously part of the laser oscillation light in the optical resonator at signal output side of the amplification medium and part of the signal light outputted from the optical amplifier, and monitors the total power thereof; and
   control unit is one which controls the excitation means so that the value from the monitoring means agrees with a prescribed value or an externally decided value.

6. The optical amplifier as claimed in claim 1, wherein said oscillation wavelength of said optical resonator is in a band of an amplified spontaneous emission light spectrum produced by induced emission that is induced by transition from an amplification upper level to an amplification lower level of a rare-earth ion for amplifying said signal light.

7. The optical amplifier as claimed in claim 6, wherein said oscillation wavelength of said optical resonator is in a shorter wavelength side of a signal light band.

8. The optical amplifier as claimed in claim 6, wherein said oscillation wavelength of said optical resonator is in a longer wavelength side of a signal light band.

9. The optical amplifier as claimed in claim 1, wherein said oscillation wavelength of said optical resonator is within a band of an amplified spontaneous emission light spectrum produced by induced emission that is induced by transition from an amplification upper level to a ground level of a rare-earth ion for amplifying said signal light.

10. The optical amplifier as claimed in claim 1, wherein said oscillation wavelength of said optical resonator is within a band of an amplified spontaneous emission light spectrum produced by induced emission that is induced by transition from an amplification lower level to a ground level of a rare-earth ion for amplifying said signal light.

11. The optical amplifier as claimed in claim 1, wherein said monitoring means further comprises a band-pass filter.

12. The optical amplifier as claimed in claim 1, wherein the amplifier further comprises one of (A), (B), or (C) below:
   (A) a means for varying a loss in said optical resonator, the means being located in said optical resonator;
   (B) one or more optical attenuator located in said optical resonator;
   (C) a means for varying a loss in said optical resonator, the means being located in said optical resonator, and one or more optical attenuator located in said optical resonator.

13. A multi-stage optical amplifier comprising a plurality of the amplifier selected from the amplifier claimed in claim 1 connected serially and/or in parallel.

14. The multi-stage optical amplifier as claimed in claim 13, wherein the amplifier further comprises one of (A), (B), (C), (D), (E), or (F) below:
   (A) a means for varying a loss in said optical resonator, the means being located in said optical resonator;
   (B) one or more optical attenuator located in said optical resonator;
   (C) one or more optical device selected from a gain equalizer and a variable optical attenuator or an optical device having the combined functionality of the gain equalizer with the variable optical attenuator, the one or more optical device being located between said plurality of the amplifier;
   (D) a means for varying a loss in said optical resonator, the means being located in said optical resonator, and one or more optical attenuator located in said optical resonator
   (E) a means for varying a loss in said optical resonator, the means being located in said optical resonator, and one or more optical device selected from a gain equalizer and a variable optical attenuator or an optical device having the combined functionality of the gain equalizer with the variable optical attenuator, the one or more optical device being located between said plurality of the amplifier;
   (F) a means for varying a loss in said optical resonator, the means being located in said optical resonator, and one or more optical attenuator located in said optical resonator, and one or more optical device selected from a gain equalizer and a variable optical attenuator or an optical device having the combined functionality of the gain equalizer with the variable optical attenuator, the one or more optical device being located between said plurality of the amplifier.

15. The multi-stage optical amplifier as claimed in claim 14, wherein the amplifier comprises a variable optical attenuator or an optical device having a combined functionality of the gain equalizer with the variable optical attenuator, and wherein a power of an output signal light from the optical device is monitored and an optical loss of the variable optical attenuator is adjusted based on the power.

16. The optical amplifier as claimed in claim 1, wherein said amplification medium is a rare-earth doped optical fiber or a rare-earth doped optical waveguide that is doped with Thulium ion as an ion amplifying a signal light, and wherein an amplification upper level is fourth level and an amplification lower level is second level when a ground level that is the lowest energy level is first level.

17. The optical amplifier as claimed in claim 16, wherein said wavelength of excitation light of said excitation means has at least one wavelength selected from 630-720 nm, 740-830 nm, 1000-1100 nm and 1320-1520 nm ranges.

18. The optical amplifier as claimed in claim 16, wherein the wavelength of excitation light of said excitation means has at least one wavelength selected from 630-720 nm, 740-830 nm, 1000-1100 nm and 1320-1520 nm ranges, and pump light of at least one wavelength selected from 1100-1300 m and 1520-2000 nm ranges is also provided together to said amplification medium.

19. The optical amplifier as claimed in claim 1, wherein said amplification medium is a rare-earth doped optical fiber or a rare-earth doped optical waveguide having a host glass that is doped with Erbium ion as an ion amplifying a signal light, the host glass being a material other than silica-based glass, and wherein an amplification upper level is third level and an amplification lower level is second level when a ground level that is the lowest energy level is first level.

20. The optical amplifier as claimed in claim 1, wherein said amplification medium is a rare-earth doped optical fiber or a rare-earth doped optical waveguide that is doped with Holmium ion as an ion amplifying a signal light, and wherein an amplification upper level is third level and an amplification lower level is second level when a ground level that is the lowest energy level is first level.

21. The optical amplifier as claimed in claim 1, wherein the optical amplifier controls a variation of gain spectrum caused by a variation of population inversion state.

22. The optical amplifier as claimed in claim 1, wherein the rare-earth doped optical fiber or rare-earth doped optical waveguide comprises fluoride glass.

23. An optical amplifier comprising
   a rare-earth doped optical fiber or rare-earth doped optical waveguide serving as an amplification medium in whose core and/or clad rare-earth ions have been doped,
   an excitation means for exciting the amplification medium such that an ion density of a level other than an amplification lower level and an amplification upper level of a rare-earth ion in said rare-earth doped optical fiber or waveguide cannot be approximated to zero,
   an optical resonator that causes laser oscillation at one or more wavelength of spontaneous emission light produced and amplified in the amplification medium,
   a monitoring means that monitors a power of at least one light selected from a power of at least one light with at least one prescribed wavelength band selected from the light inputted to the amplification medium and a power of at least one light selected from a power of at least one light with at least one prescribed wavelength band selected from the light outputted from the amplification medium, and
   a control unit that controls the excitation means based on a value from the monitoring means, wherein
   said monitoring means is one which monitors an inputted power and an outputted power of at least one signal light, and
   said control unit is one which calculates a signal gain based on the value from the monitoring means, and controls an intensity of a pumping light emitted from the excitation means so that the signal gain agrees with a prescribed value or an externally decided value.

* * * * *